United States Patent [19]
Tsujiuchi et al.

[11] Patent Number: 5,148,502
[45] Date of Patent: Sep. 15, 1992

[54] OPTICAL IMAGE INPUT/OUTPUT APPARATUS FOR OBJECTS HAVING A LARGE FOCAL DEPTH

[75] Inventors: Junpei Tsujiuchi; Toshio Honda; Nagaaki Ohyama; Tatsuo Nagasaki, all of Yokohama; Susumu Kikuchi, Hachioji, all of Japan

[73] Assignee: Olympus Optical Co., Ltd., Tokyo, Japan

[21] Appl. No.: 776,705

[22] Filed: Oct. 9, 1991

Related U.S. Application Data

[63] Continuation of Ser. No. 312,021, Feb. 16, 1989, abandoned.

[30] Foreign Application Priority Data

Feb. 23, 1988 [JP] Japan .................................. 63-39936
Oct. 3, 1988 [JP] Japan ................................ 63-249431

[51] Int. Cl.⁵ .............................................. G06K 9/40
[52] U.S. Cl. ........................................ 382/54; 382/31; 358/227

[58] Field of Search .............................. 382/31, 43, 54; 364/724.06, 724.08, 726; 350/162; 358/227; 354/400

[56] References Cited

U.S. PATENT DOCUMENTS

| | | | |
|---|---|---|---|
| 4,161,756 | 7/1979 | Thomas | 358/227 |
| 4,301,478 | 11/1981 | Sakane et al. | 358/227 |
| 4,330,775 | 5/1982 | Iwamoto et al. | 382/31 |
| 4,490,849 | 12/1984 | Grumet et al. | 382/31 |
| 4,661,986 | 4/1987 | Adelson | 382/41 |
| 4,804,831 | 2/1989 | Baba et al. | 358/227 |
| 4,892,408 | 1/1990 | Fernick et al. | 382/31 |
| 4,903,204 | 2/1990 | Dobbins, III | 364/413.13 |

*Primary Examiner*—Jose Couso
*Attorney, Agent, or Firm*—Frishauf, Holtz, Goodman & Woodward

[57] ABSTRACT

An optical apparatus which can reproduce an image having a large focal depth without losing resolution and luminance, wherein there is inputted a plurality of images focused on different object planes. A plurality of input images are then weighted and added together. Image recovery processing of the thus added images is then performed.

13 Claims, 47 Drawing Sheets

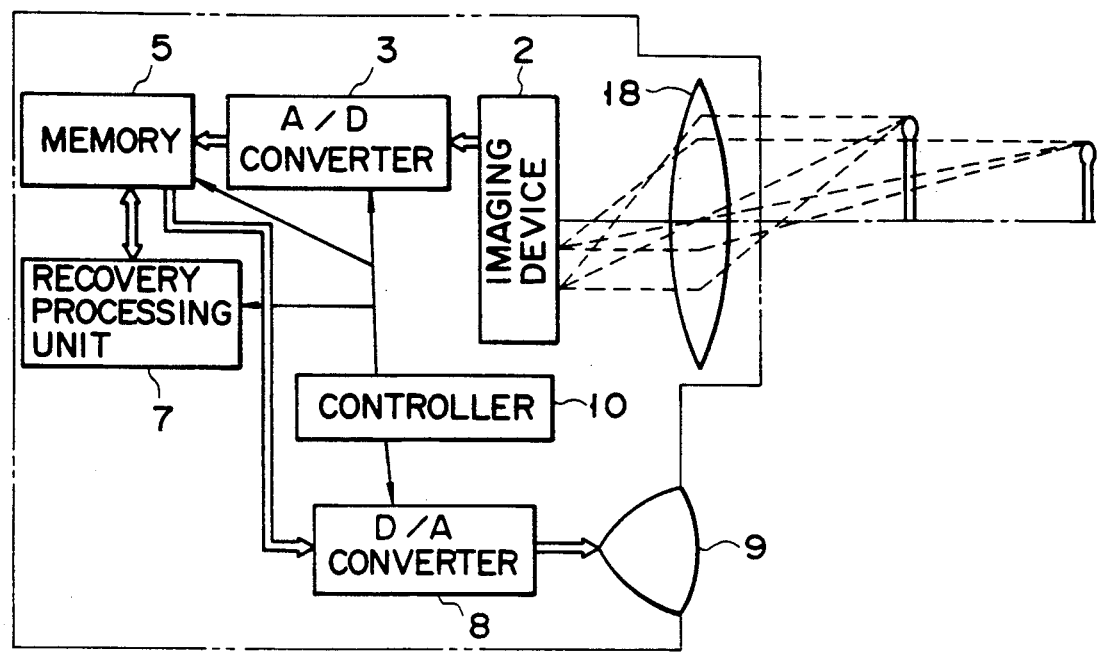
F I G. 7
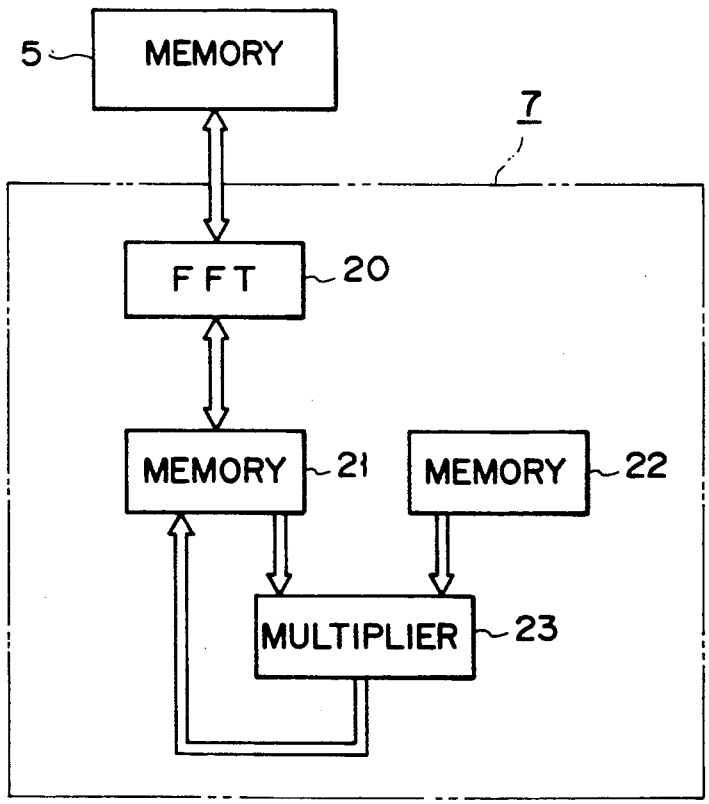
F I G. 8

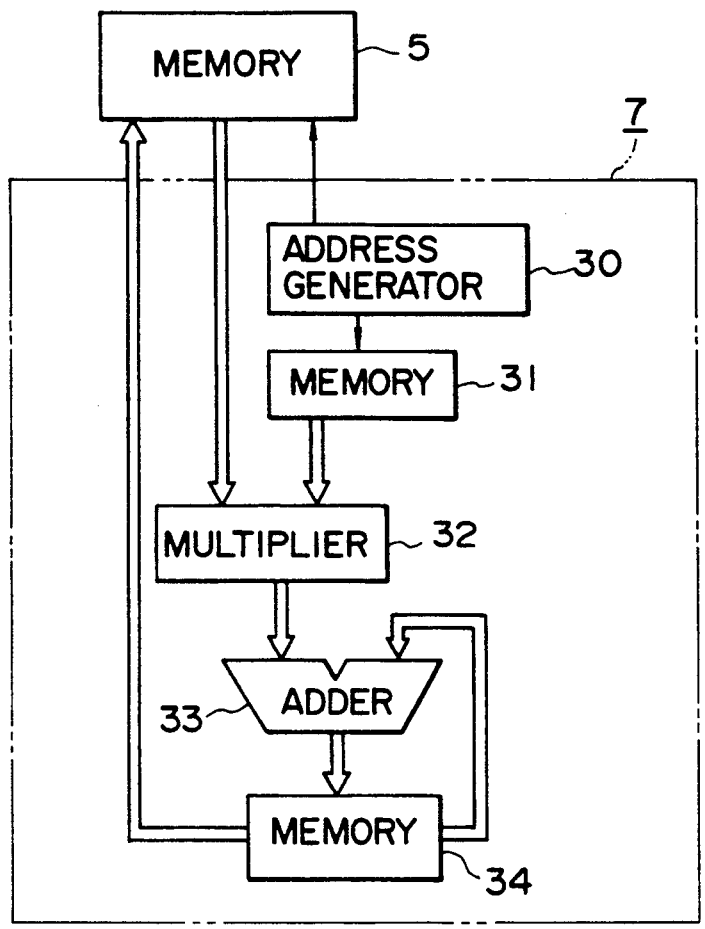
F I G. 9
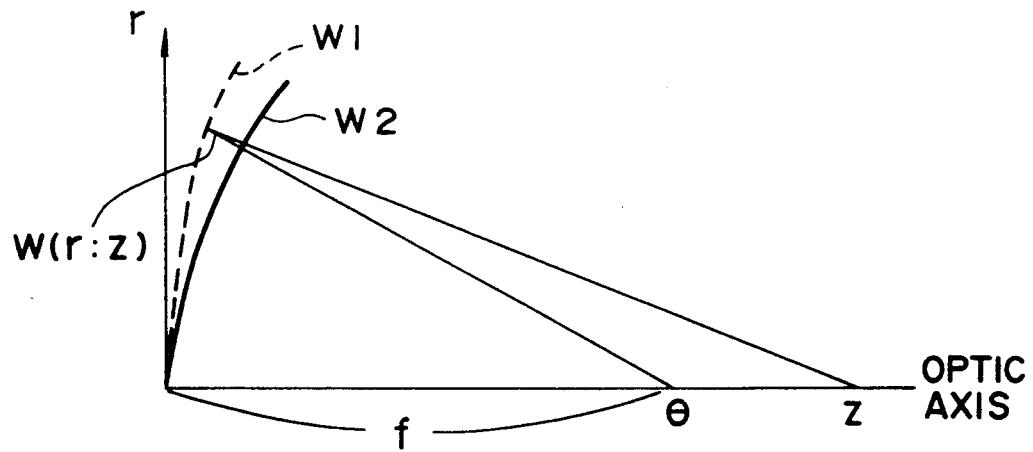
F I G. 10

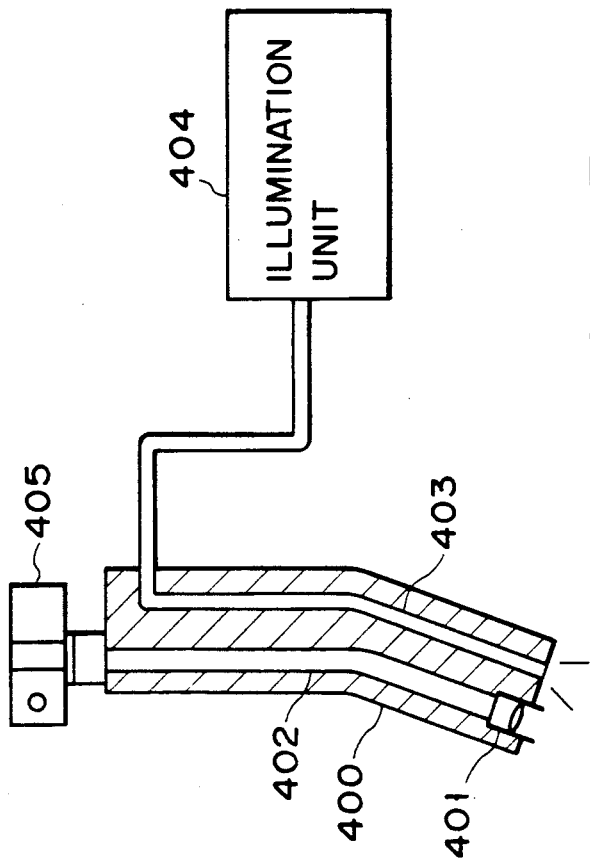
F I G. 17
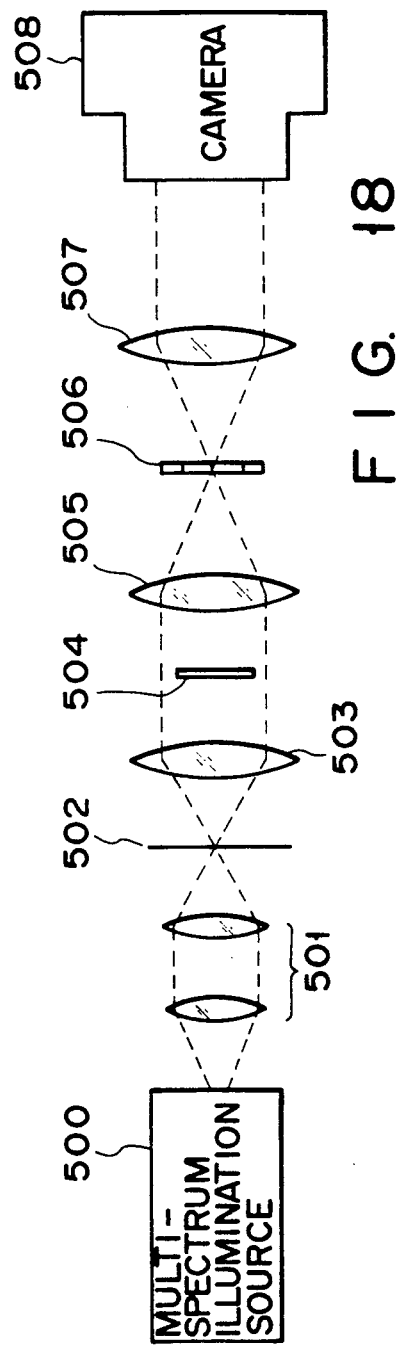
F I G. 18

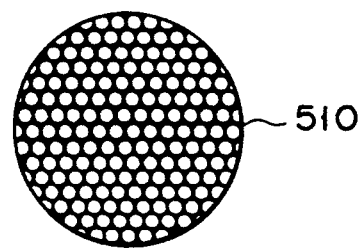
F I G. 19
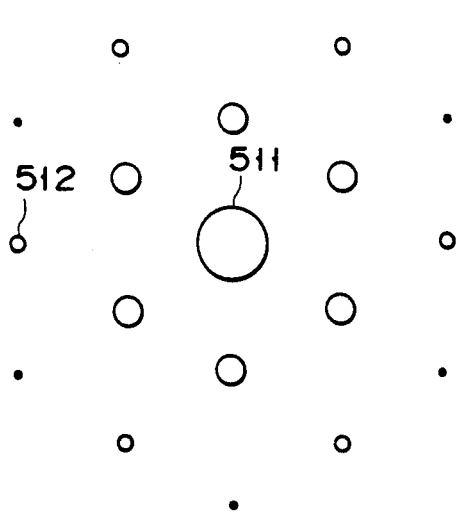 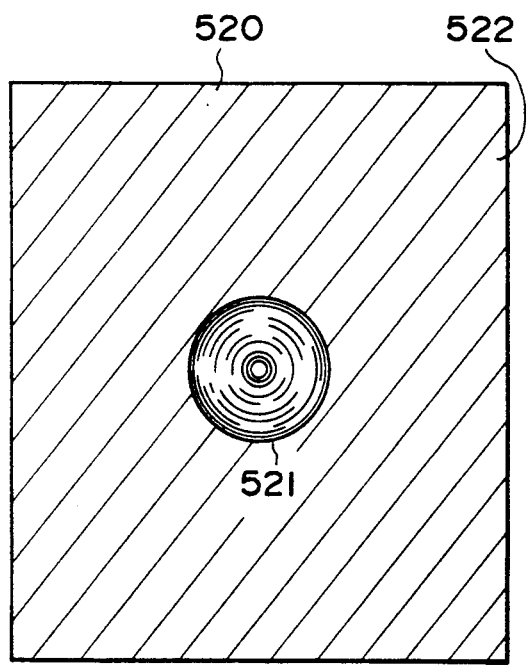
F I G. 20　　　F I G. 21

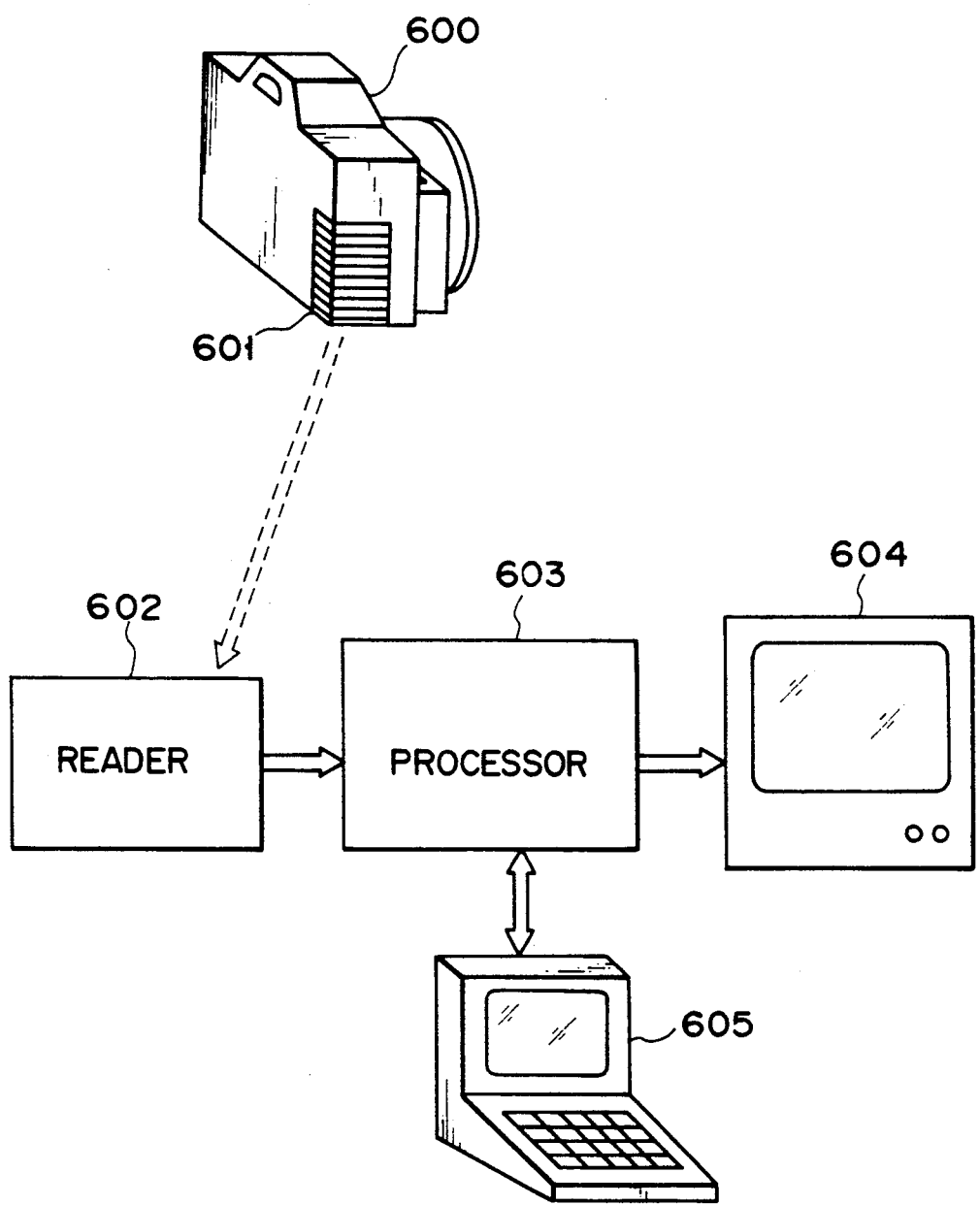
F I G. 22

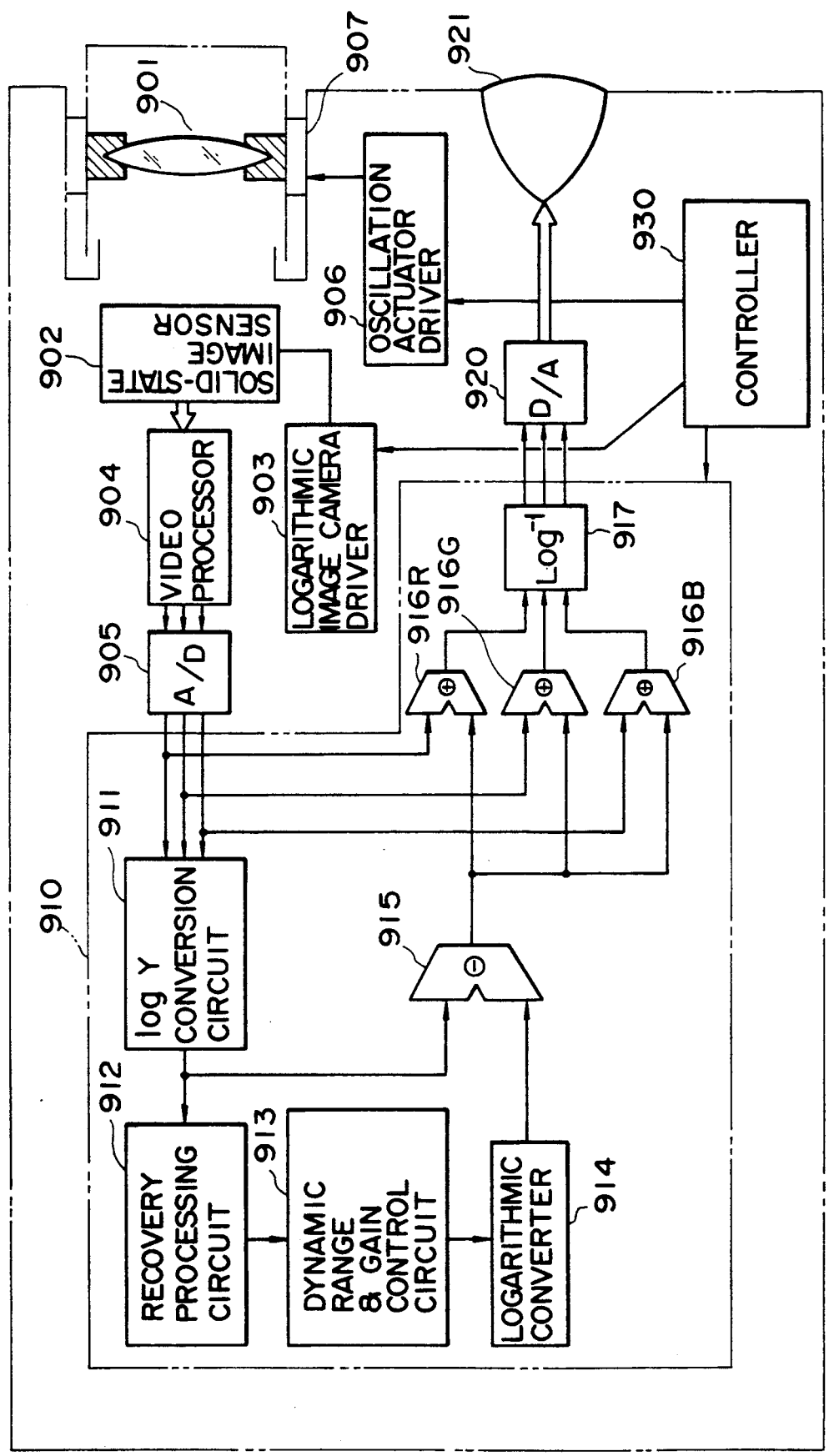
F I G. 28

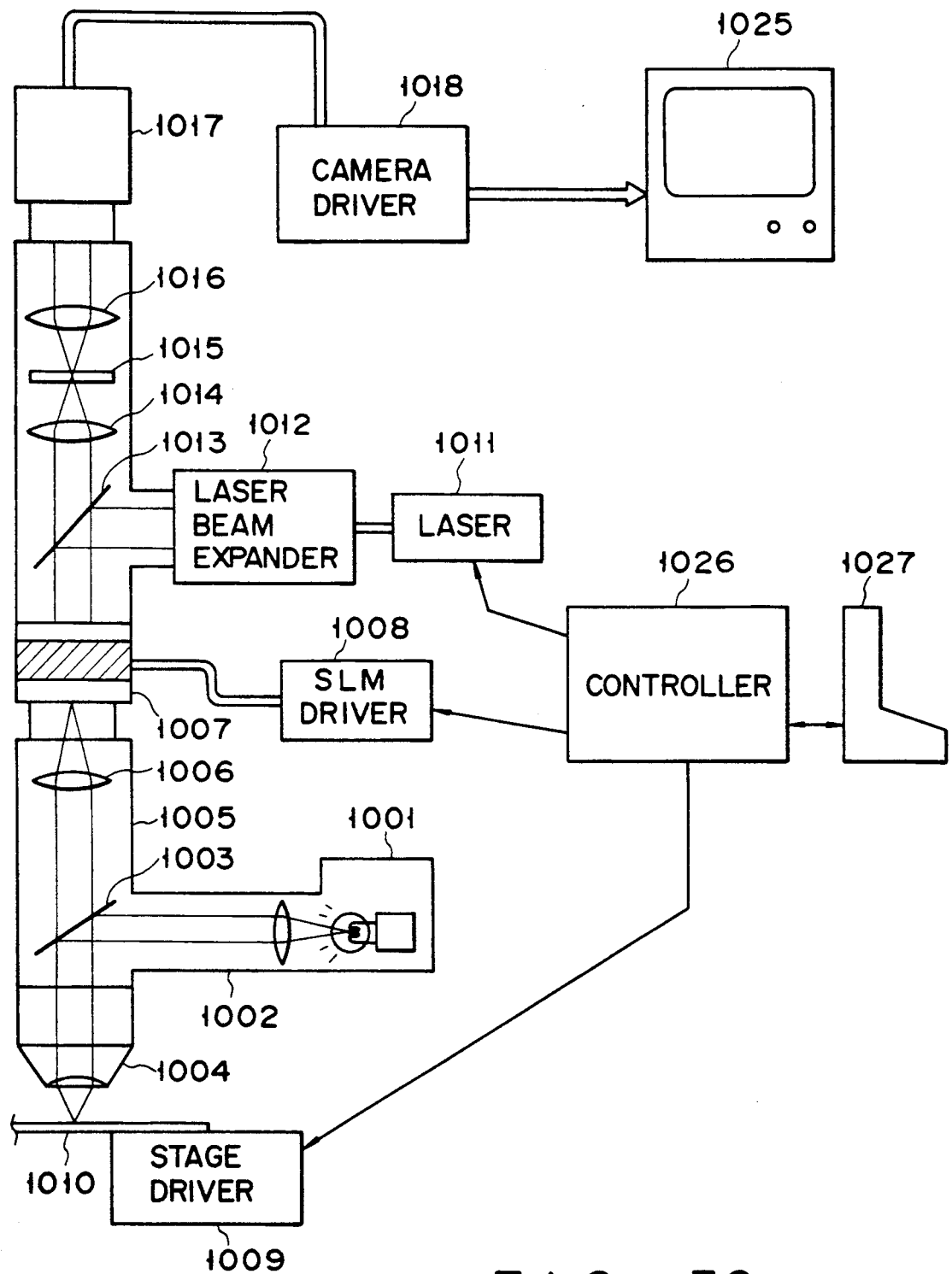
F I G. 30

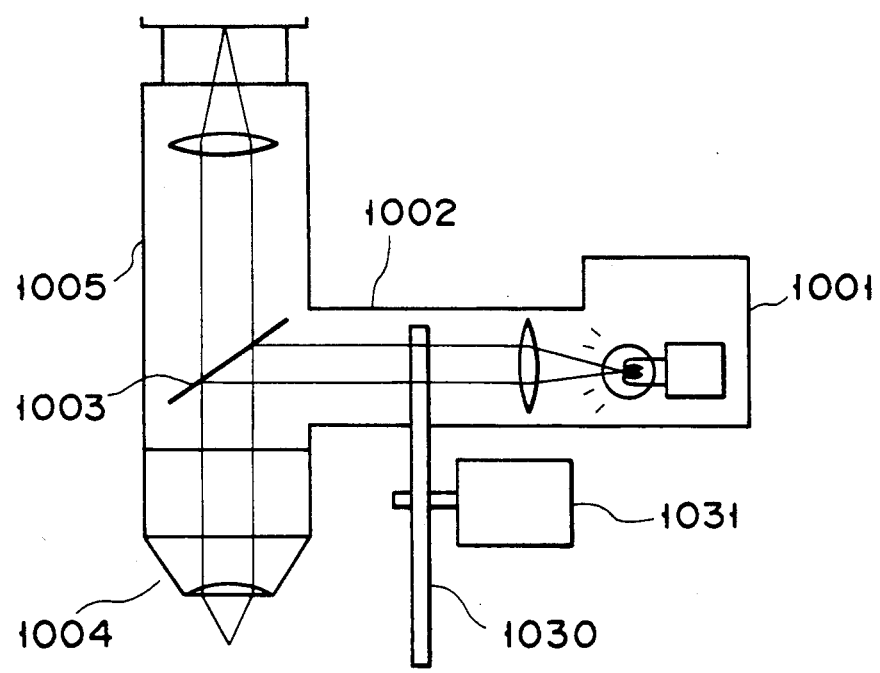
F I G. 31

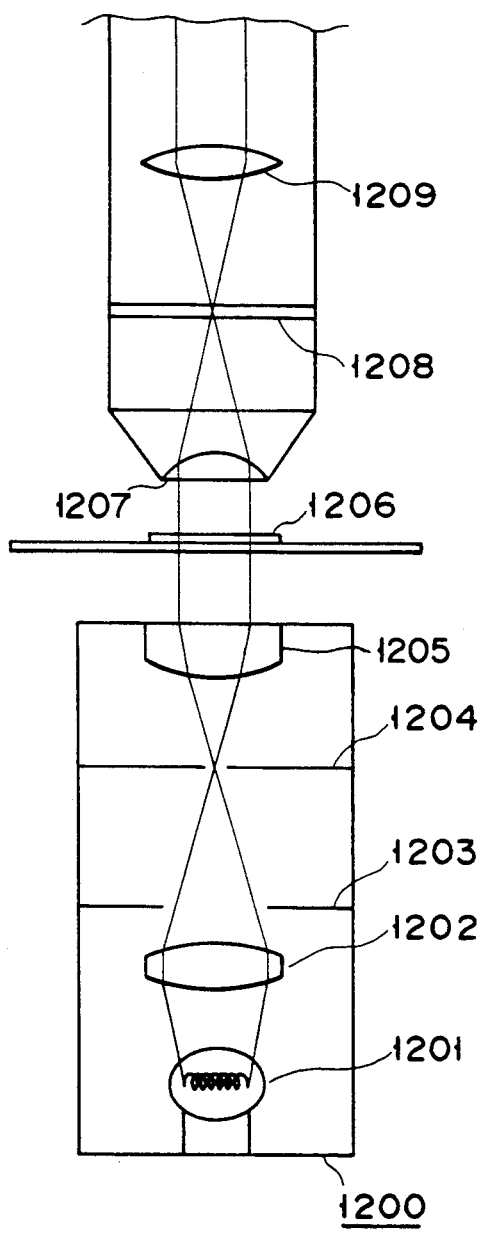
F I G. 33
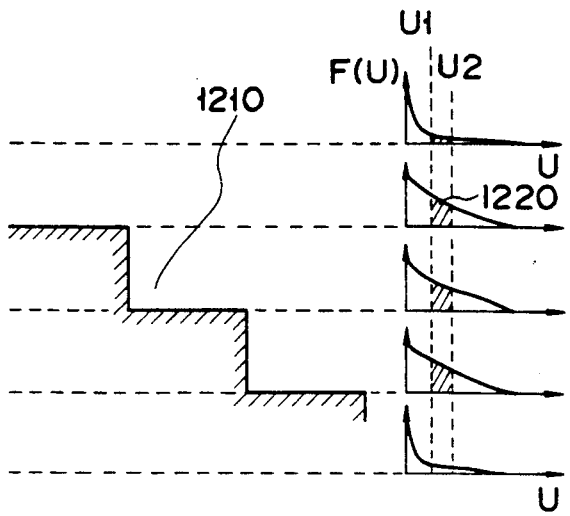
F I G. 34A
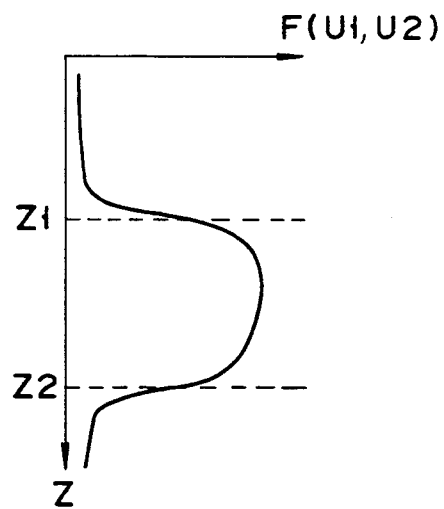
F I G. 34B

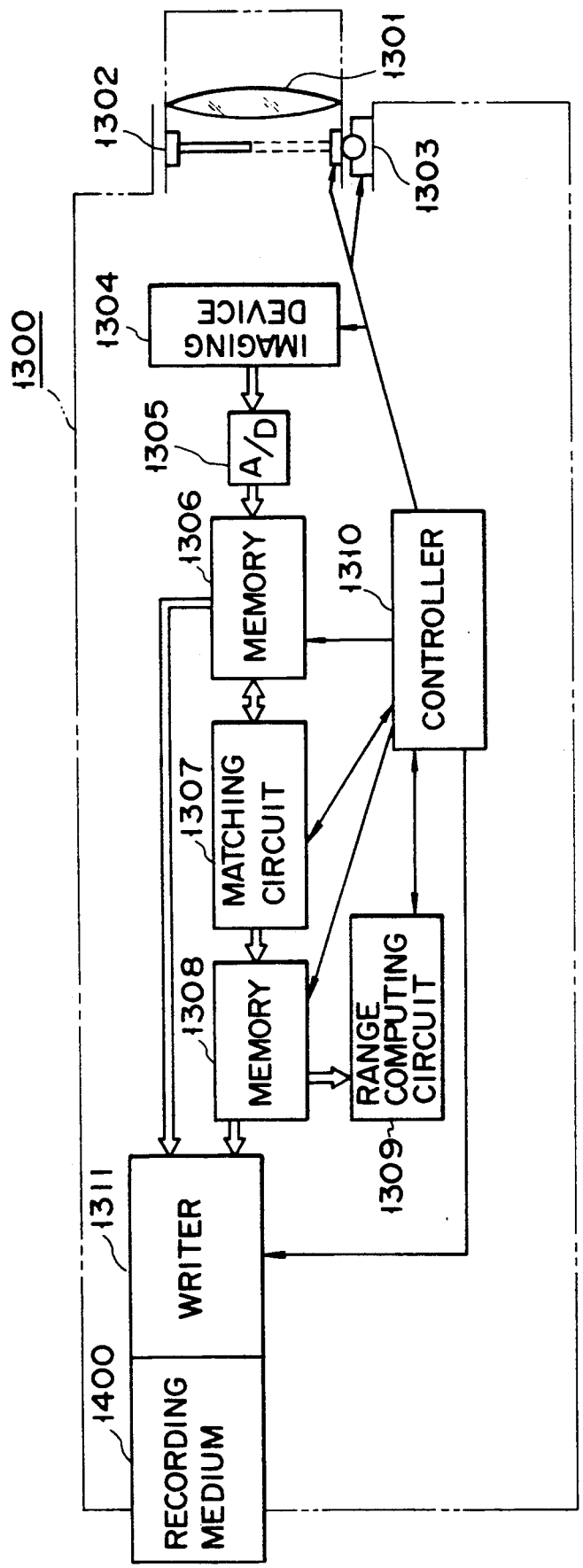
F I G. 35A

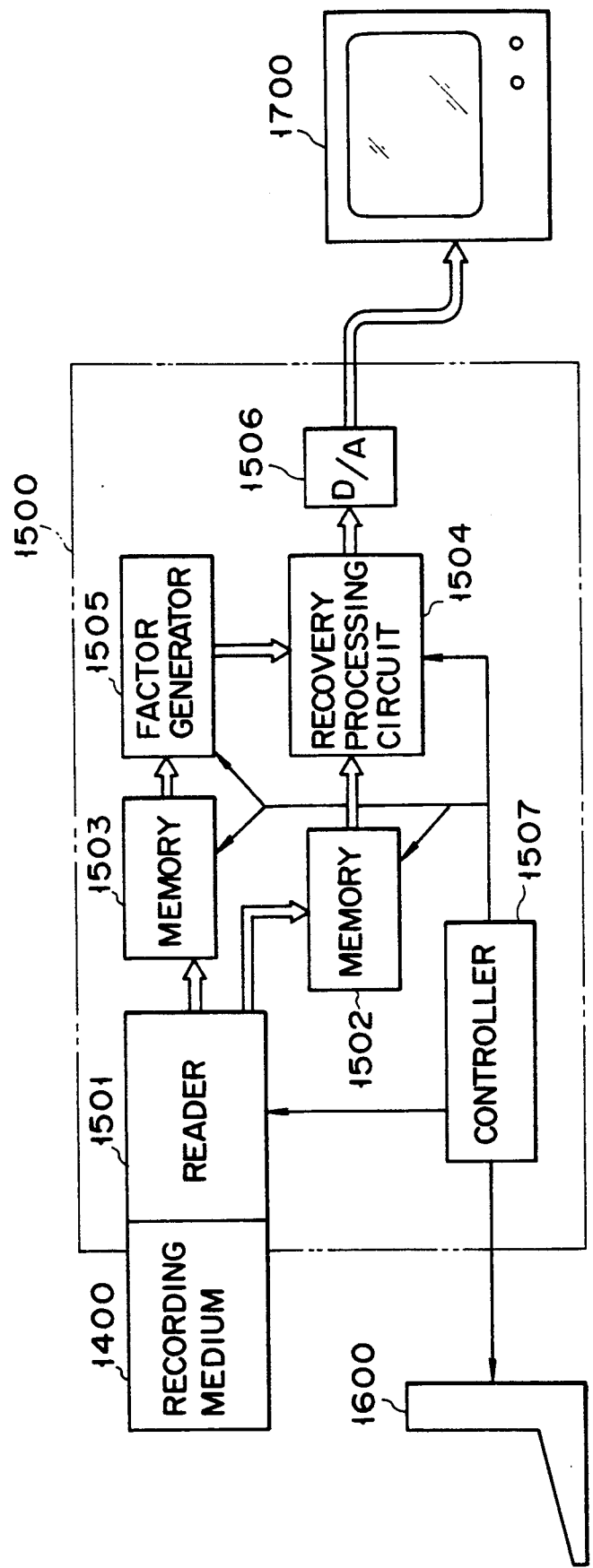
F I G. 35B

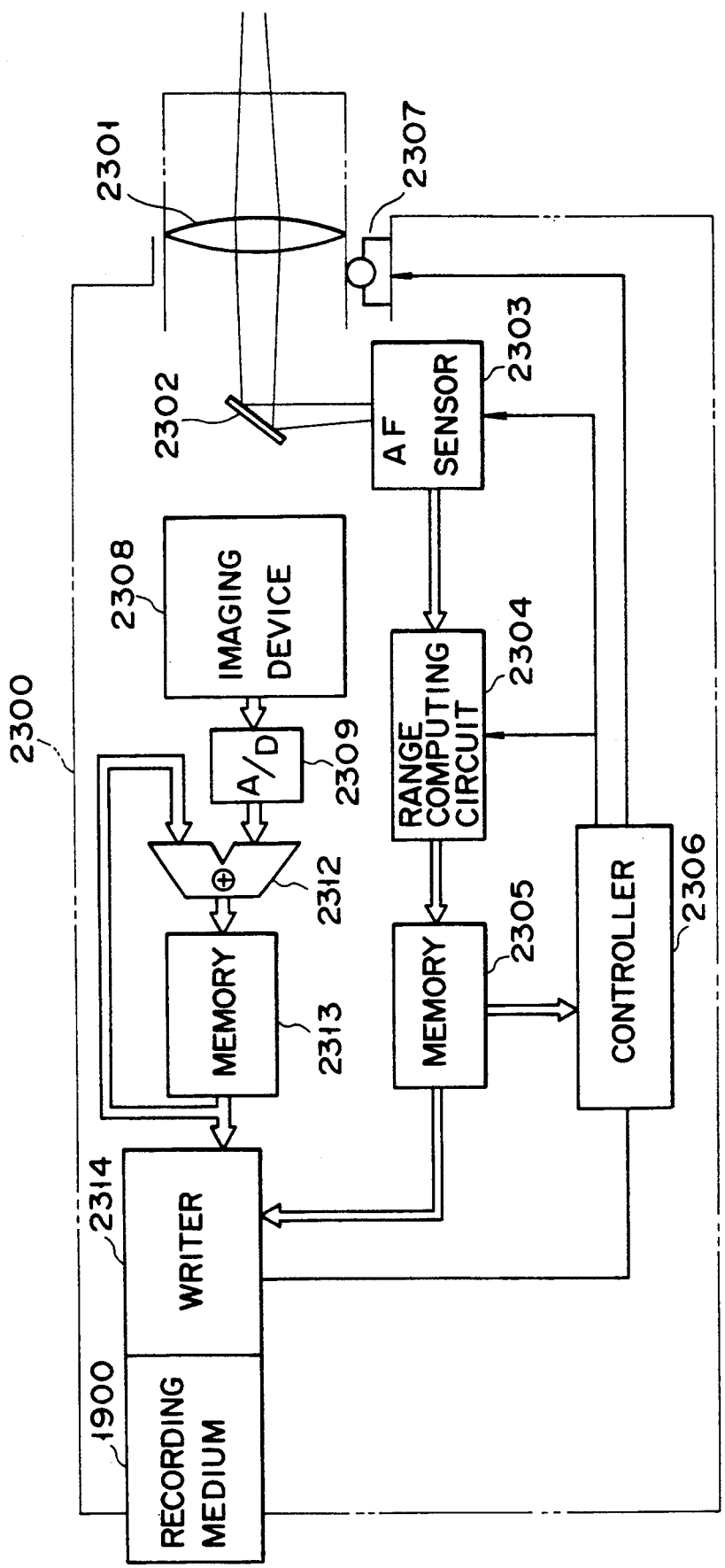
F I G. 43

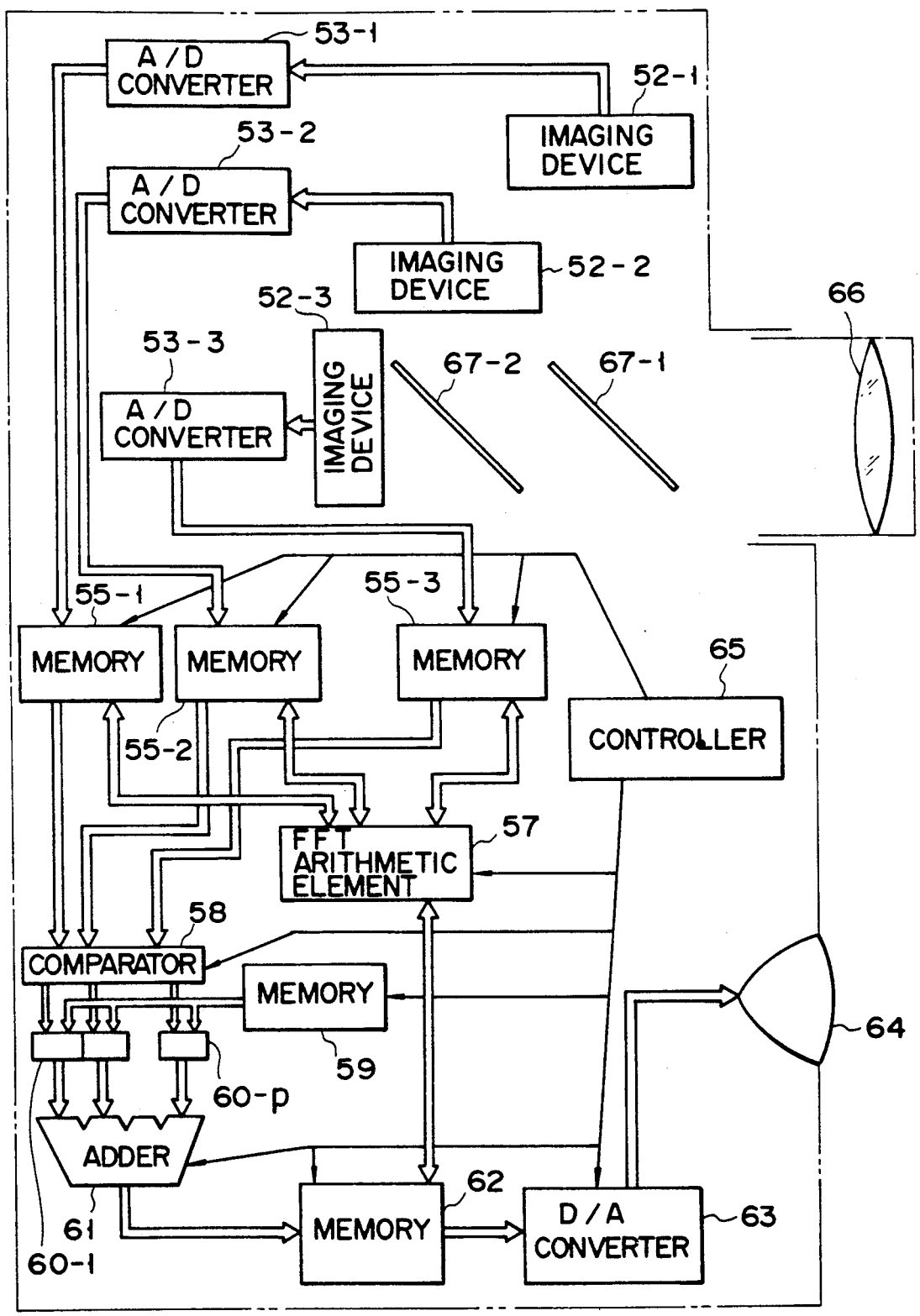
F I G. 51

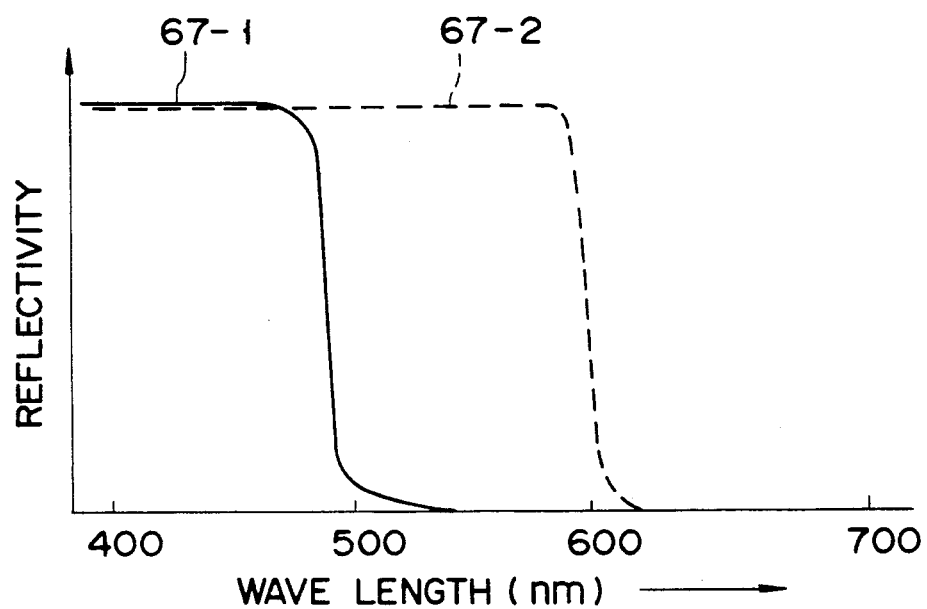
F I G. 52

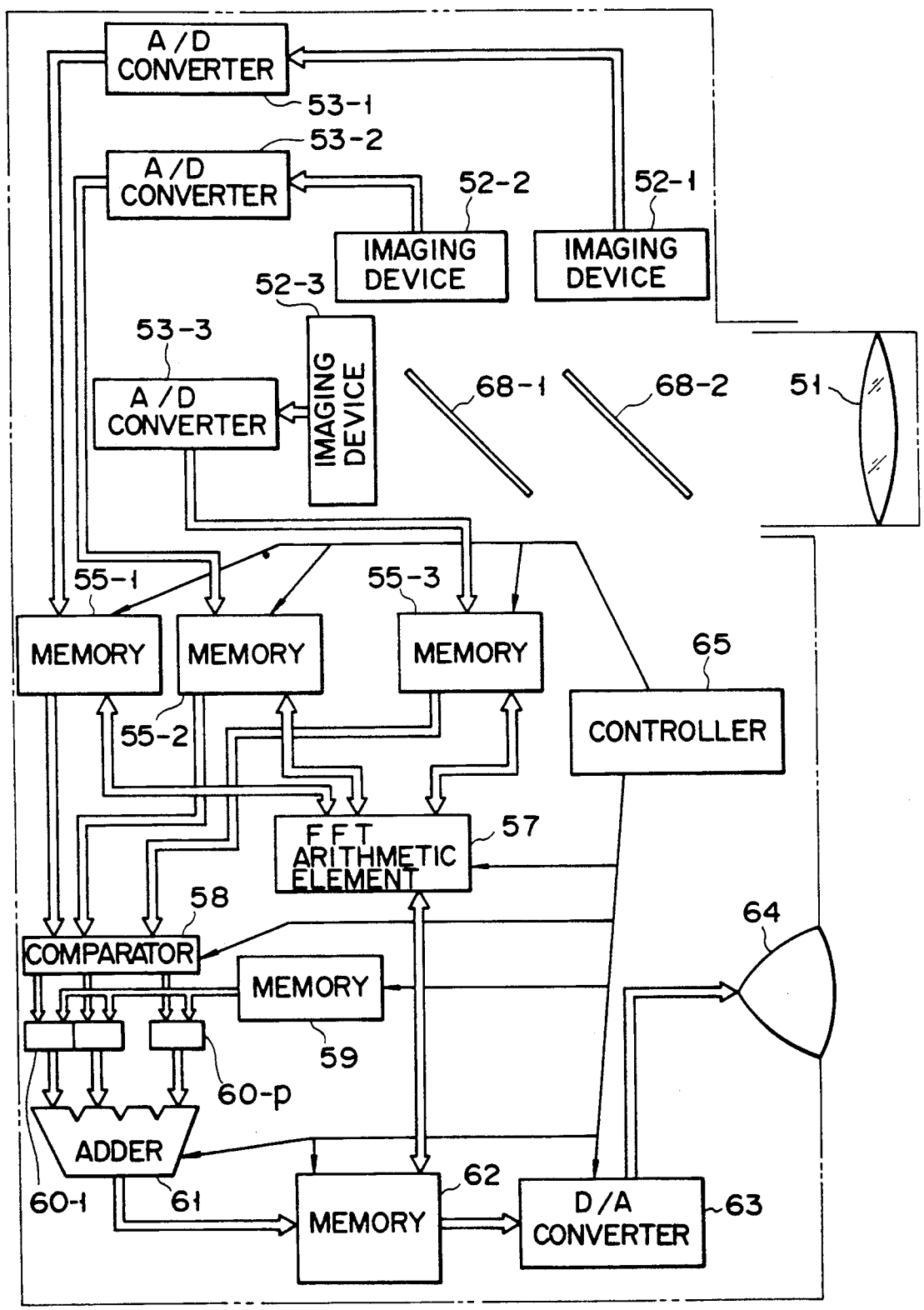
F I G. 53

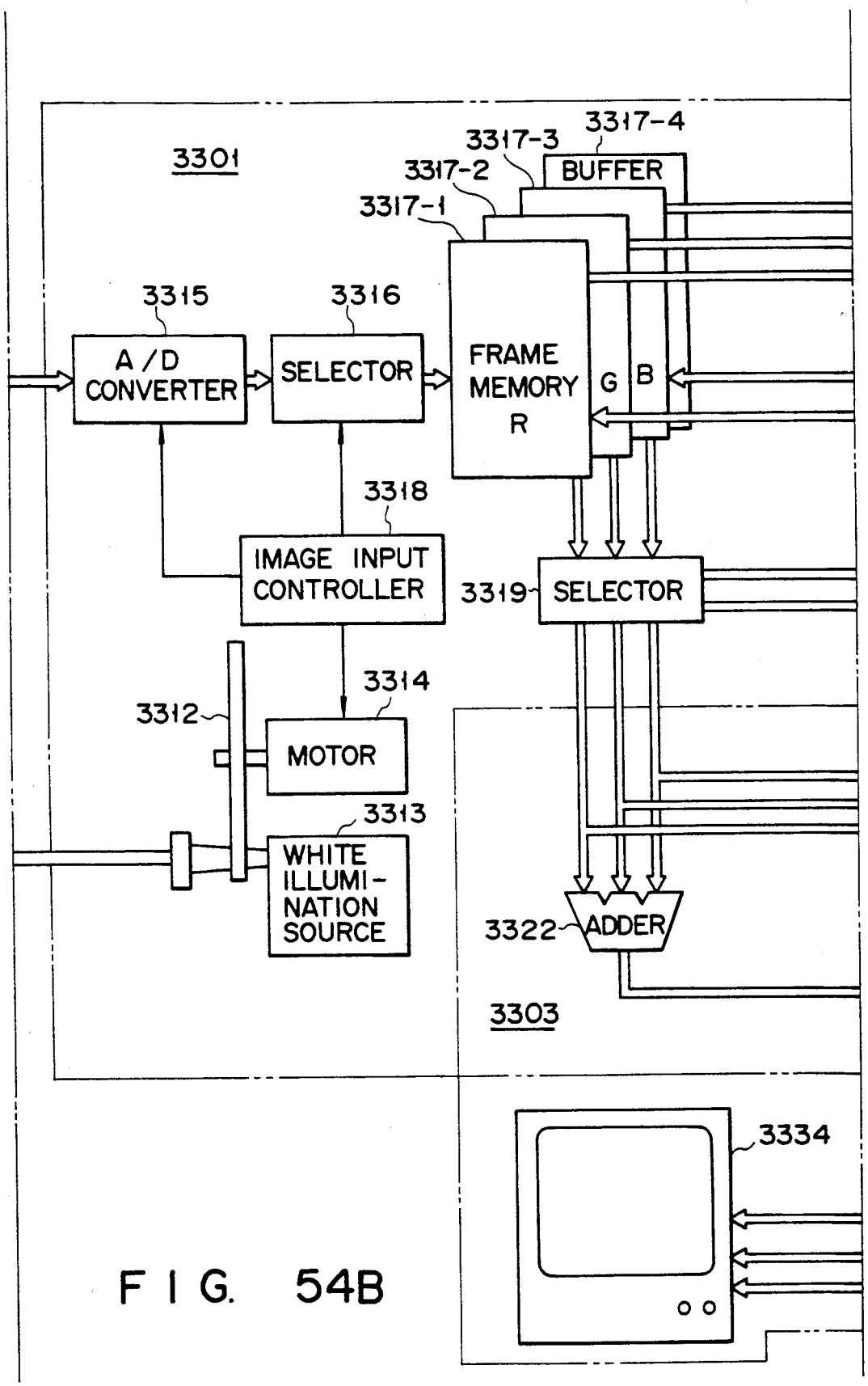
F I G. 54B

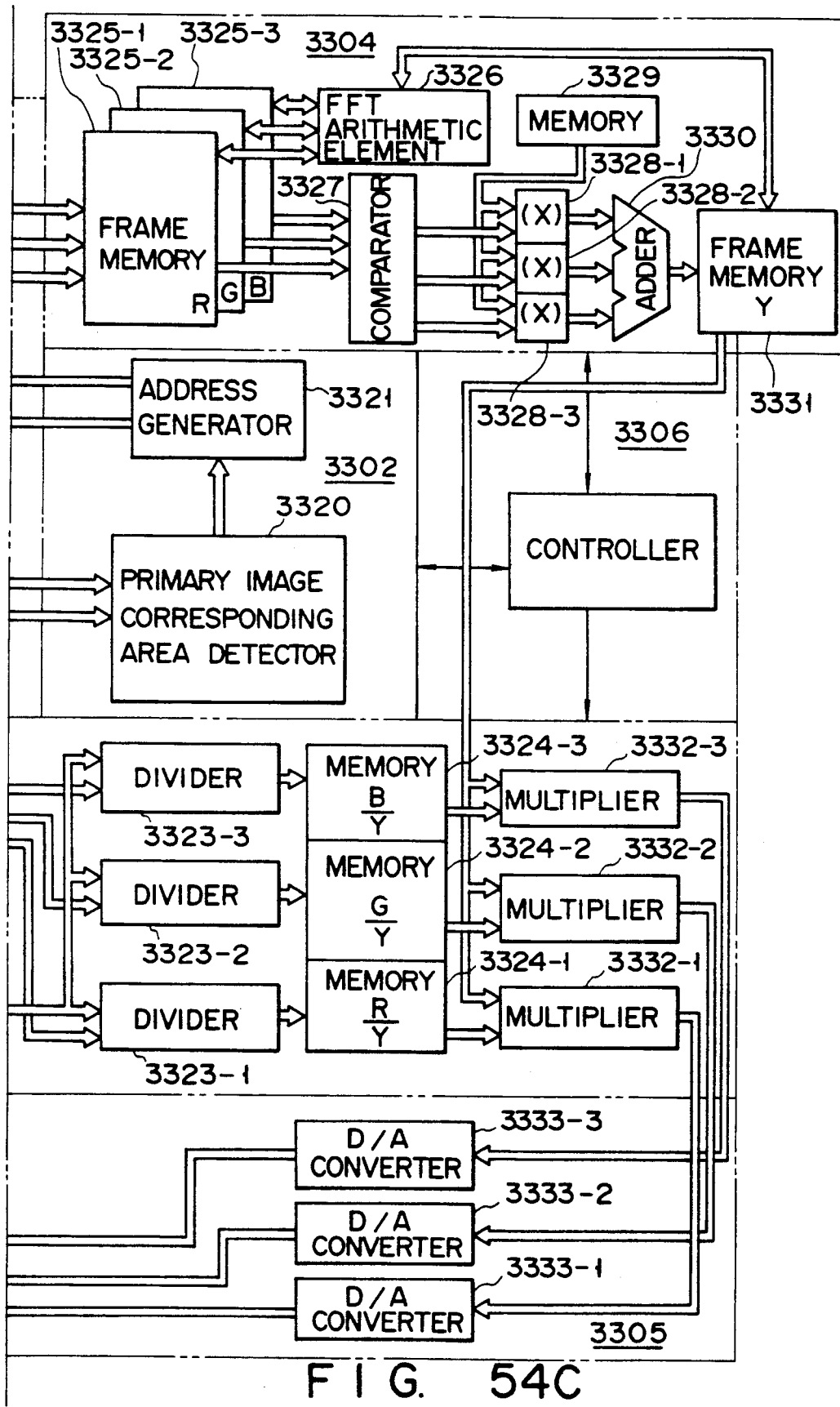
F I G. 54C

OPTICAL IMAGE INPUT/OUTPUT APPARATUS FOR OBJECTS HAVING A LARGE FOCAL DEPTH

This application is a continuation of application Ser. No. 312,021, filed Feb. 16, 1989, now abandoned.

BACKGROUND OF THE INVENTION

1. Field of the Invention

The present invention relates to an image input/output apparatus for inputting/outputting image information.

2. Description of the Prior Art

A focusing optical system having an optical element of a large aperture size is required to optically read an image having a high resolution, a high magnification, and a high luminance. Conventional focusing optical systems represented by lenses have smaller focal depths when their aperture sizes are increased. In the fields of applications which utilize image equipment such as microscopes, cameras, and endoscopes, the resultant images preferably have high resolutions and luminances and at the same time have large focal depths.

A conventional technique for obtaining an image having a large focal depth is described in "W. T. Welford, Journal of Optical Society of America, Vol. 50, P. 749 (1960)". This technique describes a means which utilizes a focusing optical system having a special aperture such as a zone plate. According to this means, an image having a large focal depth can be advantageously obtained. However, the resolution and the light amount are greatly decreased, resulting in inconvenience.

Another technical means is a method which uses an image processing technique described in "S. A. Sugimoto and Y. Ichioka, Applied Optics Vol. 24, P. 2076 (1985)" or "Takatoshi OTA, Kokichi SUGIHARA, and Noboru SUGIE, Journal of the Institute of Electronic and Communication Engineers (D), J66-D, 1245, (1983)". According this method, a plurality of images having different focal points (to be referred to as in-focus positions) in an object space to obtain local dispersion information, and portions in the in-focus state are synthesized. According to this means, an image having a large focal depth can be synthesized without decreasing the resolution and luminance. The above means can be deemed as an effective means in this respect. However, when an object has a smooth surface or different projections at different positions, it is difficult to apply the above method to such an object. In addition, large hardware is required to realize the method, and an algorithm is complicated, thus posing many practical problems.

The conventional technical means described above have the following drawbacks.

(1) In the means for increasing the focal depth by utilizing a focal optical system having a special aperture such as a zone plate, the resolution and the light amount are greatly decreased. Although it is possible to obtain an image having a large focal depth, the resolution and luminance of the image are lost. Therefore, this mean cannot serve as an optical system which satisfies all factors, i.e., a focal depth, a resolution, and a luminance.

(2) In the means for inputting a plurality of images having different in focus positions and synthesizing partial images of the in-focus state on the basis of the local dispersion information, applications are limited depending on conditions of the objects, thus posing practical problems.

SUMMARY OF THE INVENTION

It is a first object of the present invention to provide an image input/output apparatus which can reproduce an image having a large focal depth without decreasing the resolution and luminance and which has a variety of practical applications for objects and can be easily realized.

It is a second object of the present invention to provide an image input/output apparatus having an advantage in that the apparatus can be immediately and appropriately used in practice, in addition to the first object.

In order to achieve the first object of the present invention, the following steps are proposed:

(1) Images having different in-focus positions are input;

(2) The input images having different in-focus positions are synthesized;

(3) Recovery processing of the synthesized image is performed.

The above steps bring about the following function. When an in-focus position is set on an object plane in an image input optical system, a defocus amount of an input image is determined by a distance between the object and the in-focus plane. When the object has a focal depth larger than that of the image input optical system in an optical axis of the image input optical system, the defocus states of the input images obtained upon setting of the in-focus position on a given object plane are different in positions. When the in-focus position is changed, an image having a defocus distribution different from that of the previously input image is input. More specifically, a defocused portion of the previously input image may become an in focus portion in the next input image, and an in-focus portion of the previously input image may become a defocused portion in the next input image. These relationships are determined by the distance between the structure of the object and the preset in-focus plane. When the images are input while in-focus position is changed within a proper range, a plurality of the images which are focused on different portions of the object can be obtained. When these images are synthesized, the synthesized image is almost uniformly defocused throughout the entire the image. The synthesized image is then subjected to recovery processing, thereby reproducing an image which is focused on the entire points of the object.

The image having a large focal depth can be reproduced without decreasing the resolution and luminance. In this case, the processing is very simple, and the local processing of the image need not be performed. An image processing apparatus can be simplified. The processing can be performed regardless of different surface conditions of the objects. Therefore, the present invention can be used in a variety of applications.

In order to achieve the second object of the present invention, the following steps are executed:

(1) A plurality of images having different infocus positions are input;

(2) The input images having different in-focus positions are Fourier-transformed;

(3) The Fourier-transformed images having the different in-focus positions are weighted in units of spatial frequencies, and the weighted images are synthesized; and (4) The synthesized Fourier spectrum image is then inverse Fourier-transformed.

The above steps produce the following function. The images having different focal positions are discretely input, and synthesis of the Fourier-transformed images is performed. The resultant Fourier spectrum image is then inverse Fourier-transformed. Therefore, an image having a large focal depth can be obtained without decreasing the resolution and luminance. In addition, processing can be performed without difficulty regardless of different conditions and natures of the surfaces of the objects and can be used in a variety of applications. Furthermore, special preparation and special input operations need not be performed. Therefore, the present invention can be appropriately used in practical applications without modifications.

BRIEF DESCRIPTION OF THE DRAWINGS

FIGS. 1 to 48 show embodiments associated with the means for achieving the first object of the present invention, in which FIG. 1 is a view showing an arrangement of a first embodiment, FIG. 2 is a view showing an arrangement of a second embodiment, FIG. 3 is a view showing an arrangement of a third embodiment, FIG. 4 is a view showing an arrangement of a fourth embodiment, FIG. 5 is a view showing an arrangement of a fifth embodiment, FIG. 6 is a front view of a Fresnel zone plate shown in FIG. 5, FIG. 7 is a view showing an arrangement of a sixth embodiment, FIGS. 8 and 9 are block diagrams showing different arrangements of a recovery processing unit in the first to sixth embodiments, FIG. 10 is a view showing a geometric relationship associated with a method of designating a recovery filter in the recovery processing unit, FIG. 12 is a view showing an arrangement of a seventh embodiment, FIG. 14 is a plan view showing a structure of a recovery color filter shown in FIG. 13, FIG. 15 is a view showing an arrangement of a ninth embodiment, FIG. 16 is a view showing an arrangement of a tenth embodiment, FIG. 17 is a view showing an arrangement of an eleventh embodiment, FIG. 18 is a view showing optical recovery processing of a film recorded image, FIG. 19 is a view showing a net structure in a fiber scope image, FIG. 20 is a view showing a Fourier spectrum image of a fiber scope image appearing during the optical recovery processing, FIG. 21 is a front view showing a filter used in the optical recovery processing, FIG. 22 is a view showing an arrangement of a twelfth embodiment, FIGS. 23 is a view showing an arrangement of a thirteenth embodiment, FIG. 24 is a view showing the amplitude vs. power characteristics of a specific spatial frequency to explain a function of the thirteenth embodiment, FIG. 25 is a view showing an arrangement of a fourteenth embodiment, FIG. 26 is a front view of a rotary optical shutter shown in the fourteenth embodiment, FIG. 27 is a graph showing characteristics of a logarithmic filter in the fourteenth embodiment, FIG. 28 is a view showing an arrangement of a fifteenth embodiment of the present invention, FIG. 29 is a view showing an arrangement of a sixteenth embodiment of the present invention, FIG. 30 is a view showing an arrangement of a seventeenth embodiment of the present invention, FIG. 31 is a schematic view for explaining a method of processing and displaying a color image in the sixteenth and seventeenth embodiments of the present invention, FIG. 32 is a view showing a color image processor as a partial modification of the arrangement of the seventeenth embodiment, FIG. 33 is a view showing part of an optical bypass filtering arrangement in an eighteenth embodiment of the present invention, FIGS. 34A and 34B are views for explaining a method of selecting an image of the eighteenth embodiment, FIGS. 35A and 35B are views showing an arrangement of a nineteenth embodiment of the present invention, FIG. 37 is a view showing an arrangement of a matching circuit of the nineteenth embodiment, FIG. 38 is a view showing a modification of the matching circuit and a memory arrangement of the nineteenth embodiment, FIG. 39 is a view for explaining a recovery processing means in the nineteenth embodiment, FIGS. 41 and 42 are views for explaining an operation of the twentieth embodiment, FIG. 43 is a view showing an arrangement of a twenty-first embodiment of the present invention, FIG. 44 is a view for explaining an operation of the twenty-first embodiment, FIG. 45 is a view showing an arrangement of a twenty-second embodiment of the present invention, FIGS. 46 and 47 are views for explaining an operation of the twenty-second embodiment, and FIG. 48 is a view showing an arrangement of an optical system of in-focus position control in the first embodiment and the like; and FIGS. 49 to 55 are views showing embodiments associated with the means for achieving the second object of the present invention, in which FIG. 49 is a view showing an arrangement of a twenty-third embodiment, FIG. 50 is a view for explaining an operation of the twenty-third embodiment, FIG. 55 is a view showing an arrangement of a twenty-fourth embodiment, FIG. 52 is a view for explaining an operation of a twenty-fourth embodiment, FIG. 53 is a view showing an arrangement of a twenty-fifth embodiment, FIGS. 54A to 54C are views showing an arrangement of a twenty-sixth embodiment, and FIG. 55 is a view showing an arrangement of a twenty-seventh embodiment.

DETAILED DESCRIPTION OF THE PREFERRED EMBODIMENTS

Preferred embodiments associated with a means for achieving a first object of the present invention will be described below.

First Embodiment

Figure 1:
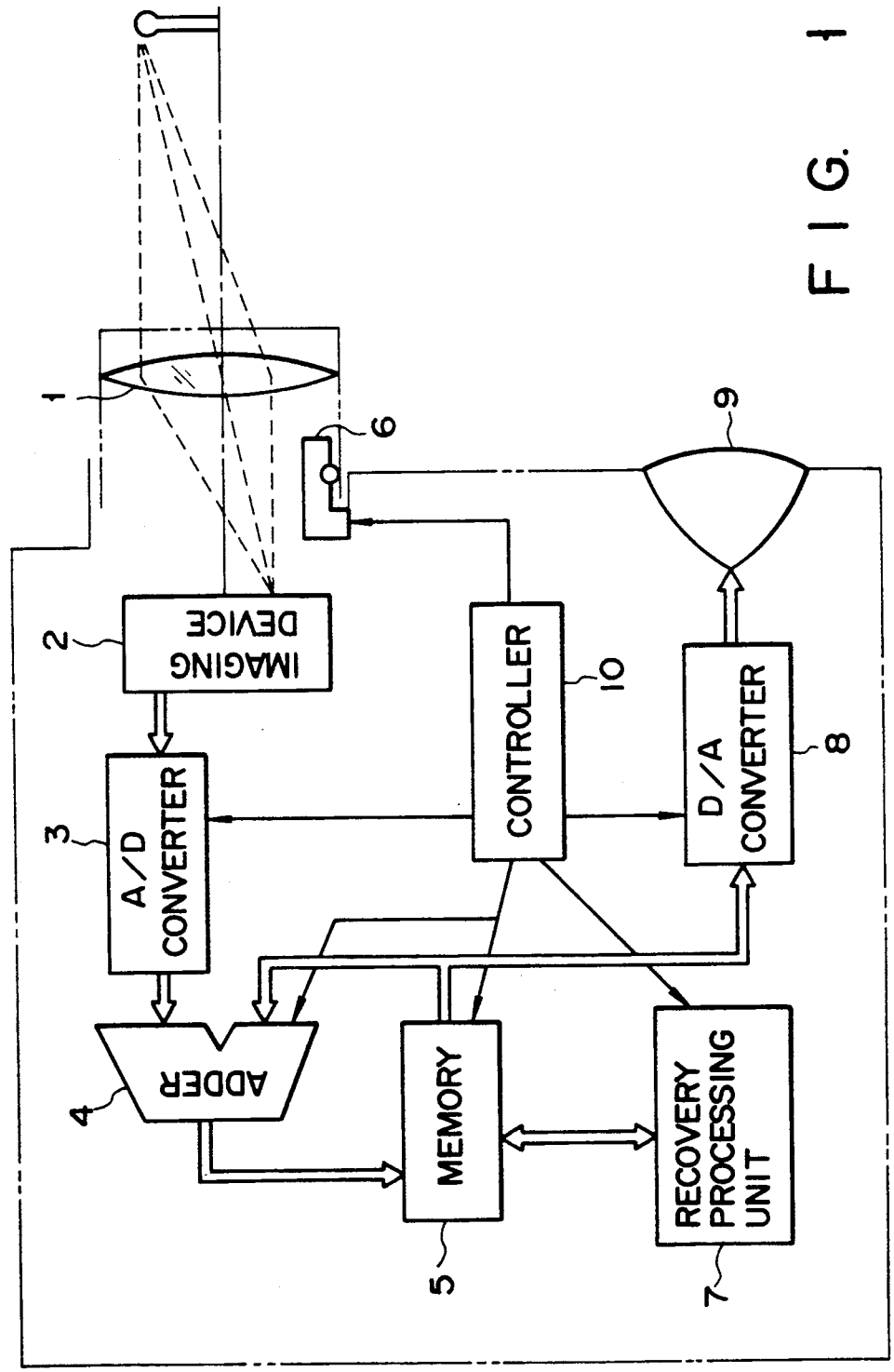

FIG. 1 is a view showing an arrangement of a first embodiment of the present invention. An object image is focused by a lens 1 on a light-receiving portion of an imaging device 2 constituted by a Charge-Coupled Device (to be referred to as a CCD hereinafter), an imaging tube, or the like. An input optical system normally comprises a combination of a plurality of lenses. For illustrative convenience, only one lens is shown in FIG. 1. An output signal from the imaging device 2 is converted into a digital signal by an analog-to-digital converter (to be referred to as an A/D converter hereinafter) 3. The digital signal is added by an adder 4 to an image signal recorded in a memory 5. The sum is stored in the memory 5 again. The above operations are performed under the condition that an in-focus position of the optical system is repeatedly performed while the lens 1 is being moved by an in-focus position controller 6. That is, the above operations are performed such that the in-focus position of the optical system is discretely changed at proper intervals within a distance range. The input images are added, and the sum is stored in the memory 5.

The sum image is subjected to appropriate recovery processing by a recovery processing unit 7. For example, high-pass filtering or band-pass filtering is performed for the sum image with respect to, e.g., a spatial frequency. The processed result is stored in the memory 5 again. The recovery-processed image signal stored in the memory 5 is converted into an analog signal by a Digital-to-Analog converter (to be refereed to as a D/A converter hereinafter) 8. The analog signal is then displayed on a display monitor 9. The control of timings and signal flows in the above operations is performed by a controller 10.

As a means for changing an in-focus position of the optical system, the imaging device 2 may be moved while the lens system may be stationary. The recovery processing unit 7 may directly output a recovery processing result to the D/A converter 8 by employing a pipelined processing scheme. The sum image stored in the memory 5 may be stored in another recording medium such as a floppy disk, a magnetic tape, or an optical memory, an image signal recorded in this external recording medium may be read out and subjected to recovery processing, and the recovery-processed image may be then displayed. In other words, the image recording and the image reproduction unit may be off-line connected through a recording medium.

The first embodiment having the above arrangement has the following effect. That is, according to this embodiment, the images having different in-focus positions are discretely input, and at the same time, are added to each other. Therefore, processing can be performed with a relatively simple arrangement. In addition, the input and addition operations of the images can be performed at high speed.

Second Embodiment

Figure 2:
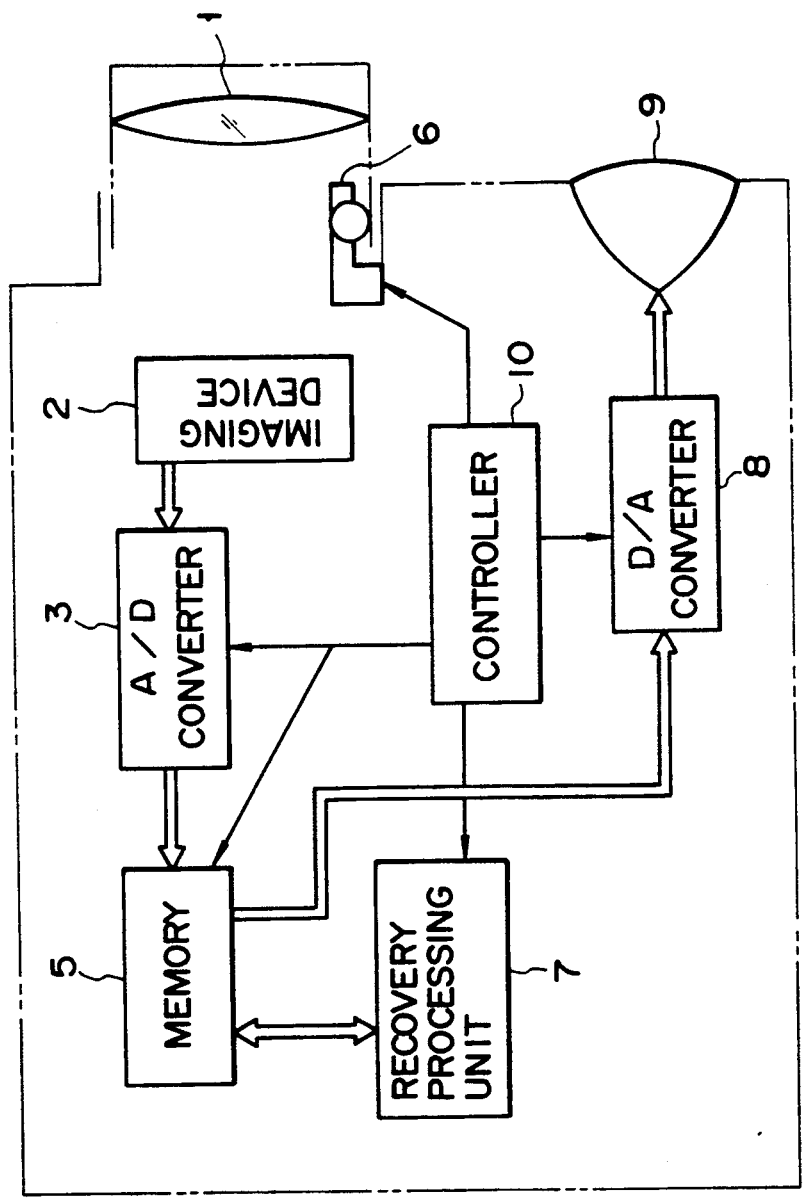

FIG. 2 is a view showing an arrangement of a second embodiment of the present invention. In this embodiment, a focal position is continuously changed by an in-focus position controller 6 within a predetermined distance range. At the same time, images focused on the light-receiving portion (more specifically, a light-receiving surface of a photosensor of a solid-state imaging device or an imaging tube) of the imaging device 2. The image stored in the imaging device 2 is converted into a digital signal by an A/D converter 3 and is stored in a memory 5. Appropriate recovery filtering of the digital signal is performed by a recovery processing unit 7. The recovery-processed signal is stored in the memory 5 again. The recovery-processed signal stored in the memory 5 is converted into an analog signal by a D/A converter 8. The analog signal is displayed on a display monitor 9. Control of timings and data flows in the above operations is performed by a controller 10.

The second embodiment having the above arrangement has the following effect. That is, according to this embodiment, the accumulation effect of light energy of the imaging device 2 itself is utilized to continuously input images having different in-focus positions and at the same time, these images are stored. Therefore, the input and storage operations of the images can be simultaneously performed by the imaging device 2 itself. The arrangement of the apparatus can be simplified, and high-speed processing can be performed. Since the focal point is continuously changed within the appropriate distance range, control of the focal positions can be simplified.

Third Embodiment

Figure 3:
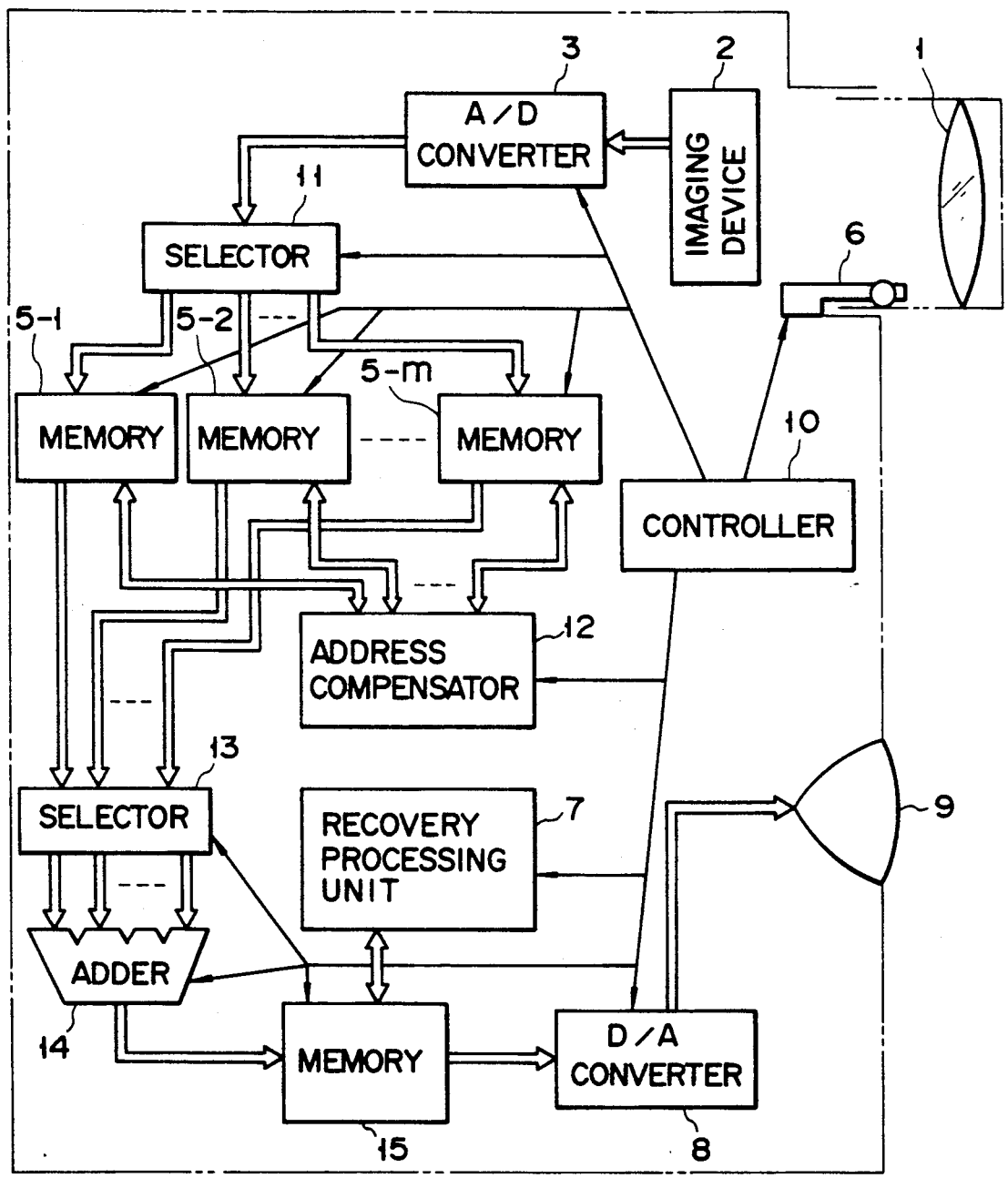

FIG. 3 is a view showing an arrangement of a third embodiment of the present invention. In this embodiment, an image focused by a lens 1 is converted into an image signal by an imaging device 2. The image signal is then converted into a digital signal by an A/D converter 3. The digital signal is stored in a predetermined one of memories 5-1 to 5-m by a selector 11. The above operations are repeatedly performed while the lens 1 is moved by an in-focus position controller 6. That is, the above operations are discretely performed to change the in-focus positions at predetermined intervals within a predetermined distance range. The input n (n≦m) images are respectively stored in the n memories of the memories 5-1 to 5-m. An address compensator 12 performs magnification correction and correction of positional errors of the images stored in the memories 5-1 to 5-m. The correction results are stored in the memories 5-1 to 5-m again. The address-corrected image signals stored in the memories 5-1 to 5-m are selected by a selector 13. That is, of the _images stored in the memories 5-1 to 5-m, k (k≦n) images which satisfy a predetermined condition are selected. The k selected images are added to each other by an adder 14. The sum image signal from the adder 14 is recorded or stored in a memory 15. The image signal recorded in the memory 15 is then subjected to proper recovery filtering by a recovery processing unit 7. The recovery filtered signal is then stored in the memory 15 again. The recovery-processed image stored in the memory 15 is converted into an analog signal by a D/A converter 8, and the analog signal is displayed on a display monitor 9. The control of timings and data flows, and setting of the selectors 11 and 13 in the above operations is performed by a controller 10.

The original image signals stored in the memories 5-1 to 5-m may be stored in another recording medium and may be subjected to address correction, additions, recovery processing, and the like upon read access of the recorded image signal. The resultant images may be displayed. That is, the image recording and image reproduction units may be off-line connected through the recording medium.

The third embodiment having the above arrangement has the following effect. That is according to this embodiment, a plurality of images having different in-focus positions are stored, and desired images of these images are selected and synthesized. Therefore, the third embodiment has an advantage in that an image having an in-focus state on any portion of the object can be reproduced. In addition, the address compensator 12 corrects differences in magnifications caused by different defocus amounts, vibrations at the time of image input, and positional errors caused by motion of an object. Therefore, the apparatus can be used in a variety of applications. The address compensator 12 performs, e.g., local matching between the images, thus performing positioning. According to this embodiment, therefore, focal depths and in-focus portions of the images can be arbitrarily set. The apparatus of this embodiment is very effective for addition processing an a change in magnification. In addition, even if positional errors occur during image inputs and between the images due to motion of the object, the reproduced image is not adversely affected by these positional errors. Therefore, the apparatus of this embodiment can be used in a variety of applications.

Fourth Embodiment

Figure 4:
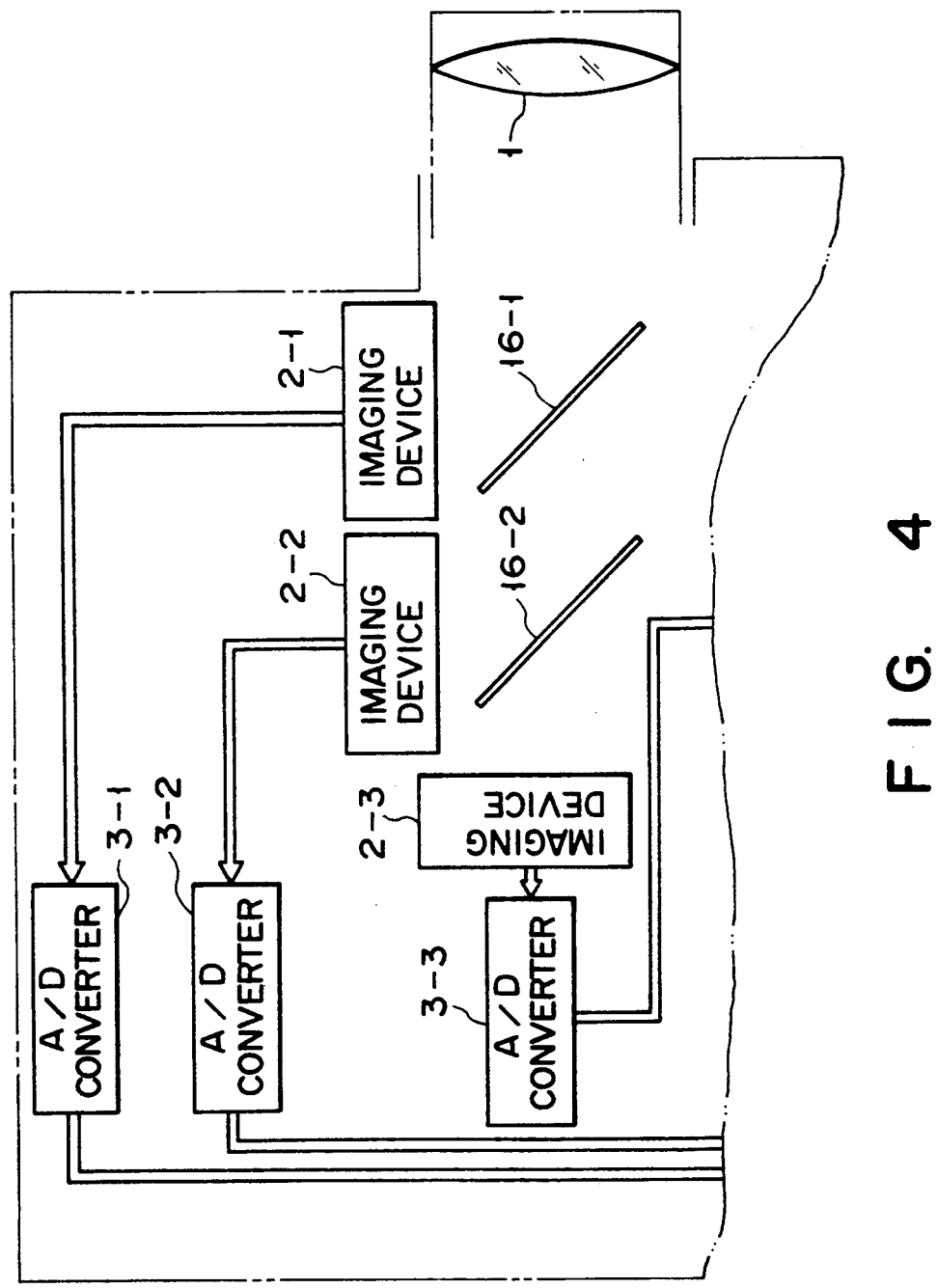

FIG. 4 is a view showing an arrangement of a fourth embodiment of the present invention. In this embodiment, half mirrors 16—1 and 16—2 are arranged behind a lens 1 in an image input optical system. For example, three imaging devices 2—1, 2—2, and 2—3 are arranged to differentiate distances from the lens 1. The image signals from the imaging devices 2—1, 2—2, and 2—3 are converted into digital signals by A/D converters 3—1, 3—2, and 3—3, respectively. Other arrangements of this embodiment are the same as those of the first and third embodiment, and a detailed description and an illustration thereof will be omitted.

It should be noted that the positions of the imaging devices 2—1 to 2—3 may be variable to set variable distances to the object.

The fourth embodiment having the above arrangement has the following effect. In this embodiment, a plurality of images focused on different planes are input, and the plurality of images having different in-focus positions can be simultaneously input. Therefore, the change in in-focus position, i.e., a mechanical operation, can be omitted. In addition, the application range of the resultant apparatus can be widened due to its arrangement.

Fifth Embodiment

Figure 5:
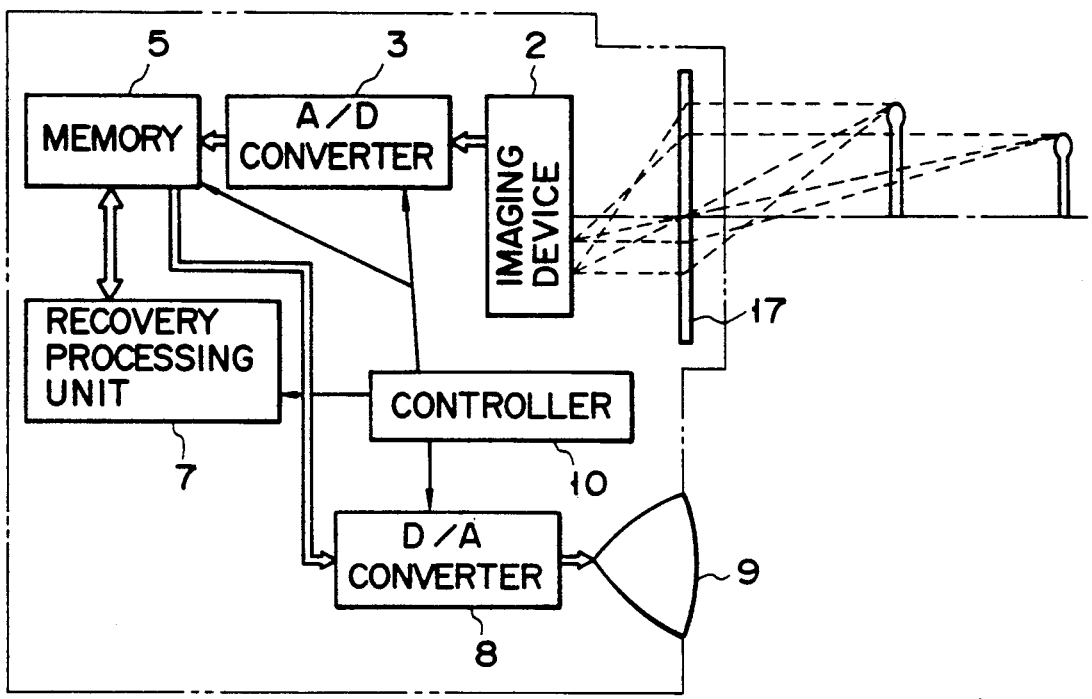

FIG. 5 is a view showing an arrangement of a fifth embodiment of the present invention. In this embodiment, a Fresnel zone plate 17 designed to perform focusing at a plurality of in-focus positions is arranged in an image input optical system, and a plurality of images focused on a plurality of object planes are simultaneously input to an imaging device 2. An actual input optical system includes a plurality of lenses in addition to the Fresnel zone plate 17. However, for illustrative convenience, these lenses are omitted, and only the Fresnel zone plate 17 is illustrated. An image signal from the imaging device 2 is converted into a digital signal by an A/D converter 3, and the digital signal is stored in a memory 5. The image stored in the memory 5 is subjected to proper recovery filtering by a recovery processing unit 7. The recovery-filtered image is stored in the memory 5 again. The recovery-filtered image stored in the memory 5 is converted into an analog signal by a D/A converter 8. The analog signal is displayed on a display monitor 9. The control of timings and data flows in the above operations is performed by a controller 10.

The in-focus position controller 6 may be added to the arrangement of FIG. 5 to compensate the in-focus positions, and the same processing as in the first to third embodiments may be performed for the input images.

Figure 6:
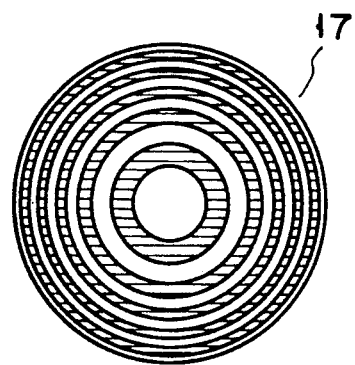

The fifth embodiment having the above arrangement has the following effects. In this embodiment, the Fresnel zone plate 17 designed to focus light on the plurality of focal positions is used together with lenses (not shown). A plurality of focused images are simultaneously formed on the plurality of object planes and are simultaneously input to the imaging device 2, thereby equivalently adding the the images. FIG. 6 is a front view of the Fresnel zone plate 17 designated to focus light on the plurality of focal positions. In the Fresnel zone plate 17, ring-like zones (Fresnel zones) having identical areas are formed, and opaque rings are every other rings. The Fresnel zone plate 17 has the same function as a lens having focal lengths of $\pm f_0 = r^2\lambda$ (where $r_1$ is a radius of the central portion of the Fresnel zone plate 17 and $\lambda$ is a wavelength of light). Therefore, when the Fresnel zone plate 17 is combined with a focusing lens, a plurality of focal lengths can be obtained. A plurality of images can be focused on a plurality of object planes having different distances while the Fresnel lens plate 17 is kept fixed. Theoretically, one Fresnel zone plate 17 has focal lengths of $\pm f_0/3$, $\pm f_0/5$, ... in addition to $\pm f_0$. In practice, an intensity of light focused on the focal points $\pm f_0$ is high, and an effect of other focal points is weak. In addition, the original focal length of the lens is preserved by nondiffracted light. When a Fresnel lens is designed such that a phase of light transmitted therethrough is delayed by $\pi$ in place of formation of every other opaque rings, the positions of $\pm f_0$ are kept unchanged, but an intensity of light focused thereat can be increased. The original focal position of the plate disappears. When a phase difference is appropriately selected, three focal points, i.e., $\pm f_0$ and the original focal position of the plate, can be obtained. The Fresnel zone plate is strictly operated at a specific wavelength. When the wavelength is properly selected to be about a central wavelength ($\lambda = 550$ nm) of visible light, an influence of chromatic aberration is not greatly increased. The zones having a predetermined phase difference can be formed by vacuum-depositing a transparent thin film such as an $MgF_2$ thin film.

According to this embodiment, a plurality of images can be focused on the plurality of object planes by using only one optical element without performing a mechanical operation for changing a focal position, and therefore the plurality of images can be input and added to each other to obtain a synthesized image. Therefore, the arrangement of the apparatus can be extremely simplified, and the apparatus can withstand blurring caused by motion of an object or the like.

Sixth Embodiment

FIG. 7 is a view showing an arrangement of a sixth embodiment of the present invention. In this embodiment, an optical element, i.e., a lens 18 designed to intentionally cause chromatic aberration in the image input optical system is arranged. An imaging device 2 comprises a monochromatic imaging tube or a solid-state imaging device having a sensitivity range within the entire spectral range of the visible light. With the above arrangement, the images focused on different positions can be simultaneously formed by wavelengths of light, and the images are input and added by the imaging device 2. Other arrangements of the sixth embodiment are the same as those of the fifth embodiment.

A band-pass color filter may be arranged in front of the imaging device 2 to input and record images o different wavelength ranges, and address correction, focal depth adjustment, and the like may be performed with the same arrangement as in the fourth embodiment.

The sixth embodiment having the above arrangement has the following effect. In this embodiment, the reflected light spectrum of a general object is distributed in a wide range almost corresponding to the entire range of visible light. This embodiment utilizes strong correlation between images at the respective wavelengths. That is, the optical element is used to intentionally provide chromatic aberration, and the images focused at the different positions in units of wavelengths are formed. These images are the input to the imaging device 2, and the addition can be equivalently performed. Therefore, the images focused at the plurality of positions can be input and added by using only one optical element having a large chromatic aberration value without using a mechanical operation for changing the in-focus position. The arrangement can be extremely simplified, and the resultant apparatus can withstand blurring caused by motion of an object or the like.

A detailed arrangement of the recovery processing unit 7 used in the first to sixth embodiments of the present invention will be described below. The recovery processing unit 7 is a unit for performing appropriate bypass or band-pass filtering of the sum of the images having different in-focus positions with respect to the spatial frequency.

FIG. 8 is a block diagram showing a detailed arrangement of the recovery processing unit 7. The sum of the images having different in-focus positions and stored in the memory 5 is subjected to two-dimensional Fourier transform by an FFT arithmetic element 20 in the recovery processing unit 7. An arithmetic result is stored in a memory 21. A filter factor or coefficient properly determined on a spatial frequency plane is stored in a memory 22. The spatial frequency spectrum stored in the memory 21 is multiplied by a multiplier 23 with a filter coefficient stored in the memory 22. A product from the multiplier 23 is stored in the memory 21 again. The filtered spatial frequency image recorded in the memory 21 is then subjected to two-dimensional inverse Fourier transform by the FFT arithmetic element 20. The result is stored in the memory 5. With this arrangement, the filter characteristic curve on the spatial frequency plane can be arbitrarily determined.

FIG. 9 is a block diagram showing another detailed arrangement of the recovery processing unit 7. Of all the image sums of the images having different in-focus positions and stored in the memory 5, a pixel component value designated by an address generator 30 in the recovery processing unit 7 is input to a multiplier 32. At the same time, a coefficient stored in a memory 31 and designated by the address generator 30 is input to the multiplier 32. The multiplier 32 multiplies the pixel component value with the coefficient. A product from the multiplier 32 is added by an adder 33 to a value stored in a memory 34. The sum is stored in the memory 34 again. With the above arrangement, a "convolution operation" in a local area, e.g., $3 \times 3$ pixels or $5 \times 5$ pixels in the image is performed. The arithmetic result is then stored in the memory 5 again.

In this arrangement, the "convolution operation" with a matrix appropriately designed on an image surface is performed in place of filtering on the spatial frequency plane, thereby performing recovery processing. Therefore, according to this arrangement, processing can be performed in a simple circuit arrangement. When an effective filter can be designed at a small matrix size, the number of arithmetic operations can be advantageously reduced.

In addition, a pipelined processor may be used to perform a high-speed operation as an arrangement for performing masking on the screen.

A method of designing a recovery filter will be described below. First, the method of designing a recovery filter by simulation will be described In general, the spatial characteristics of an incoherent focusing optical system are expressed by an Optical Transfer Function (to be referred to as an OTF hereinafter) given by auto-correlation of a pupil function. If an aperture is given as a circular aperture, an OTF on the focused plane can be expressed by an auto-correlation (2) of a pupil function given by equation (1):

$$P(x,y) = P(r,\theta) = P(r) \quad (1)$$

$$= \begin{cases} 1 \sqrt{x^2 + y^2} = r \leq a_0 \\ 0 \sqrt{x^2 + y^2} = r > a_0 \end{cases}$$

where (x,y) is a coordinate axis when the pupil plane is expressed by an orthogonal coordinate system, and $(r,\theta)$ is a radial component and an angular component when the pupil plane is expressed by a cylindrical coordinate system.

$$H(u,v) = \left[ \int_{-\infty}^{\infty} \int_{-\infty}^{\infty} P(x + \lambda f u/2, y + \lambda f v/2) \cdot \right. \quad (2)$$

$$\left. P(x - \lambda f u/2, y - \lambda f v/2) dx dy \right] \Big/ \int_{-\infty}^{\infty} \int_{-\infty}^{\infty} P(x,y) dx dy$$

where $a_0$ is a pupil size, which may be assumed as, e.g., a radius of a lens aperture. When the aperture is a circular, $\theta$ can be omitted since no angular direction involves in the calculations. An OTF for a focal point error is represented by an auto-correction of the general pupil function, as given by equation (3):

$$P(x,y) = P(r,\theta) \\ = P(r)\exp[jkW(r;z)] \quad (3)$$

where $k=2\pi/\lambda$ is the number of waves; W(r;z) is wave surface aberration which is represented by a difference between a wave surface W1 of light focused on a given object plane and a wave surface W2 which has a defocus amount on a pupil plane; and z represents coordinates on the optical axis, which represent a defocus amount from a focal position when an in-focus position is given as z=0. The wave surface aberration W(r;z) can be approximated in a paraxial area as follows:

$$W(r;z) = r^2 \cdot z/(2 \cdot f^2) \quad (4)$$

When a lens aperture is large, the wave surface aberration can be expressed as follows:

$$W(r;z) = r^2 \cdot z/[2(f^2 + r^2)] \quad (5)$$

where f is a focal length of the lens. In this case, $f >> z$ is assumed.

FIG. 10 is a view showing a geometric relationship described above. An OTF for a given defocus amount z can be obtained.

Figure 11A:
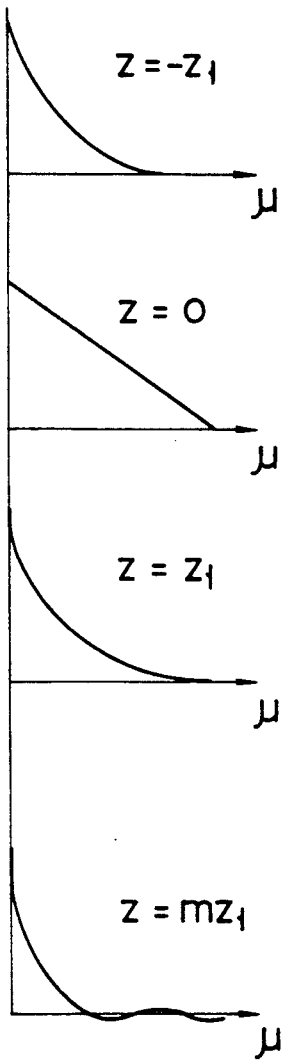
FIGS. 11A to 11D are views showing operational procedures associated with a method of designing the recovery filter.
Figure 11B:
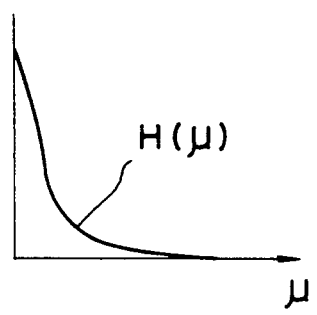
Figure 11C:
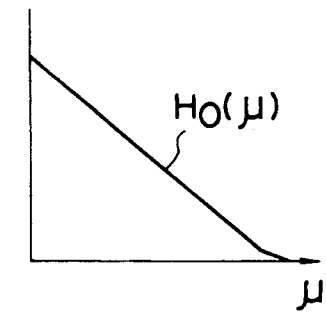

FIGS. 11A to 11D are views showing operational procedures for obtaining a recovery filter on the basis of the obtained OTF. The value z is changed on the basis of the preset conditions to obtain OTFs shown in FIG. 11A. These OTFs are added to each other to obtain a composite OTF shown in FIG. 11B. A recovery filter is designed such that the composite OTF becomes an OTF obtained for a correct focal point, as shown in FIG. 11C. When an OTF for a correct focal point is given as $$H(u,v) = H(\mu,\phi) = H(\mu)$$

and an OTF for an incorrect focal point is given as $H_0(\mu)$, a recovery filter $V(\mu)$ is expressed as follows:

$$V(\mu) = H_0(\mu)/H(\mu) \quad (6)$$

Figure 11D:
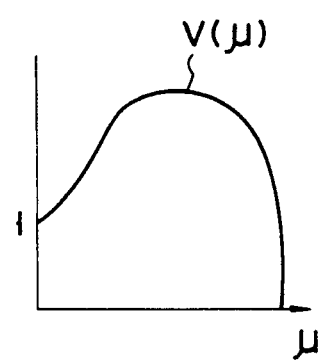

FIG. 11D shows the recovery filter $V(\mu)$. (u,v) are spatial frequency coordinates expressed by an orthogonal coordinate system, $(\mu,\phi)$ are spatial frequency coordinates expressed by a cylindrical coordinate system. When the aperture is circular, only radial spatial frequency $\mu$ is used since the calculations do not depend on the angular direction.

When an object can be limited to some extent, the statistical nature of the image can be predicted, and the nature of noise is also known, a Wiener filter can be used as a recovery filter. Influences of noise can be reduced by using the following Wiener filter:

$$W(\mu) = [H_0(\mu) \cdot [H(\mu)|^2]/H(\mu)\{|H(\mu)|^2 + Snn(\mu)/Sgg(\mu)\}] \quad (7)$$

where $Snn(\mu)$ is a power spectrum of noise, and $Sgg(\mu)$ is a power spectrum of an image. The following filter may be defined as a pseudo Wiener filter, and a parameter P may properly set:

$$W(\mu) = [H_0(\mu) \cdot |H(\mu)|^2]/[H(\mu)\{|H(\mu)|^2 + P\}] \quad (8)$$

A method of experimentally obtaining a recovery filter will be described below. A test chart having a sufficiently flat surface is placed at a predetermined position, and images are input in preset conditions while the in-focus position is changed. The input images are then added. An image focused on the surface of the test chart is input. The sum of the images input while the in-focus position is changed is filtered by an appropriate recovery filter. The filtered image is compared with the image focused on the test chart. The recovery filter is adjusted to equalize the sum image and the image focused on the test chart, and these images are compared with each other again. These operations are repeated to obtain a proper recovery filter. This method is very effective and practical.

The methods of obtaining recovery filters by simulation and an experiment have been described above. The recovery filter need not recover the frequency characteristics corresponding to the in-focus state. For example, the recovery filter may be operated to emphasize, e.g., a high-frequency component to obtain better contrast. To the contrary, the recovery filter may be operated to obtain an image having a good soft focus effect.

Seventh Embodiment

Figure 12:
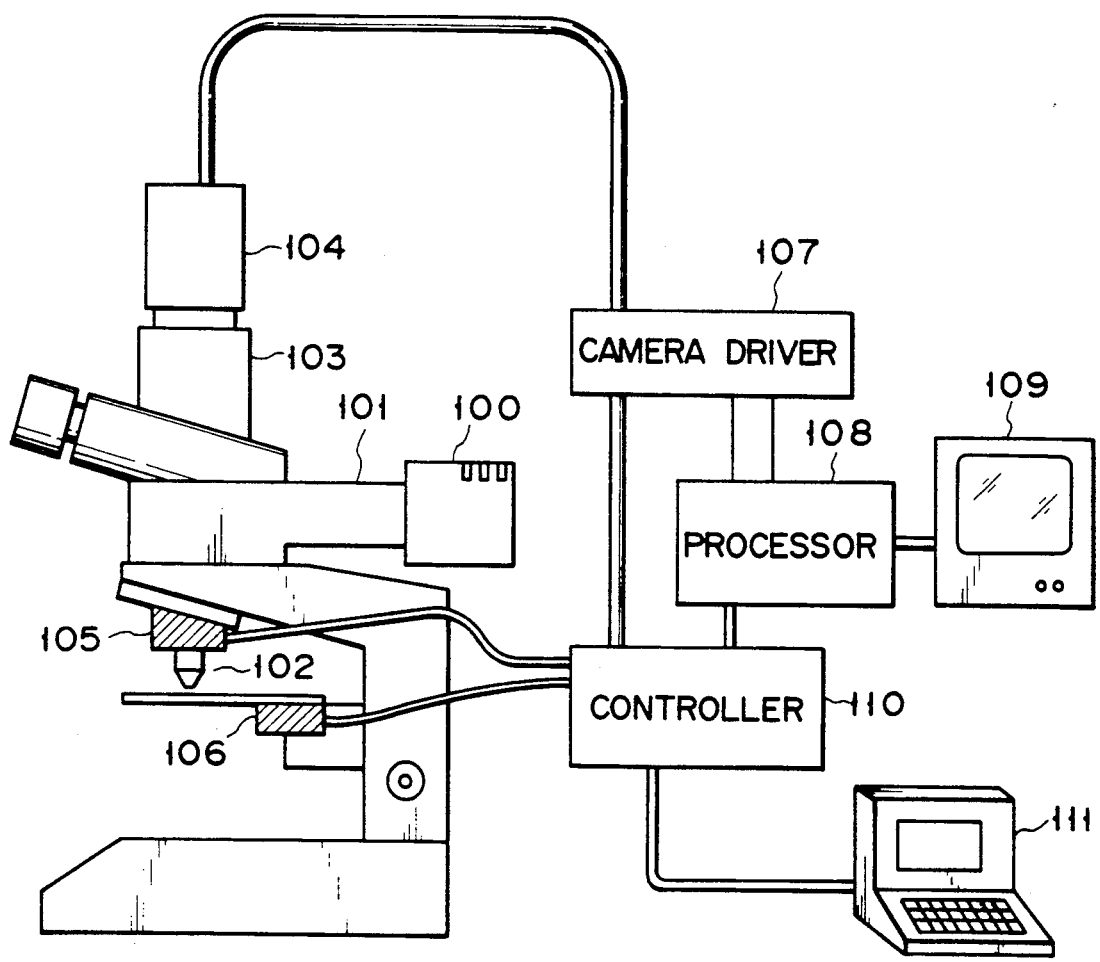

FIG. 12 is a view showing an arrangement of the seventh embodiment of the present invention. This embodiment exemplifies an application in which the present invention (particularly the second embodiment) is applied to a reflection microscope. As shown in FIG. 12, light emitted from an illumination source 100 is guided by downward illumination equipment 101 and is incident on the surface of a sample through an objective lens 102. An image of light reflected by the sample is focused by the objective lens 102 and is imaged by a TV camera 104 arranged on the upper end of a lens barrel 103. In this case, an in-focus plane for the sample is continuously changed by a focus level driver 105 within a preset period of time. The image inputs during this period are accumulated in a light-receiving element of the TV camera 104. The sample is moved by an X-Y stage controller 106 in the X and Y directions. The images stored within the preset period of time are read by a reader in the TV camera 104 and is transferred to a camera driver 107 as an electrical signal. The camera driver 107 also controls power supply or the like of the TV camera 104. An image signal transferred to the camera driver 107 is supplied to a processor 108. The processor 108 includes an A/D converter, an image memory, a recovery processing unit, and a D/A converter. The processor 108 performs proper recovery processing of the image signal. The processed result is supplied to a TV monitor 109 and displayed on it. The above operations are repeatedly performed for different portions of the sample under control of the X-Y stage controller 106, and the processed results are sequentially displayed. The microscope of this embodiment is entirely controlled by a controller 110, and conditions are input by an observer through a man-machine interface 111.

According to this embodiment, synthesis of images having large focal depths can be relatively easily performed while the resolution and luminance of the object are kept maintained on the microscope. When a very small structure is to be observed with a microscope, an objective lens having a high magnification must be used. In general, the higher the magnification becomes, the larger the N.A (numerical aperture) becomes and the smaller the focal depth becomes. In this case, this embodiment can be employed as an effective method of displaying an image having a small focal depth. In particular, when the focus level driver 105 and the processor 108 can be operated at high speed, an image can be displayed in real time, thus providing a more practical apparatus. The arrangement of the present invention can be used in a variety of applications for observing various types of objects in many fields of mining, paper, fiber, living organism industries in addition to testing of ICs and LSIs.

This embodiment exemplifies an application of a reflection microscope. However, the present invention is also applicable to a transmission microscope, a fluorescent microscope, and the like. An adder may be arranged in the processor 108 to input and add the images in the same manner as in the first embodiment of the present invention.

Eighth Embodiment

Figure 13A:
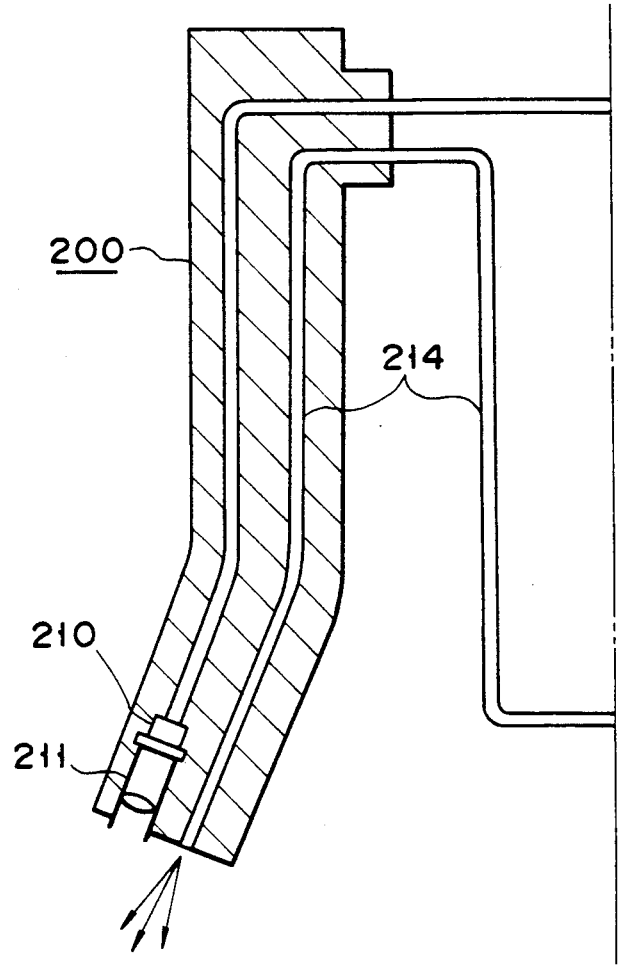
FIGS. 13A to 13C are views showing an arrangement of an eighth embodiment.
Figure 13B:
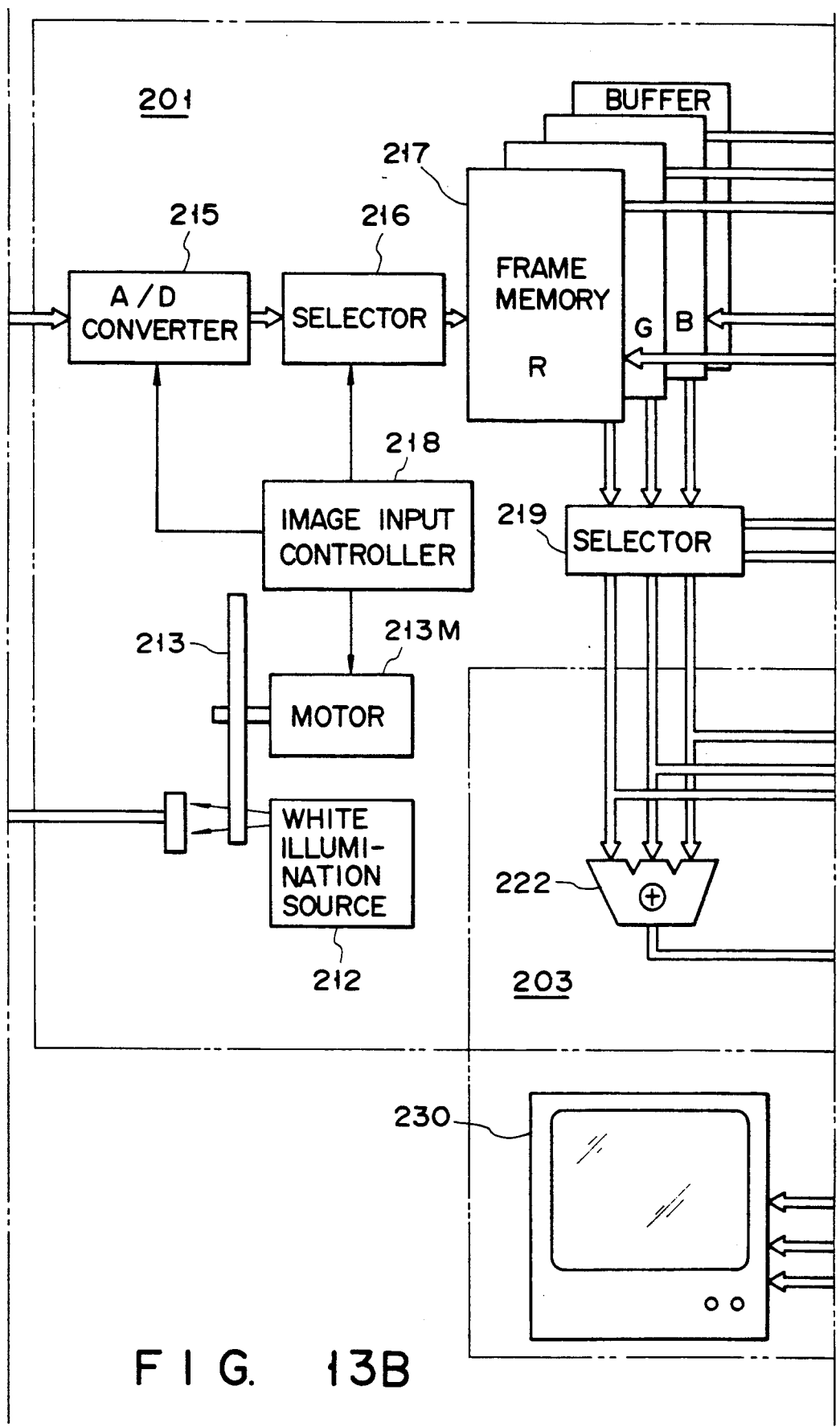
Figure 13C:
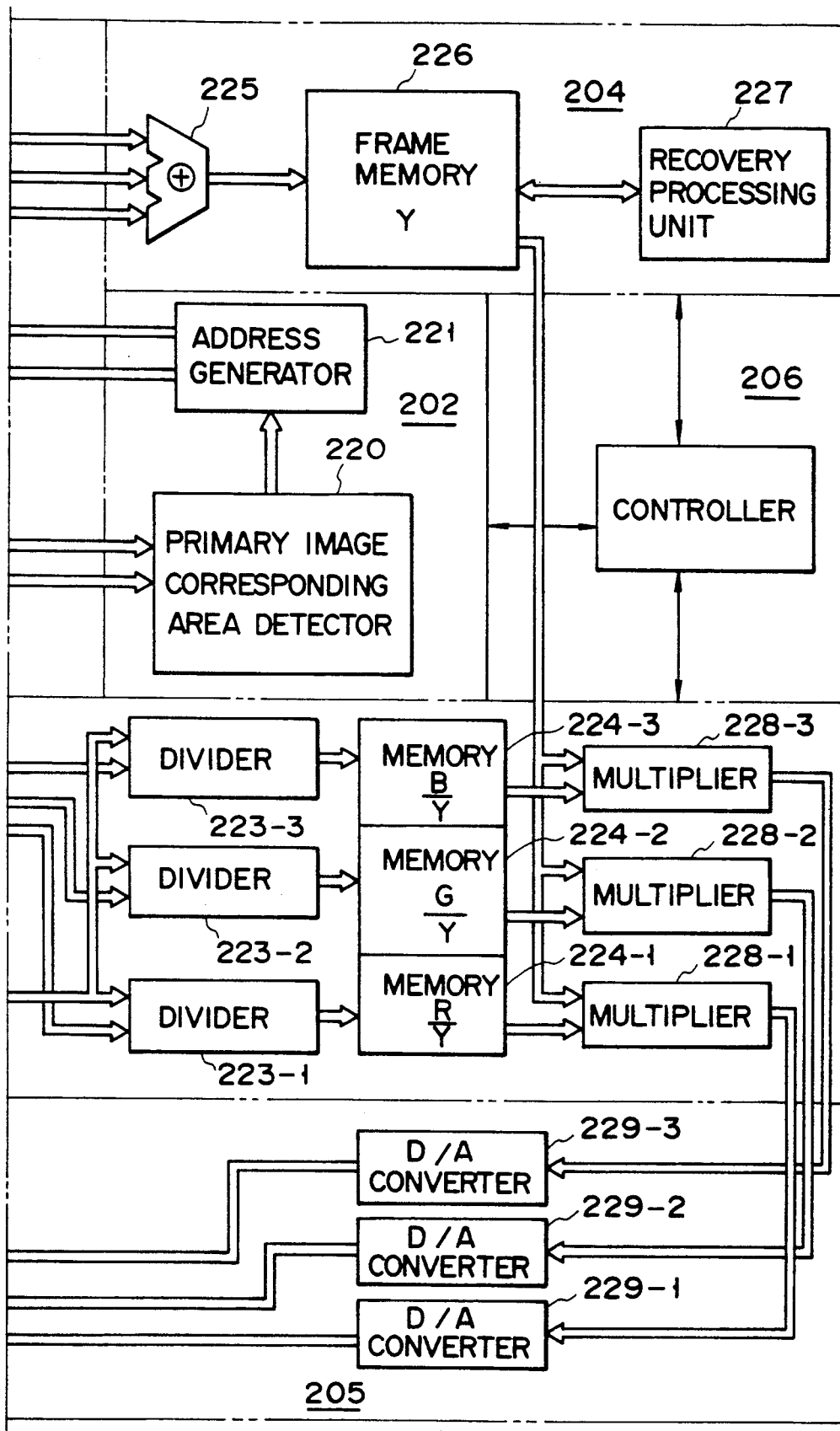

FIGS. 13A to 13C are views showing an arrangement of an eighth embodiment of the present invention. This embodiment exemplifies an application in which the present invention is applied to a surface sequential electronic endoscope. As shown in FIGS. 13A to 13C, the apparatus mainly comprises an endoscope probe 200, an image input unit 201, a color misregistration correction unit 202, a color information recorder 203, a focal depth increasing unit 204, an image display unit 205, and a controller 206.

A monochromatic solid-state imaging device such as a CCD is mounted at the distal end of the endoscope probe 200 and picks up an image focused by the objective lens in an in-focus position controller 211. In this case, illumination light is emitted as follows. Light from a white illumination source 212 such as a Xe lamp arranged in the image input unit 201 passes through a rotary color filter 213 and is guided to the endoscope probe 200 through a light source 214 of an optical fiber or the like. The light is then output from the distal end of the probe.

Figure 14:
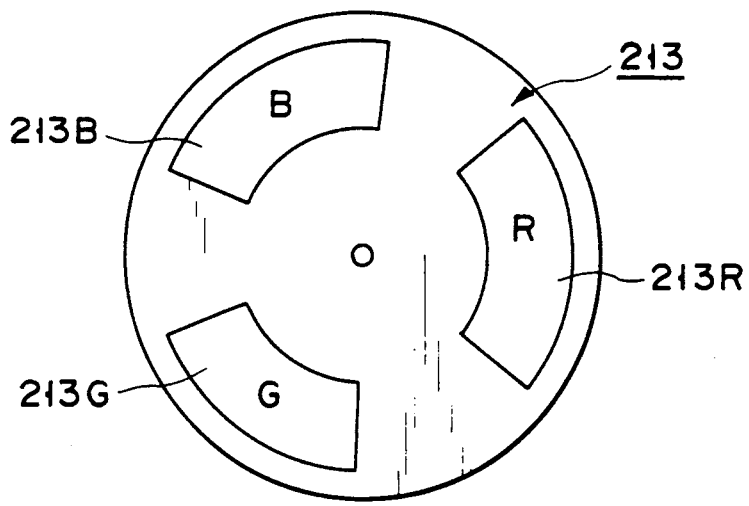

FIG. 14 is a plan view showing a structure of the rotary color filter 213. As shown in FIG. 14, red (R), green (G), and blue (B) spectrum transmission filter elements 213R, 213G, and 213B are intermittently arranged in an angular direction.

Referring back to FIGS. 13A to 13C, the rotary color filter 213 is driven by a motor 213M in the image input unit 201 to sequentially change the illumination beams in an order of R, G, and B. For this reason, the imaging device 210 images as a monochromatic image the object illuminated with the beams having the above colors. An output image signal from the imaging device 210 is converted into a digital signal by an A/D converter 215 in the image input unit 201, and the digital signals are stored in corresponding areas in a frame memory 217 by a selector 216 in units of color components, i.e., R, G, and B. The above operations are controlled by an image input controller 218. Of the primary color images sequentially stored in the corresponding areas of the frame memory 217, the R and G components or the G and B components are selected by another selector 219. The output signals from the selector 219 are supplied to the color misregistration correction unit 202 and input to a primary image corresponding area detector 220. The misregistration amount of the R or B image with respect to the G image is locally detected by the detector 220. An address generator 221 generates an address signal for correcting the R and B images on the basis of the misregistration amount calculated by the detector 220. The address signal is supplied to the frame memory 217. The frame memory 217 corrects the R and B images by using the address signal and a buffer memory.

One color image thus obtained is supplied to the color information recorder 203 through the selector 219. The color image supplied to the color information recorder 203 is added to the respective color components by an adder 222, thereby calculating a luminance value $Y = R + G + B$. The color component values R, G, and B values are divided by the luminance value Y by dividers 223-1 to 223-3. Quotients R/Y, G/Y, and B/Y are stored in memories 224-1 to 224-3, respectively.

The R, G, and B images stored in the frame memory 217 in the image input unit 201 are supplied to the focal depth increasing unit 204 and are added to each other by an adder 225. The sum is stored in a frame memory 226. The image stored in the frame memory 226 is subjected to recovery filtering processing by a recovery processing unit 227. A processing result from the recovery processing unit 227 is stored in the frame memory 226 again. The recovery-processed image signal stored in the frame memory 226 is supplied to the color information recorder 203.

The image signal supplied to the color information recorder 203 and the color information stored in the memories 224-1 to 224-3 are multiplied by multiplier 228-1 to 228-3 in units of color components. Products from the multipliers 228 1 to 228-3 are supplied to the image display unit 205.

The signals supplied from the multipliers 228-1 to 228-3 to the image display unit 205 are converted into analog signals by D/A converters 229-1 to 229-3. The analog signals are displayed on a TV monitor 230. The image processing and display units are controlled by the controller 206.

This embodiment utilizes strong correlation between the three primary color images (R, G, and B) and image defocusing which mostly depends on the luminance of the color information. When the present invention is applied to a surface sequential electronic endoscope, images having different in-focus positions in units of primary color images are input and added, and the synthesized image is subjected to the recovery processing.

An operation of this embodiment will be described below. R, G, and B color images are sequentially input by the image input unit 201. In this case, when the object and the endoscope probe 200 itself are abruptly moved, the relative positions of the respective primary images are deviated from each other, thus causing so-called color misregistration. The color misregistration correction unit 202 obtains the misregistration amounts of the R and B images with respect to the G image by calculating matching values of the local and partial images. The R and B images are corrected on the basis of the color misregistration amounts. A color image at a given preset in-focus position is input by the above method. In this state, the R, G, and B values are normalized by the luminance value $Y = R + G + B$ by the color information recorder 203. The resultant data R/Y, G/Y, and B/Y are recorded. When a plurality of primary color images having different in-focus positions are input, these images are subjected to color misregistration correction and are then added to each other. The sum of the image data is then subjected to recovery processing, thereby obtaining an image having a luminance Y' and a large focal depth. Finally, the Y' image is multiplied with the color data R/Y, G/Y, and B/Y to obtain a color image having a large focal depth.

This embodiment has an advantage in that the image having a large focal depth can be relatively easily arranged in an endoscope image. An objective lens having a large numeral aperture can be used, and therefore the power of the illumination source can be reduced. In addition, when the above objective lens is used, optical storage time of the imaging device can be shortened, thereby minimizing the color misregistration influences.

The following modification of the above embodiment can be proposed. R, G, and B images sequentially input are added to the synthesized image stored in the frame memory 226. In this manner, images having three or more different in-focus positions may be used to obtain an image having a large focal depth. In this case, a positional deviation between the image recorded in the frame memory 226 and the new input G image is corrected by the color misregistration correction unit 202. If an image input can be performed at high speed and color misregistration is negligible, the color misregistration correction unit 202 need not be arranged. Furthermore, the respective primary color images are input and added in the same manner as in the first or second embodiment to obtain an image having a large focal depth in units of primary color components.

Ninth Embodiment

Figure 15:
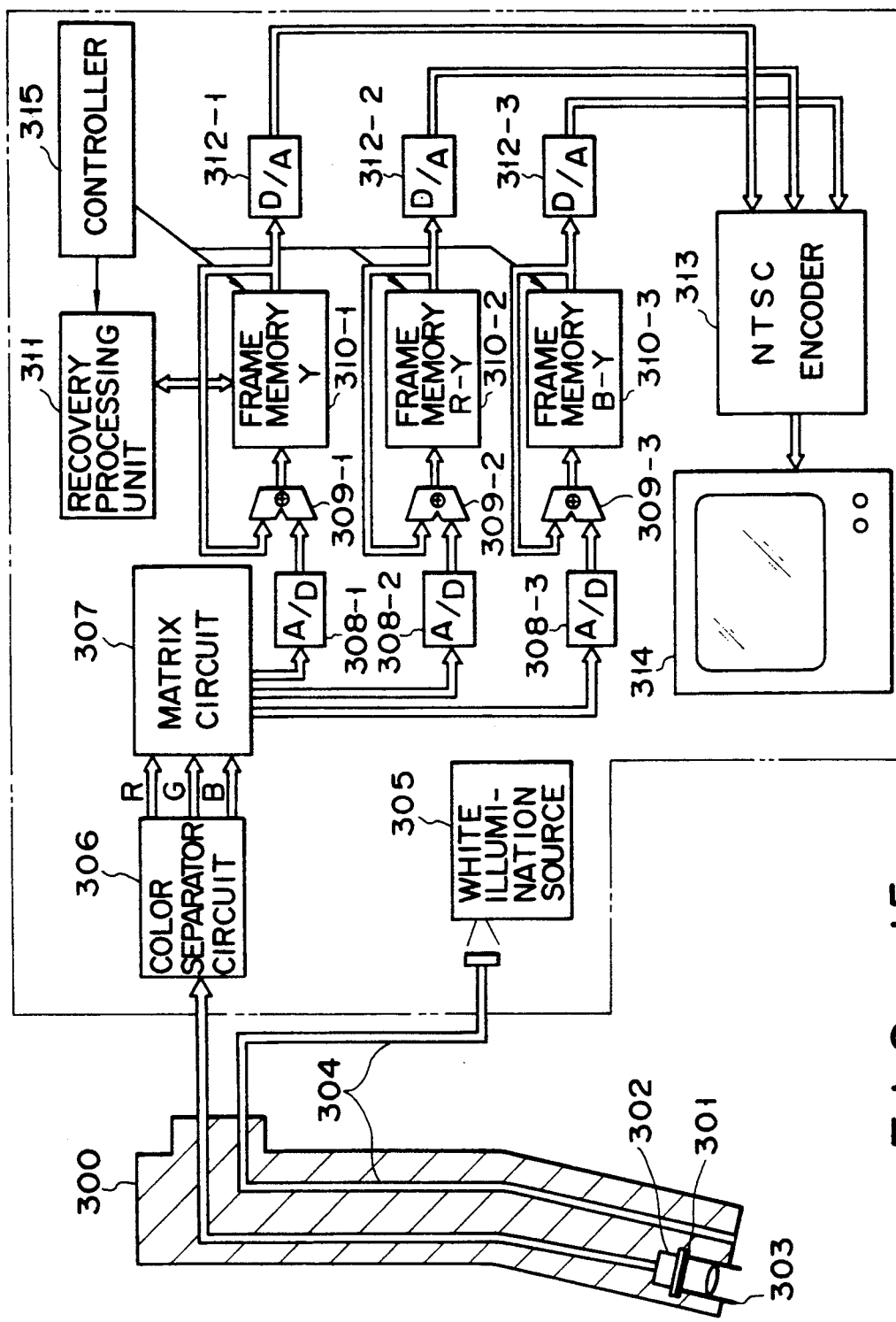

FIG. 15 is a view showing a ninth embodiment of the present invention. This embodiment exemplifies an electronic endoscope having a color single-plate imaging device. As shown in FIG. 15, a solid-state imaging device 302 having a light-receiving surface covered with a color mosaic filter 301 constituted by R, G, and B filter elements is mounted at the distal end of an endoscope probe 300. An image focused by an objective lens in a focus position controller 303 is imaged by the imaging device 302. In this case, illumination light is obtained as follows. Light emitted from a white illumination source 305 in the apparatus is guided to the endoscope probe 300 through a light guide 304 and is output from the distal end of the probe. An output signal from the imaging device 302 is guided to the apparatus and is separated into R, G, and B signals by a color separator circuit 306. In this embodiment, the color mosaic filter 301 is assumed to comprise R, G, and B filter elements. However, the color mosaic filter 301 may be constituted by complementary color filter elements (e.g., cyan and yellow filter elements). In any case, the color signal obtained through the color mosaic filter 301 is separated by the color separator circuit 306. The separated R, G, and B signals are input to a matrix circuit 307 and are converted into Y, R-Y, and B-Y signals. The Y, R-Y and B-Y signals are converted into digital signals by A/D converters 308-1 to 308-3, respectively. These digital signals are stored in frame memories 310-1 to 310-3, respectively. In this case, the digital signal are added to the signals already recorded in the frame memories 310-1 to 310-3 by adders 309-1 to 309-3, respectively. That is, accumulative addition/recording is performed. With the above arrangement, the images having the different in-focus positions are input and added to each other under the control of the focus position controller 303 in the endoscope probe 300.

The Y signal image recorded in the frame memory 310-1 is subjected to recovery processing by a recovery processing unit 311. The recovery-processed signal is recorded in the frame memory 310-1 again. Subsequently, the respective signals recorded in the frame memories 310-1 to 310-3 are converted into analog signals by D/A converters 312—1 to 312—3, respectively. The analog signals are converted to an NTSC signal by an NTSC encoder 313. The NTSC signal is displayed on a TV monitor 314. The above processing operations are controlled by a controller 315.

In this embodiment, the luminance component 302 of the endoscopic image input from the single-plate color imaging device 302 using the color mosaic filter 301 is extracted, and processing of the present invention is performed to increase a focal depth. Thereafter, the average color information is added to reproduce and display a color image. More specifically, the luminance components Y of the images at different focal positions are controlled by the focal position controller 303 in the endoscope probe 300 and accumulatively added and recorded by the adder 309-1 and the frame memory 310-1. The recovery filtering processing of the recorded image is performed by the recovery processing unit 311, thereby increasing the focal depth. Meanwhile, the R-Y and B-Y signals as color components are accumulated, added, and recorded by a set of the adder 309-2 and the frame memory 310-2 and a set of the adder 309-3 and the frame memory 310-3, respectively, thereby obtaining average color data between images having different focal positions. These data are added and output as an NTSC signal. Therefore, a color image having a large focal depth can be obtained. Defocusing caused by out of focus almost depends on the luminance component, and slight defocusing does not adversely affect man's perception for the image. Therefore, by performing the above processing operations, the prescribed object can be satisfactorily performed. According to this embodiment, the same effect as in the eighth embodiment can be obtained for the electronic endoscope using a single-plate color imaging device.

Tenth Embodiment

Figure 16:
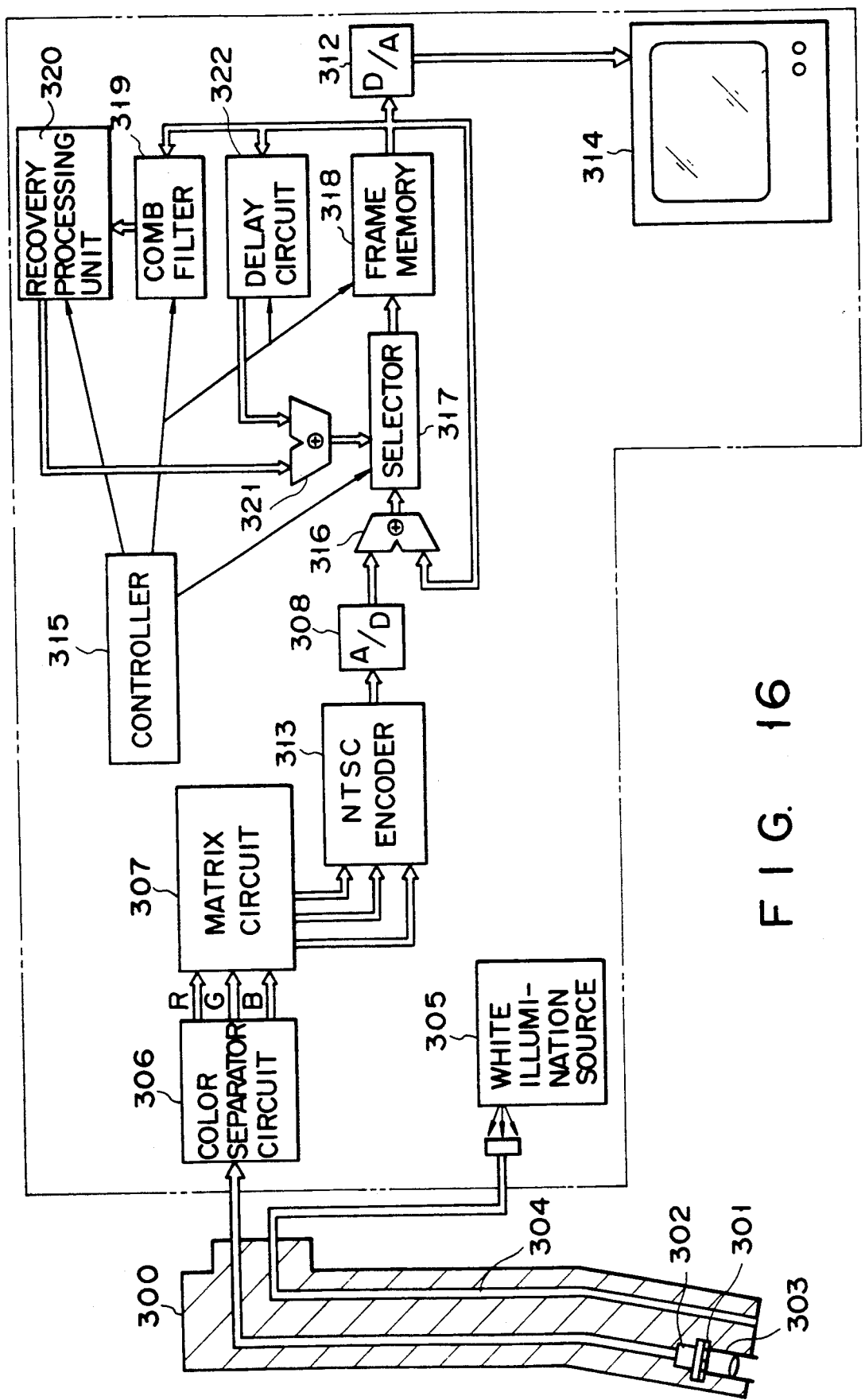

FIG. 16 is a view showing a tenth embodiment of the present invention. This embodiment also exemplifies an electronic endoscope using a single-plate color imaging device as in the ninth embodiment. As shown in FIG. 16, the internal arrangement of an endoscope probe 300 and the arrangement of a white illumination source 305 are the same as those in the ninth embodiment. A signal from an imaging device 302 is separated into R, G, and B signals by a color separator circuit 306. The color-separated signals are converted into Y, R-Y, and B-Y signals by a matrix circuit 307. The Y, R-Y, and B-Y signals are converted into an NTSC signal by an NTSC encoder 323. The NTSC signal is then converted into a digital signal by an A/D converter 308. This digital data is added by an adder 318 to the signal prestored in a frame memory 318. The sum is recorded in the frame memory 318 again through a selector 317. With the above arrangement, The images having different focal positions and set by the focal position controller 303 in the endoscope probe 300 are input and added to each other. Only the Y signal from the image signal, i.e., the digital NTSC signal representing the synthesized image stored in the frame memory 318 is extracted. The extracted Y signal is subjected to proper recovery processing by a recovery processing unit 320 for performing spatial filtering by a pipelined scheme. The recovery-processed Y signal is added by an adder 321 to the original NTSC signal whose timing is adjusted by a delay circuit 322, thereby obtaining an NTSC signal having a large focus depth. The NTSC signal is stored in the frame memory 318 through the selector 317. The processed image stored in the frame memory 318 is converted into an analog signal by a D/A converter 312. The analog signal is displayed on a TV monitor 314. The above operations are controlled by a controller 315.

The color image signals converted into the NTSC signal are input and added to each other by using one frame memory. The same effect as in the ninth embodiment can be obtained, and an apparatus size can be reduced.

Eleventh Embodiment

FIG. 17 is a view showing an arrangement of an eleventh embodiment of the present invention. This embodiment exemplifies an endoscope (fiber scope) using an optical fiber bundle. As shown in FIG. 17, an endoscope probe 400 comprises an in-focus position controller 401 and an image guide 402. The in-focus position controller 401 comprises an objective lens and a driver for continuously changing an in-focus position. The image guide 402 consists of an optical fiber bundle. The endoscope probe 400 optically transmits this image. In this case, illumination light is emitted as follows. White light emitted from illumination equipment 404 is guided to the endoscope probe 400 by a light guide 403 to output light from the distal end of the probe. A camera 405 is arranged at the upper end of the endoscope probe 400. The camera 405 records an image transmitted through the image guide 402 on a silver chloride film. With the above arrangement, when the in-focus position is continuously changed by the in-focus position controller 401, the images are added and recorded on the silver chloride film in the camera 405.

FIG. 18 is a view showing an arrangement of a means for optically recovering the images recorded on the silver chloride film. A multi-spectrum illumination source 500 is a white light source having a uniform spectrum throughout the visible light range or a light source for generating mixed light of three primaries (i.e., R, G, and B components) or beams having different wavelength regions at time intervals. The light from the multi spectrum illumination source 500 is focused on a slit 502 by a collimator lens 501 and serves as an approximate point light source. Light passing through the slit 502 becomes parallel light through a lens 503 and is incident on a color film 504 having the images recorded by the camera 405. The light passing through the color film 504 is focused by a lens 505. The focused light is appropriately filtered by a color spatial frequency filter 506 located on a focal plane of the lens 505. The filtered light is collimated by a lens 507, thereby reproducing the image. The reproduced image is recorded on the silver chloride film by a camera 508. The reproduced image may be converted into an electrical signal and may be recorded in a memory.

In this embodiment, the images input in the same manner as in the second embodiment are superposed and recorded on the silver chloride film. The images recorded on the color silver chloride film are subjected to recovery filtering by an optical system shown in FIG. 18.

The optical recovery processing shown in FIG. 18 will be described in detail. An endoscopic image recorded on the color film 504 is optically Fourier-transformed by the lens 505 and is filtered by the color spatial frequency filter 506 at an appropriate spatial frequency. An image obtained from the fiber scope generally consists of pixels respectively corresponding to optical fibers. Therefore, the image has a net structure shown in FIG. 19. A recovery filtering of the spatial frequency filter 506 and an elimination operation of the net structure 510 are simultaneously performed. A Fourier spectrum of a fiber scope image appearing on a focal plane of the lens 505 is shown in FIG. 20. A 0th-order spectrum 511 of the image itself appears at the central portion, and higher-order spectra 12 originated from the optical fiber arrangement appear at the peripheral portion. As shown in FIG. 21, a filter 520 having an amplitude transmittance is arranged to perform recovery processing of the 0th-order spectrum 511 in the central portion 521 and cut the higher-order spectra 512 in the peripheral portion 522, and this filter is used as the filter 506. With this arrangement, the image having a large focal depth without the net structure 510 can be reproduced. Since the recover filter must not have a maximum amplitude transmittance of 1 or more, the recovery filter must be design to relatively limit the amplitude transmittance in a low-spatial frequency region. Since the multi-spectrum illumination source is used in FIG. 18, the spectra of the lens 505 on the focal plane are different in position depending on wavelengths. The color spatial frequency filter 506 is constituted by a color reversal film which has spectral characteristics to allow appropriate filtering of the respective spectra.

A method of optically performing recovery processing in this embodiment is described in detail in Japanese Patent Application No. 61-227454.

According to this embodiment, a fiber scope image having a larger focal depth can be reproduced by a relatively simple arrangement. In the same manner as in the eighth embodiment, the power of the illumination source can be reduced. In this embodiment, the fiber scope image is recorded on the silver chloride film by the camera 405. However, a TV camera may be used in place of the camera 405 to electronically process a signal and record the image. More specifically, an image obtained by the TV camera is converted by an A/D converter into a digital image having a sampling pitch sufficiently smaller than that of the net structure of the fiber scope. The same processing as in this embodiment may be performed for the digital image.

Twelfth Embodiment

FIG. 22 is a view showing an arrangement of the twelfth embodiment of the present invention. This embodiment exemplifies an electronic camera which employs the present invention. This embodiment corresponds to an arrangement in which the image input unit and the image processing/display unit in the third embodiment are off-line connected through a recording medium. As shown in FIG. 22, a plurality of images obtained by an electronic camera 600 and focused at different focal points are input to the camera 600 as electrical signals. All the input electrical signals are recorded in a recording medium 601 in the camera 600. The recording medium 601 comprises a floppy disk, a magnetic tape, an optical memory, a solid-state memory using a semiconductor IC or a thin film or the like. The image signals recorded in the recording medium 601 are read by a reader 602. The image signals recorded in the image recording medium are analog signals. An A/D converter is arranged in the reader 602 to convert the image signal into a digital signal. A processor 603 includes the memories 5-1 to 5-m, the address compensator 12, the selector 13, the adder 14, the memory 15, the recovery processing unit 7, the D/A converter 8, and the controller 10, all of which are shown in the third embodiment of FIG. 3. The same processing as in the third embodiment is performed for a digital image signal transferred from the reader 602 in the processor. The processed image signal is transferred to and displayed on a TV monitor 604. The various processing conditions of the processor 603 are set by an observer at a man-machine interface 605 connected to controller in the processor 603.

According to this embodiment, the plurality of images having different in-focus positions and imaged by the electronic camera 600 are obtained to provide the same effect as in the third embodiment. This embodiment exemplifies the electronic camera 600 which employs the third embodiment. However, each of the first, second, fourth, fifth, and the sixth embodiments may be applied to this embodiment. That is, the images having different in-focus positions in the camera are input and added to each other, and the synthesized image is recorded in a recording medium. Only recovery processing may be performed by an on-line image processing unit. In this case, the arrangement of the apparatus can be further simplified.

When the present invention is applied to a camera in which images are recorded on a silver chloride film, images having different in-focus positions may be continuously recorded, and the same processing as in the twelfth embodiment may be performed. Furthermore, as shown in the eleventh embodiment, the images having different focal points may be input and added on the silver chloride film, and optical or electrical recovery processing may be performed.

Thirteenth Embodiment

Figure 23:
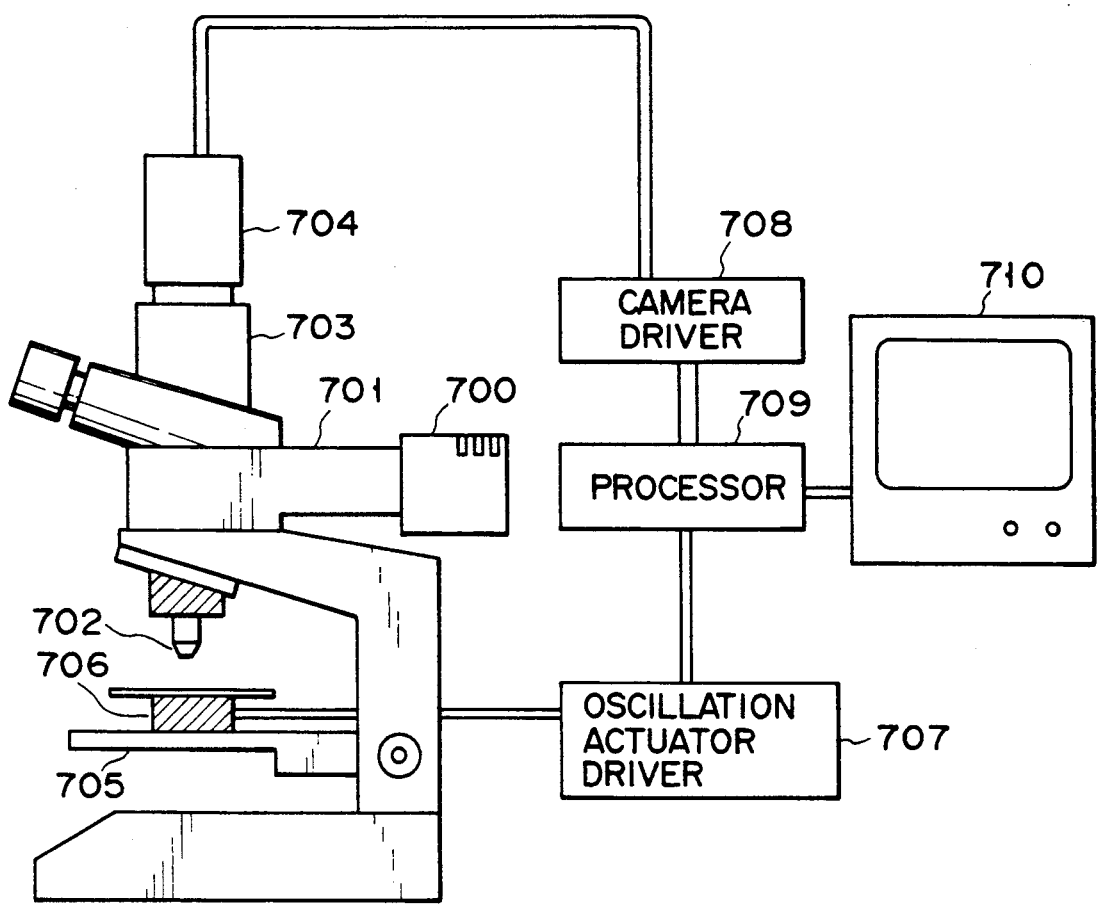

FIG. 23 is a view showing an arrangement of a thirteenth embodiment of the present invention. This embodiment exemplifies a reflection microscope which employs the present invention in the same manner as in the seventh embodiment shown in FIG. 12. As shown in FIG. 23, the light emitted from an illumination source 700 is guided by downward illumination equipment 701 and is finally incident on a sample surface through an objective lens 702. An image of the light reflected by the sample is focused by the objective lens 702 and is imaged by a TV camera 704 arranged on a lens barrel 703. In this case, the sample is vibrated by an oscillation actuator 706 arranged on a stage 705 at a predetermined frequency in an optical axis of the microscope. The oscillation actuator 706 is driven by an oscillation actuator driver 707 at proper period and amplitude. An image signal obtained by the TV camera 704 is transferred to the camera driver 708. The camera driver 708 also supplies power to the TV camera 704. The image signal transferred to the camera driver 708 is supplied to a processor 709. The processor 709 includes an A/D converter, an image memory, a recovery processing unit, and a D/A converter. The processor 709 performs digital recovery processing or causes an analog band-pass or high-pass filter to perform recovery processing. The recovery-processed image signal from the processor 709 is transferred to and displayed on a TV monitor 710.

The means for monitoring a power of a specific spatial frequency region of the input image signal by using a band-pass filter is arranged in the processor 709. Therefore, the amplitude of the oscillation actuator 706 can be automatically determined. The oscillation actuator 707 can be operated in accordance with the determination results.

Figure 24:
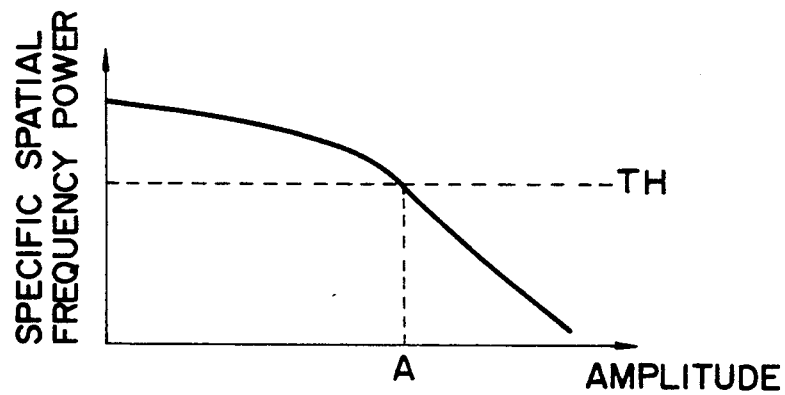

The thirteenth embodiment having the above arrangement has the following effect. In this embodiment, since the TV camera 704 is arranged to oscillate an object once or more at a specific amplitude while a one-frame or one-field image is input, the images having different in-focus planes can be accumulated on an imaging plane of the TV camera. The initial amplitude of the oscillation actuator 706 can be determined by the following method. Images are input while the amplitude is changed. The processor 709 then monitors the power of the specific spatial frequency region of the input image. A change in power of the specific spatial frequency as a function of the amplitude is shown in FIG. 24. When an amplitude value is increased due to a structure of an object in a direction of the depth, many defocus components are included in the images. For this reason, the power is decreased. A predetermined threshold value TH is appropriately set, and an amplitude value A corresponding to the power which is lower than the threshold value TH is used in actual processing. In this case, a clear image having an appropriate focal depth with respect to the object structure can be obtained. The method of determining an accumulation range can be applied to the seventh embodiment.

This embodiment provides a sufficient effect with a simple arrangement. When a recovery processing is performed at a video rate, a processed image can be obtain in real time, thus providing many practical advantages.

In the above embodiment, the object is oscillated. However, a relay lens or imaging element arranged in an optical system, i.e., the objective lens 702 or the lens barrel 703 may be oscillated. This embodiment may be applied to optical equipment such as an electronic camera and an endoscope except for the microscope to oscillate an optical system or an imaging device.

Fourteenth Embodiment

Figure 25:
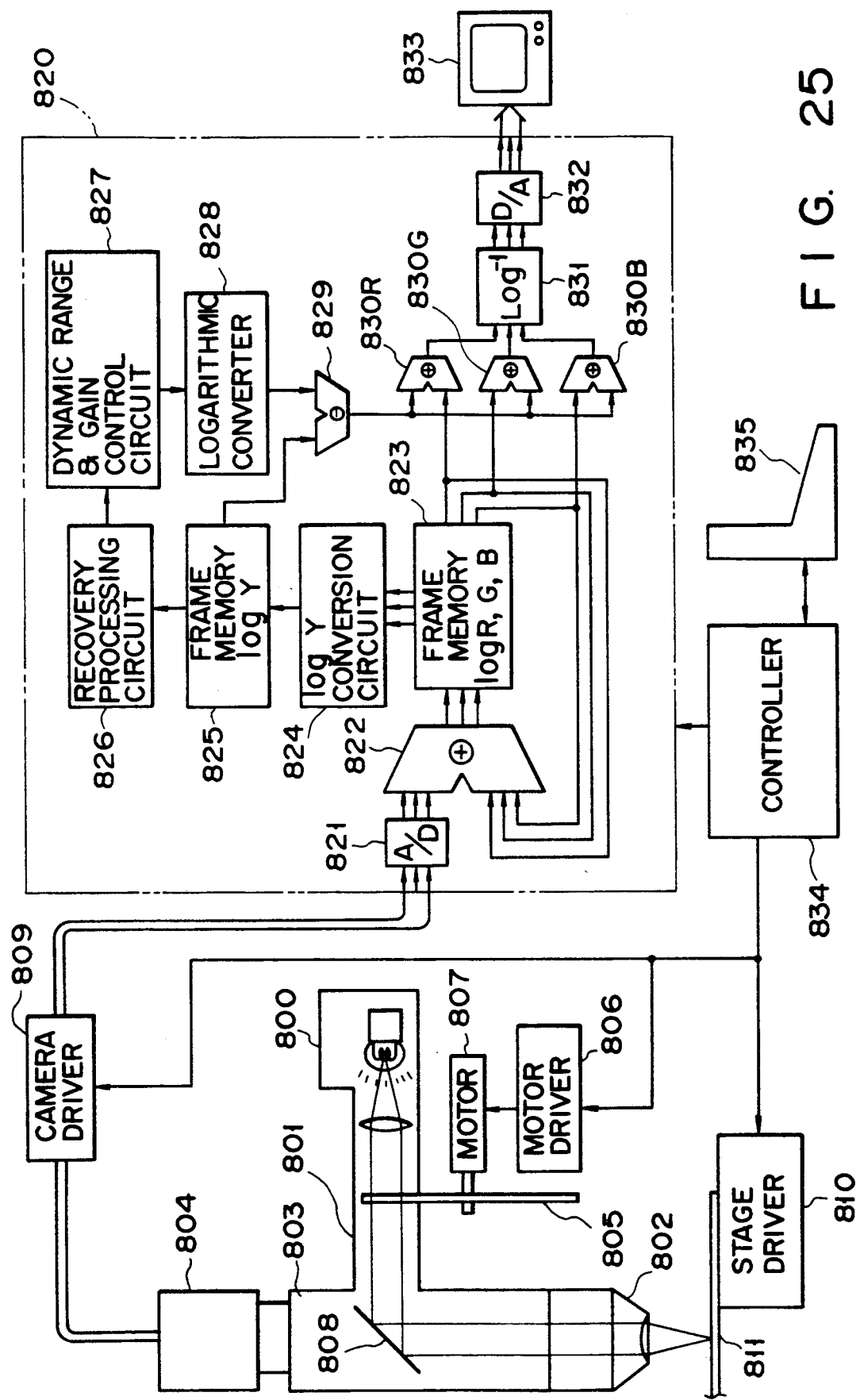
Figure 26:
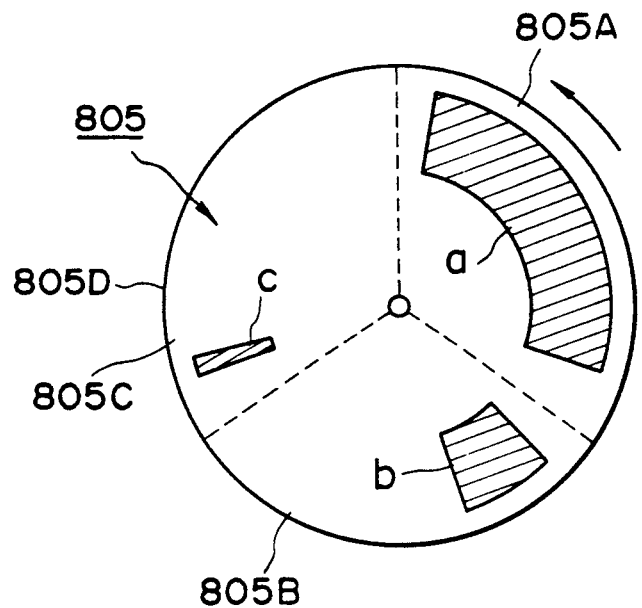

FIG. 25 is a view showing an arrangement of the fourteenth embodiment in which the present invention is applied to a reflection microscope. For illustrative convenience, only an illumination source 800, a downward illumination equipment 801, an objective lens 802, and a lens barrel 803 of the reflection microscope are illustrated. A color TV camera 804 is arranged on the lens barrel 803. A dynamic range of an imaging device in the color TV camera 804 is assumed to be 40 dB. A rotary optical shutter 805 is arranged in the illumination equipment 801. The optical shutter 805 transmits and shields illumination light from the illumination source 800 at predetermined timings. As shown in FIG. 26, the rotary optical shutter 805 includes areas 805A to 805C of a disc 805D which are equally divided. Windows (hatched portions) a, b, and c having an area ratio of 10,000:100:1 are formed in the areas 805A to 805C, respectively. When the disc 805D revolves once every 1/10 second by a motor 807 controlled by a motor driver 806, a predetermined amount of light is incident on the sample every 1/30 second (i.e., one-frame scanning time of the TV camera). In this case, the illumination light is incident on the sample through a half mirror 808 and an objective lens 802. An image of light reflected by the sample is imaged by the color TV camera 804 controlled by a camera driver 809. The Kolher's illumination system (not shown) consisting of a plurality of lenses and an aperture is arranged in the illumination equipment 801. A stage driver 810 includes the oscillation actuator shown in the thirteenth embodiment and oscillates a stage 811 at least once every 1/30 second at a predetermined amplitude. The images having different in-focus planes can be accumulated on a light-receiving surface of the color TV camera 804. In this manner, three frame color images having different exposure amounts are input. These color images are transferred to a processor 820 as the three primary color signals, i.e., R, G, and B signals.

The image signals transferred to the processor 820 are converted into digital signals by an A/D converter 821. Of these converted digital signals, the signals of the first frame, i.e., the image signals exposed through the window a of the rotary optical shutter 805 and input to the processor 820, are transmitted through an adder 822 without processing and are stored in a frame memory 823. The image signals of the second and the third frames, i.e., the image signals exposed through the windows b and c of the rotary optical shutter 805 and input to the processor 820, are added by the adder 822 to the image signals already stored in the frame memory 823. The sum is stored in the frame memory 823 again. Therefore, the three primary color (R, G, and B) image data having logarithmic characteristics of polygonal approximation are stored in the frame memory 823. The image data logR, logG, and logB stored in the frame memory 823 are converted into a value logY ($Y = 0.3R + 0.59G + 0.11B$) by a logY converter circuit 824. The converted data is stored in another frame memory 825. The image signal stored in the frame memory 825 is transferred to a recovery processing circuit 826. The image signal transferred to the recovery processing circuit 826 is subjected to the proper filtering processing with respect to a spatial frequency while the image signal has logarithmic characteristics. The filtered image signal is supplied to a dynamic range & gain control circuit 827. A recovery-processed image signal logY' is added to the gain control value logb by this circuit 827 and at the same time multiplied with a dynamic range adjustment value a, thereby outputting a signal alogbY'. The image signal alogbY' is logarithmically compressed by a logarithmic converter 828 and output as log(alogbY'). This output value is input to a subtracter 829, and the difference between the signal log(alogbY') and the image signal logY is calculated by the subtracter 829. The difference is output as a signal log(alogbY'/Y). The output signal log(alogbY'/Y) from the subtracter 829 is added by adders 830R, 830G, and 830B to the three logarithmically compressed primary color signals logR, logG, and logB stored in the frame memory 823. The resultant sum signals are input to an inverse logarithmic converter (exponential converter) 831, and the inverse logarithmic conversion is performed therein, thereby outputting signals alogbY'·/Y·R, alogbY'/Y·G, and alogbY'/Y·B. These calculated values are converted into R, G, and B video signals by a D/A converter 832 and displayed on a TV monitor 833. The processor 820 is arranged on the basis of a color logarithmic imaging video processing unit described in Japanese Patent Application No. 62-234133. Control of the operation in the apparatus having the above arrangement is performed by a controller 834. Processing conditions are set by an observer at a man-machine interface 835 connected to the controller 834.

The fourteenth embodiment having the above arrangement has the following effect. Since this embodiment employs a color logarithmic imaging system both an operation for inputting the image having a dynamic range exceeding performance of an imaging device of the TV camera 804 and an operation for effectively performing recovery processing by logarithmic filtering can be simultaneously performed. The color logarithmic imaging system will be described. In this case, assume that the dynamic range of the imaging device of the TV camera 804 is given as 40 dB. When an object has luminance information which does not allow imaging in the dynamic range of 40 dB, the dynamic range is substantially widened as follows. The object is imaged in a sufficiently large exposure amount, and an image having dark information is input. In this image, a bright portion is saturated. The image is then input in an exposure amount 1/100 of the previously input image. Of the saturated portions of the previously input image, information of 40 dB can be obtained from a darker portion. Similarly, an image is input in an exposure amount 1/100 of the previously input image, and an image having information of 40 dB of a brighter portion can be input. These input images are added to each other to obtain the image signal having logarithmic characteristics of polygonal approximation. Therefore, this image signal can be used as an image signal having a substantially wide dynamic range. In addition, in order to balance the processed images, logarithmic compression of only a luminance signal Y is performed. In order to eliminate the influences of the hue and saturation of the color image, a compression degree logY/Y of the luminance signal Y is multiplied with the R, G, and B signals to obtain signals logY/Y·R, logY/Y·G, and logY/Y·B. These signals are output as the three primary color signals. In this embodiment, the gain and dynamic range of a display are controlled to output the three primary color signals consisting of alogY/Y·R, alogY/Y·G, and alogbY/Y·B. This gain and dynamic range control can be manually or automatically performed. The detail of the above color logarithmic compression system is described in Japanese Patent Application No. 62-234133.

A function obtained by spatial frequency filtering, i.e., logarithmic filtering, of the luminance signal logY having logarithmic characteristics will be described below.

A distribution function of reflected light is defined as follows:

$$Y(\Gamma) = L(\Gamma) \cdot R(\Gamma) \tag{a}$$

where
  $Y(\Gamma)$: a distribution function of reflected light
  $L(\Gamma)$: a distribution function of illumination function
  $R(\Gamma)$: a reflectance distribution function of an object
When the right- and left-hand sides are logarithmically converted, the following equation is derived:

$$\text{Log}Y(\Gamma) = \log L(\Gamma) + \log R(\Gamma) \tag{b}$$

Figure 27:
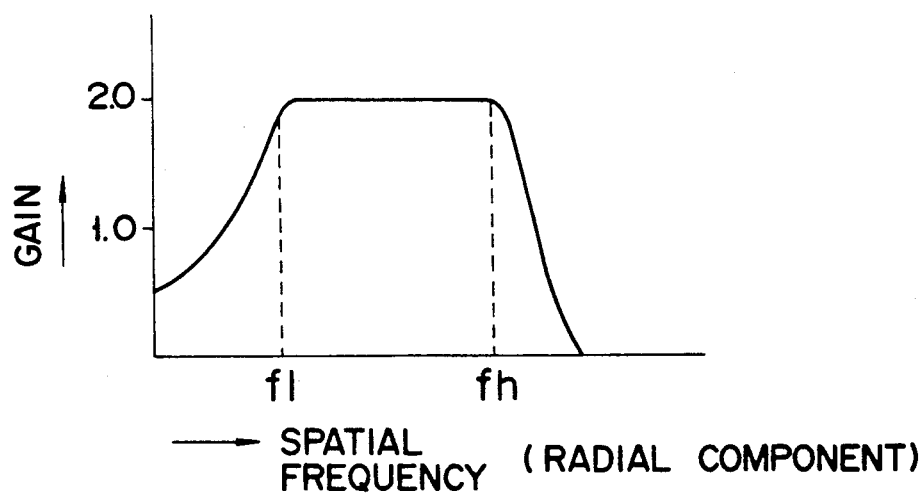

In optical equipment having no illumination light or illumination equipment, the function $L(\Gamma)$ corresponding to the distribution of natural light or external illumination mainly has a low-spatial frequency component. To the contrary, the reflectance distribution function $R(\Gamma)$ mainly has components of low to intermediate spatial frequencies. A filter having characteristics shown in FIG. 27 is arranged to cut off nonuniformity of illumination light of the low-spatial frequency component and a high-spatial frequency region in which noise components are predominant. Therefore, an area representing the structure of the object can be emphasized. Therefore, by using this logarithmic filtering, more effective recovery processing can be performed. Spatial frequency values fg and fh in FIG. 27 can be arbitrarily set by an observer at the man-machine interface 835 while observing the processing results. Alternatively, when the types of images are limited, and their characteristics are known, the spatial frequency values may be preset.

According to this embodiment, even if the imaging camera having a narrow dynamic range is used, an image having a substantially wide dynamic range can be obtained. In general, in the camera having a narrow dynamic range, accumulation is performed on the light-receiving surface, and only an average intensity (i.e., 0th-order frequency intensity) of the image is increased. The high-spatial frequency region data is undesirably mixed with noise to an extent that it cannot be recovered. This embodiment eliminates this drawback. An image component in the high-spatial frequency region can be input at a desired S/N ratio while it is accumulated. More effective recovery processing can be performed and a clear image can be displayed by logarithmic filtering.

This embodiment exemplifies an application of the reflection microscope. However, this embodiment is also applicable to other optical equipment having illumination equipment, such as an electronic endoscope. In addition, the optical shutter 805 need not be a mechanical shutter illustrated in this embodiment. An optical shutter such as a liquid crystal plate may also be used.

Fifteenth Embodiment

FIG. 28 is a view showing an arrangement of a fifteenth embodiment in which color logarithmic imaging and logarithmic filtering shown in fourteenth embodiment are applied to optical equipment having no illumination equipment. An object image is focused on a light-receiving portion of a solid-state imaging device 902 such as a CCD device by a lens 901. The imaging device 902 is controlled by a logarithmic imaging driver 903. For example, when the imaging device 902 comprises a CCD solid-state imaging device, a height of an overflow drain gate or a horizontal transfer gate is changed within an exposure time, so that an output signal has logarithmic compression characteristics. A detail of logarithmic compression of the solid-state imaging device is described in Japanese Patent Application No. 62-234133. An output signal from the imaging device 902 is converted into three primary color signals logR, logG, and logB by a video processor 904. These primary color signals are converted into digital signals by an A/D converter 905. The digital signals are then transferred to an image processing unit 910. The lens 901 is oscillated and driven by an oscillation actuator 907 at a period sufficiently shorter than the exposure time of the imaging device 902. In this case, the oscillation actuator 907 is driven and controlled by an oscillation actuator driver 906. Images having different in-focus positions are accumulated and input on the light-receiving surface of the imaging device 902.

The image processing unit 910 comprises a logY converter 911, a recovery processing circuit 912, a dynamic range & gain control circuit 913, a logarithmic converter 914, a subtracter 915, adders 916R, 916G, and 916B, and an inverse logarithmic converter 917. In the image processing unit 910, an luminance signal Y is logarithmically filtered in the same manner as in the fourteenth embodiment shown in FIG. 25. The three primary color signals alogbY'/Y·R, alogbY'/Y·G, and alogbY'/Y·B whose dynamic ranges and gains are appropriately controlled are output. Output signals from the image processing unit 910 are converted into color analog signals by a D/A converter 920 and are displayed on a TV monitor 921. The above operations are controlled by a controller 930.

The fifteenth embodiment having the above arrangement has the following effect. Since the logarithmic compression input characteristics are given to the solid-state imaging device 902 itself, the dynamic range can be widened and recovery processing by logarithmic filtering can be performed without unbalancing the color components in the same manner as in the fourteenth embodiment. In addition, the apparatus of the fifteenth embodiment can have a simple arrangement.

According to this embodiment, the same effect as in the fourteenth embodiment can be obtained in optical equipment normally without illumination equipment, such as an electronic camera. The images having different in-focus positions are accumulated by the imaging device 902 itself, and therefore the apparatus can be simplified.

Instead of providing the logarithmic input characteristics to the imaging device itself, the plurality of images are input while the exposure time is changed, thereby synthesizing an image having logarithmic characteristics of polygonal approximation. Processing can be performed by using the same arrangement as in the processor 820 in the fourteenth embodiment.

Sixteenth Embodiment

Figure 29:
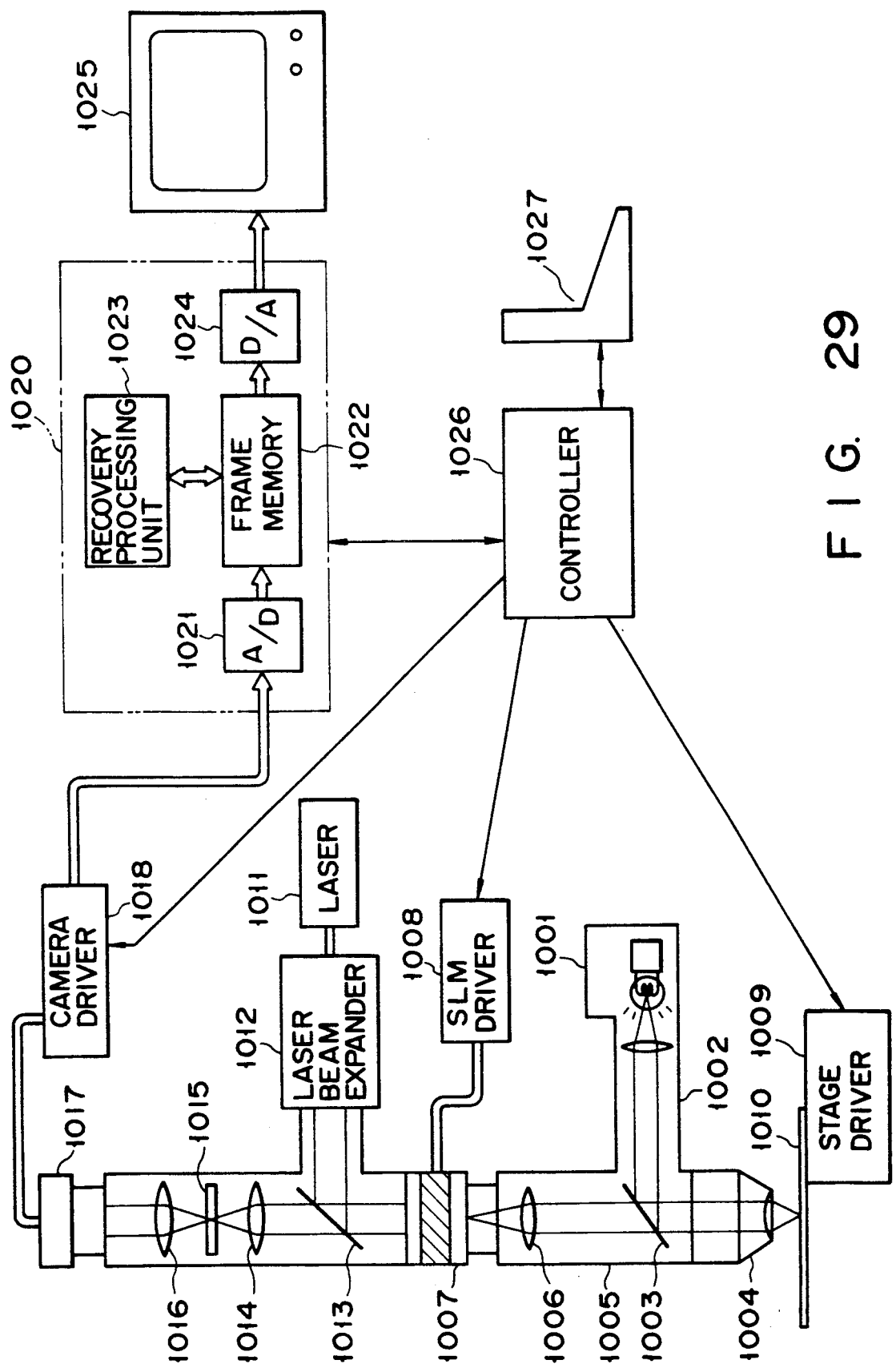

FIG. 29 is a view showing an arrangement of a sixteenth embodiment in which the present invention is applied to a reflection microscope in the same manner as in the fourteenth embodiment shown in FIG. 25. Light emitted from an illumination source 1001 and is incident on a sample surface through a half mirror 1003 and an objective lens 1004. An image of the light reflected by the sample is enlarged by the objective lens 1004 and a focusing lens 1006 in a lens barrel 1005 and is focused on a light-receiving surface of a spatial optical modulator (to be referred as an SLM hereinafter) 107 arranged on the lens barrel 1005. The SLM 1007 is driven and controlled by an SLM driver 1008 and serves as an incoherent-to-coherent converter. A stage driver 1009 is driven on a sample support stage 1010 in a preset distance range in an axial direction of the microscope within a scan time set in consideration of a conversion response time of the SLM 1007. A laser beam emitted from a laser 1011 is expanded by a laser beam expander 1012, and a direction of path of the laser beam is changed by a half mirror 1013. The laser beam is then incident on a surface (to be referred to as a reflection surface) of the SLM 1007 which is opposite to the light-receiving circuit. A microscopic image is displayed as a gradient index on the reflection surface of the SLM 1007. Therefore, a reflection space pattern of the laser beam propagates as a microscopic image. This microscopic image, i.e., a reflected laser beam is spatially Fourier-transformed by a lens 1014. Filtering of the resultant beam is performed by a filter 1015 located on the rear focal plane of the lens 1014. The reflected laser beam is subjected to inverse Fourier transform by a lens 1016. The resultant image is input to a TV camera 1017. An amplitude transmittance of the filter 1015 is increased from its central portion to its peripheral portion and is designed to serve as a high-pass filter for a spatial frequency. Power supply to and timing control of the TV camera 1017 are controlled by a camera driver 1018. The input image is transferred to a processor 1020 through the camera driver 1018. An image signal input to the processor 1020 is converted into a digital signal by an A/D converter 1021, and the digital signal is stored in a frame memory 1022. The digital image stored in the frame memory 1022 is subjected to appropriate recovery processing by a recovery processing unit 1023. The recovery-processed image signal is converted into an analog video signal by an D/A converter 1024 and is displayed on a TV monitor 1025. The above operations are controlled by a controller 1026 and conditions are set by an observer at a man-machine interface 1027 connected to the controller 1026.

A further description of the SLM 1007 will be briefly made below. The SLM 1007 is an optical input type spatial modulator and serves as an optical functional element which can read and write a two-dimensional optical signal. The examples of this optical functional element are a PROM (Pockls Read-out Optical Modulator) using optical conductivity and electrooptical effects of $Bi_{12}SiO_{20}$ (BSO), and an LCLV (Liquid Crystal Light Value) obtained by combining a photoconductive material and a liquid crystal. Either optical functional element converts an input optical signal into an electric field distribution and controls a gradient index of the reflection surface. A polarization state of the laser beam incident on the reflection surface of the SLM 1007 is changed in accordance with the gradient index of the reflection surface. When the laser beam passes through a detector, it can be read as a coherent optical image. In this embodiment, an SLM having a wide dynamic range and a short response time is used.

The sixteenth embodiment having the above arrangement has the following effect. In this embodiment, before the images are accumulated on the light-receiving surface of the TV camera 1017, optical high-pass filtering is performed. That is, the images input through the microscope propagate with a laser beam through the LSM 1007. Images having different in-focus positions are accumulated on the light-receiving surface of the TV camera 1017 while spatial frequency filtering is performed by the coherent optical system. With the above arrangement, the limitations of the accumulation effect by the limitations of the dynamic range of the TV camera 1017 can be solved. As a result, accumulation and input operation of the spatial frequency components can be performed at a desired S/N ratio.

According to this embodiment, the dynamic range of the TV camera 1017 can be effectively used, and a clearer image can be displayed by recovery processing in the processor.

Seventeenth Embodiment

FIG. 30 is a view showing an arrangement of the seventeenth embodiment in which the present invention is applied to a reflection microscope in the same manner as in the sixteenth embodiment. In an arrangement of this embodiment, the processor 1020 is omitted from the arrangement of the sixteenth embodiment shown in FIG. 29, and an image signal from the TV camera 1017 is directly input to a TV monitor 1025 through a camera driver 1018. The same reference numerals as in FIG. 29 denote the same parts in FIG. 30, and a detailed description thereof will be omitted.

The sixteenth embodiment having the above arrangement has the following effect. A stage 1010 is driven by a stage driver 1009 within a predetermined distance range along an optical axis of the microscope. During driving, microscopic images are accumulated on the light-receiving surface of the LSM 1007. Therefore, a plurality of images having different in-focus positions are accumulated. When the above operation is completed, the accumulated images displayed on the reflection surface of the SLM 1007 are read by a laser beam, and the read images are subjected to recovery processing of spatial frequency filtering by a coherent optical system. The processing result is imaged by a TV camera 1017 and displayed on a TV monitor 1025. That is, an image accumulation effect of of the light-receiving surface of the SLM 1007 is utilized to perform recovery processing by optical filtering.

According to this embodiment, since recovery processing is perfectly performed in real time, the total processing time can be advantageously shortened.

A method of processing and displaying a color image in the sixteenth and seventeenth embodiments will be described below. As shown in FIG. 31, a rotary color filter 1030 is arranged in downward illumination equipment 1002. The rotary color filter 1030 is obtained by arranging the three primary color filter elements (R, G, and B color filter elements) along the rotational direction of a disc in the same manner as in the rotary optical filter 213 of FIG. 14. When the color filter 1030 is driven by a motor 1031, light emitted from a white illumination source 1001 is transmitted, and light colors are changed in an order of R, G, and B. The resultant primary illumination light components are guided and are subjected to sequential operations on the basis of the arrangements described in the sixteenth and seventeenth embodiments.

Figure 32:
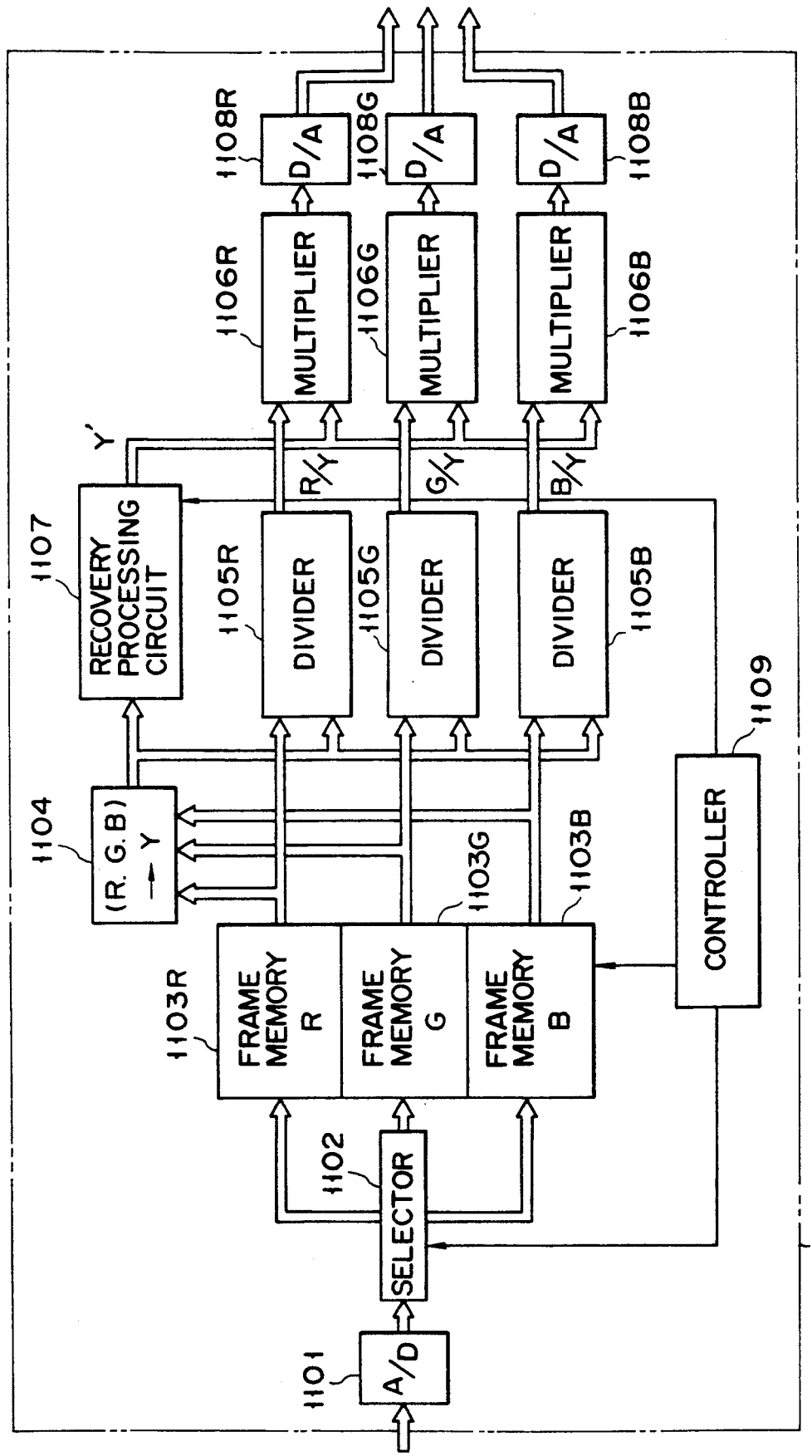

FIG. 32 is a block diagram showing an arrangement of a color image processor based on the processor 1020 in the sixteenth embodiment (FIG. 29). Output signals representing the respective primary illumination light components and input to a processor 1100 are converted into digital signals by an A/D converter 1101. The digital signals are stored in frame memories 1103R, 1103G, and 1103B by a selector 1102 in the units of color components. All the processing results by illumination of three primaries are stored in the frame memories 1103R, 1103G, and 1103B, these results are supplied to an (R,G,B)-to-Y converter 1104, and a luminance signal $Y = 0.3R + 0.59G + 0.11B$ is calculated therein. The luminance signal Y output from the converter 1104 is supplied to dividers 1105R, 1105G, and 1105B for dividing the color components from the frame memories 1103R, 1103G, and 1103B by the luminance signal Y, thereby calculating R/Y, G/Y, and B/Y. These calculation results are supplied to multipliers 1106R, 1106G, and 1106B.

The luminance signal Y is subjected to appropriate recovery processing by a recovery processing circuit 1107. An output Y' from the recovery processing circuit 1107 is supplied to the multipliers 1106R, 1106G, and 106B and is multiplied with the R/Y, G/Y, and B/Y signals. Products (R/Y)Y', (G/Y)Y', and (B/Y)Y' are converted into analog video signals by D/A converters 1108R, 1108G, and 1108B. The above operations are controlled by a controller 1109.

With the above arrangement, only the luminance component of each primary color signal is subjected to recovery processing so as to maintain a good color balance. The recovery-processed data of the three primaries (color) are simultaneously output, and the results can be displayed as a color image.

When the above arrangement is applied to the seventeenth embodiment, the converter 1104, the dividers 1105R, 1105G, and 1105B, the recovery processing circuit 1107, and the multipliers 1106R, 1106G, and 1106B are omitted from the arrangement shown in FIG. 32. A processor in which the frame memories 1103R, 1103G, and 1103B are directly connected to the D/A converters 1108R, 1108G, and 1108B is arranged. This processor is inserted between the camera driver 1018 and the TV monitor 1025 shown in FIG. 30. With the above arrangement, the image signals of the three primaries which are already recovered and sequentially input can be temporarily stored in the frame memory in the processor, and can be displayed as a color image upon simultaneous read access of the above primary image signals.

Eighteenth Embodiment

FIG. 33 is a schematic view showing an optical high-pass filtering arrangement of an eighteenth embodiment in which the present invention is applied to a transmission microscope. As shown in FIG. 33, a transmission illumination optical system comprises a Kohler's illumination equipment 1200. Illumination light emitted from an illumination source 1201 is focused by a collector lens 1202 and is incident on a sample 1206 by a condenser lens 1205 through a field aperture 1203 and a condenser aperture 1204. In this case, the size of the condenser aperture 1204 is kept to be sufficiently small, and almost parallel light is incident on the sample 1206. Light passing through the sample 1206 is guided to an objective lens 1207, and spatial frequency filtering of the image of the sample 1206 is performed. The filter 1208 is arranged such that its central portion has a high absorbency and the absorbency is decreased toward its peripheral portion. That is, the absorbency is gradually decreased from the central portion to the peripheral portion. By suppressing the low-spatial frequency component, high pass filtering is performed. The high-pass filtered image is focused on an image input system by a focusing lens 1209.

Other arrangements are substantially the same as those of the transmission microscopes in the seventh, thirteenth, fourteenth, and seventeenth embodiments.

The eighteenth embodiment having the above arrangement has the following effect. In this embodiment, since the sample 1206 is illuminated with parallel light in the transmission microscope, a coherent optical system can be obtained, and high-pass filtering of the image can be optically performed.

According to this embodiment, the sample is imaged by the image input unit such as a TV camera while the low-spatial frequency component of the image is kept suppressed in the same manner as in the embodiment of FIG. 16, thereby effectively utilizing the dynamic range of the image input unit. Therefore, an image having a large focal depth can be more clearly displayed.

A method of selecting the number of images to be added to each other and the accumulation range will be described.

FIGS. 34A and 34B are views showing a principle of this selection method. Assume an object 1210 having a stepwise surface structure shown in the left portion of FIG. 34A. When this object 1210 is imaged by an optical system having a small focal depth, a Fourier spectrum of an image focused on some portion of the object has also relatively high spatial frequency components. In the case of an image which is not focused on any portion of the object, the image has only low frequency components, as shown in the right portion of FIGS. 34A. That is, a Fourier spectrum $F(u)$ of an image having an in-focus position at a position indicated by a broken line with respect to the object 1210 is shown. A value $F(u1,u2)$ (an area of each hatched portion 1220) obtained by integrating a spectrum at a given spatial frequency region $(u1,u2)$ is taken into consideration. Changes in value $F(u1,u2)$ upon changes in in-focus positions are shown in FIG. 34B. When an area $(z1,z2)$ in which the value $F(u1,u2)$ exceeds a given threshold value is defined as an addition or accumulation range, entirely defocused images can be excluded from the object of interest. As a result, a clear image having a large focal depth can be obtained by adding or synthesizing images having different in-focus positions. As described with reference to the third and twelfth embodiments, when the images having different in-focus positions are recorded, the recorded image signals are filtered through a band-pass filter, and the resultant values are checked, thereby obtaining the relationship shown in FIG. 34B. On the basis of the relationship, images to be used for additions can be determined. When this method is applied to the reflection microscopes shown in the seventh, fourteenth, sixteenth, and the seventeenth embodiments, the stage (or the objective lens) is moved upward or downward at predetermined stepwise intervals. The input image signals at the respective focal levels are filtered through a band-pass filter. With this operation, the relationship shown in FIG. 34B is obtained, and the addition or accumulation range is determined. In particular, in testing of test ICs, LSIs, and the like, since similar patterns are repeated, determination of the accumulation range allows optimal processing of every portion under identical conditions. The band-pass filter may comprise a plurality of filters having different frequency ranges, and any one of the filters may be used, or all the filters may be used to systematically determine the range.

Nineteenth Embodiment

Figure 36A:
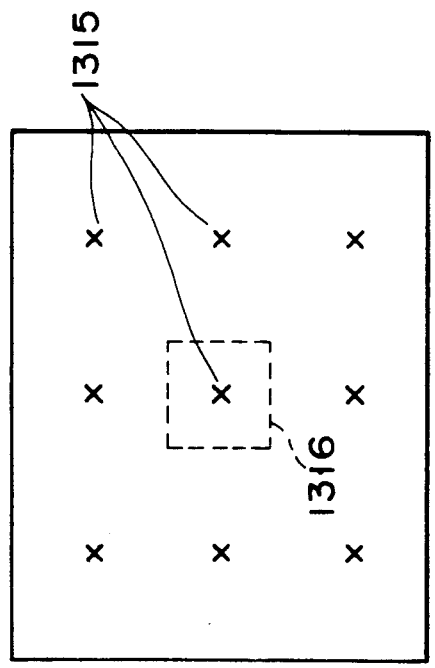
FIGS. 36A and 36B are views showing a left image plane and a right image plane of a stereo-matching means of the nineteenth embodiment.
Figure 36B:
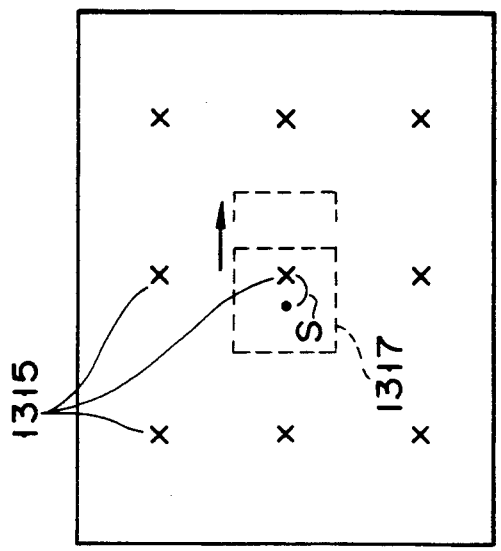

FIGS. 35A and 35B are views showing an arrangement of a nineteenth embodiment in which the present invention is applied to an electronic camera. The electronic camera mainly comprises a camera body 1300, a recording medium 1400, a processor 1500, a man-machine interface 1600, and a TV monitor 1700. The camera body 1300 shown in FIG. 35A comprises a lens 1301, a shutter 1302, an in-focus position controller 1303, an imaging device 1304, an A/D converter 1305, a memory 1306, a matching circuit 1307, a memory 1308, a range computing circuit 1309, a controller 1310, and a writer 1311 for writing an image in the recording medium 1400. The camera body 1300 is operated as follows. In the camera body 1300, pre-photographing and main photographing operations are performed. In the pre-photographing mode, the shutter 1302 shields a half surface of the lens 1301. The nonshielded half surface is used to focus an image, and the focused image is input to the imaging device 1304. In this case, an output signal from the imaging device 1304 is converted into a digital signal by an A/D converter 1305 and is recorded in the memory 1306. The shutter 1302 conceals another half surface of the lens 1301, and the input image is recorded in the memory 1306. In this manner, two half surfaces of the lens 1301 are alternately utilized to input two images with parallax, and the two input images are stereo-matched by the matching circuit 1307. Therefore, a distance to the object can be measured. In the above matching operation, as shown in FIGS. 36A and 36B, for example, detection points 1315 are determined in an image, and local areas 1316 and 1317 set using the detection points 1315 as their centers are subjected to the above matching. FIG. 36A shows a left image or picture surface, while FIG. 36B shows a right image or picture surface.

Figure 37:
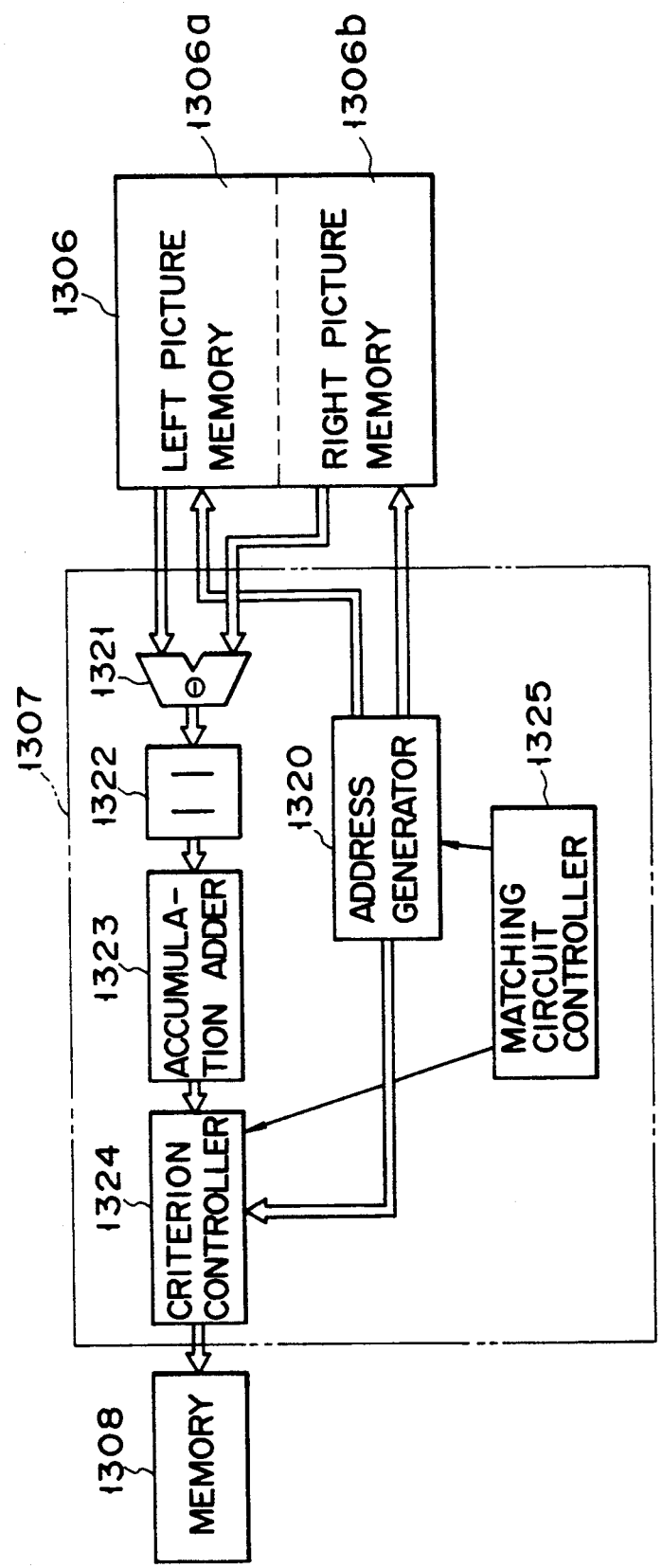

FIG. 37 is a view showing an arrangement of the matching circuit 1307 together with memories 1306 and 1308. A left picture memory 1306a and a right picture memory 1306b for recording two pictures or images having left and right fields of view are arranged in the memory 1306. An address generator 1320 is arranged in the matching circuit 1307. The address generator 1320 generates addresses of a preset area 1316 having a detection point 1315 as its center of the left image or picture and a preset area 1317 (the area having a size equal to the preset area of the left image) of the right image or picture which shifted from the detection point 1315 by several pixels (the number of shifted pixels is given as S) in a direction of parallax. The left and right image signals of the preset areas 1316 and 1317 are supplied from the memory 1306 to a subtracter 1321 in the matching circuit 1307. The difference between the left and right image signals are calculated in the subtracter 1321 in units of pixels. An absolute value of the difference from the subtracter 1321 is calculated by an absolute value arithmetic element 1322. The absolute values of the differences between the left and right pixel signals of the left and right preset areas 1316 and 1317 are calculated. These absolute values are added to each other by an accumulation adder 1323, and a sum is supplied to a criterion controller 1324. The address generator 1320 generates the same address as the start address for the left image in the memory 1306. The address generator 1320 generates an address representing a position (i.e., a point obtained by shifting the central point of a new area from the detection point by S-1 or S-2 in the direction of parallax) obtained by shifting the start address of the right image by one or two pixels in the direction of parallax. The similar calculation results are supplied to the criterion controller 1324. The above operations are repeated for each detection point within a preset range (e.g., a range in which the central point of the preset area 1317 of the right image is shifted by S to -S with respect to the detection point). The criterion controller 1324 compares the calculation results with respect to shift amounts and detects a minimum shift amount. The minimum shift amount is supplied to the memory 1308. This operation is performed in units of detection points. The above operations are controlled by a matching circuit controller 1325.

The operation of the matching circuit 1307 will be described below. It is necessary to find the corresponding points of the left and right image having parallax. The following operations are performed to find the corresponding points by the matching circuit 1307.

$$\rho(t) = \Sigma_R |fr(x+t,y) - fl(x,y)| \qquad (c)$$

where
 x: a parallax direction,
 t: a shift amount
 fr(x,y): a right image
 fl(x,y): a left image
 $\Sigma R$: an operator representing all additions in the preset areas Equation (c) is calculated while t is changed within a predetermined range (e.g., t =S to −S) with respect to a given detection point, thereby finding a minimum t value. Therefore, a right image point corresponding to the detection point of the left image can be obtained. In place of equation (c), the matching circuit 1307 may be arranged to perform the following correlation operation as a method of detecting the corresponding point:

$$\phi(t) = \Sigma_R fr(x+t,y) \cdot fl(x,y) \qquad (d)$$

Alternatively, the bias and the gain components of the left and right images may be corrected by the following normalizing cross correlation, thereby performing a more precise correlation operation:

$$\phi_N(t) = \Sigma_R \frac{[fr(x+l,y) - \overline{fr}][fl(x,y) - \overline{fl}]}{\sigma r \sigma l} \qquad (e)$$

where
 $\overline{fr}$: an average value in the preset area of the right image
 $\overline{fl}$: an average value in the preset area of the left image
 $\sigma r$: a standard deviation in the preset area of the right image
 $\sigma l$: a standard deviation in the preset area of the left image In this embodiment, the position of the preset area 1316 of the left image is fixed, and the corresponding point is found in the right image. However, the position of the preset area 1317 of the right image may be fixed, and a corresponding point may be found in the left image. Alternatively, detection points of both the preset areas of the left and right images may be relatively moved with respect to the detection point, thereby detecting the corresponding points. In addition, a correlation theorem in the Fourier transform may be applied to perform the following correlation operation by using an FFT arithmetic element in the matching circuit 1307:

$$\phi_F(u,v) = F^{-1}[F\{fr(x,y)\} \cdot F\{fl(x,y)\}] \qquad (f)$$

F: a Fourier transform operator
$F^{-1}$: an inverse Fourier transform operator

In this case, the relative position t between both the images need not be shifted to obtain a correlation value, unlike the case of equations (c) to (e). A corresponding point is obtained by detecting a position of a peak of a cross correlation image $\phi_F(u,v)$. When a noise influence is small, an accurate corresponding point may be detected by a phase correlation method given by the following equation:

$$\phi_F(u,v) = F^{-1}\left[ \frac{F\{fr(x,y)\} \cdot F\{fl(x,y)\}^*}{|F\{fr(x,y)\}| |F\{fl(x,y)\}|} \right] \qquad (g)$$

Figure 38:
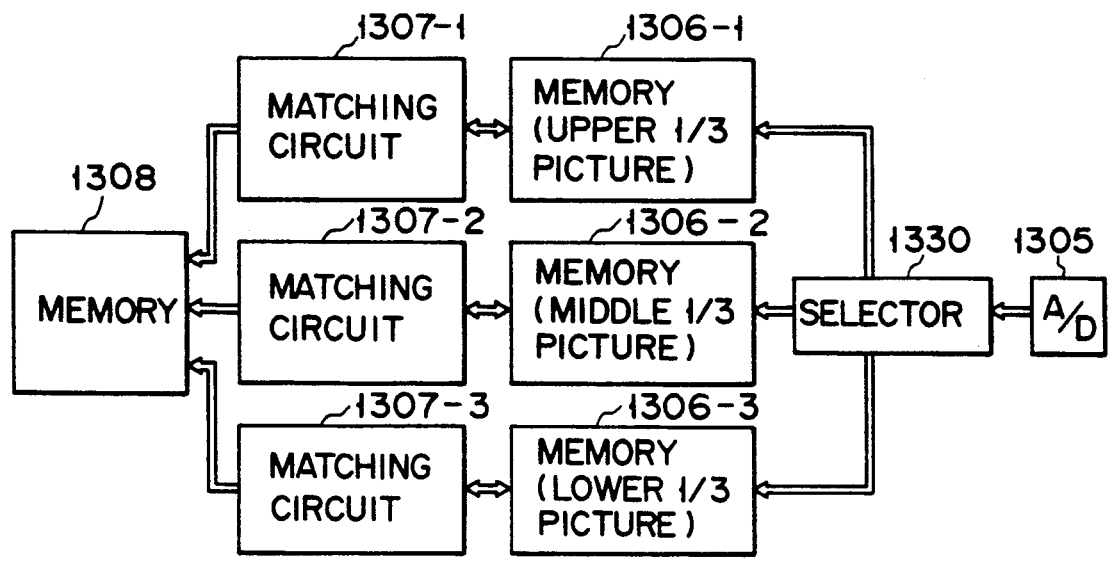

Alternatively, the memory 1306 and the matching circuit 13078 may be arranged together with a selector 1330, as shown in FIG. 38. In this case, an image is separated into components in a parallax direction and a direction perpendicular thereto, and the separated components are recorded to perform parallel matching of the partial images, thereby shortening the total processing time.

A shift amount between the right and left images at each point in the memory 1308 is supplied to a range computing circuit 1309, as shown in FIG. 35A. The range computing circuit 1309 calculates a distance between the camera body 1300 and each detection point on the basis of the parallax component produced upon an image input using half surfaces of the lens 1301 and the shift amount. A calculation result from the circuit 1309 is supplied to the controller 1310. After pre-photographing is completed, the in-focus position controller 1303 may be automatically controlled by using the distance data at the central position of the image such that the an object is focused at the central portion of the finder, thus performing an auto-focus operation.

Main photographing by the camera 1300 will be described below. The controller 1310 sets a shift range of in-focus object plane positions subjected to accumulation and input operations on the basis of the distance information sent from the range computing circuit 1309. A method of setting the range of in focus positions will be described below. A standard deviation representing the degree of variations is calculated on the basis of the distance data of the respective detection points. A range of $\pm kc$ (k is 1 to 2) is obtained from the average distance value to define an accumulation range. In this case, data calculated as infinity such as null are excluded when the average distance value and the standard deviation are calculated. The accumulation range may be arbitrarily and manually set by a user. In main photographing, the shutter 1302 is fully open, and the in-focus position controller 1303 is driven in the accumulation range set by the controller 1310 within an exposure time determined by the shutter 1302. Images having different in-focus positions are accumulated on the light-receiving surface of the imaging device 1304. An output signal from the imaging device 1304 is converted into a digital signal by the A/D converter 1305. The digital signal is stored in the memory 1306. The accumulated images stored in the memory 1306 and shift amounts between the right and left images with respect to the detection points of the images stored in the memory 1308 are stored in the recording medium 1400 by the writer 1311. Alternatively, an adder may be arranged in the camera body 1300, and the images having different in-focus positions may be accumulated and added in main photographing.

The recording medium 1400 may be a floppy disk, an optical memory, a card incorporating a semiconductor IC, a magnetic tape, a solid-state memory excluding a magnetic body, a memory consisting of an organic material, or the like. The data obtained by the camera body 1300 is off-line transferred to the processor 1500 through the recording medium 1400.

The arrangement and operation of the processor 1500 shown in FIG. 35B will be described below. The data stored in the recording medium 1400 is read out by a reader 1501. The readout image data is stored in a memory 1502. The shift amounts between the right and left images with respect to the detection points are stored in a memory 1503. The image data stored in the image memory 1502 is supplied to a recovery processing circuit 1504. The shift amount data stored in the memory 1503 is supplied to a factor generator 1505. The factor generator 1505 generates a factor or coefficient value corresponding to the shift amount, and the factor value is sent to the recovery processing circuit 1504. An image signal appropriately recovery-processed by the recovery processing circuit 1504 is converted into an analog video signal by a D/A converter 1506. The analog video signal is displayed on the TV monitor 1700. The operation of the processor 1500 is controlled by a controller 1507. Processing conditions and image display conditions can be set by an observer at the main-machine interface 1600 connected to the controller 1507.

An operation of recovery processing in the processor 1500 will be described below. Spatial filtering is performed by the recovery processing unit 1504 by convolution of a local area, thereby executing recovery processing.

Figure 39:
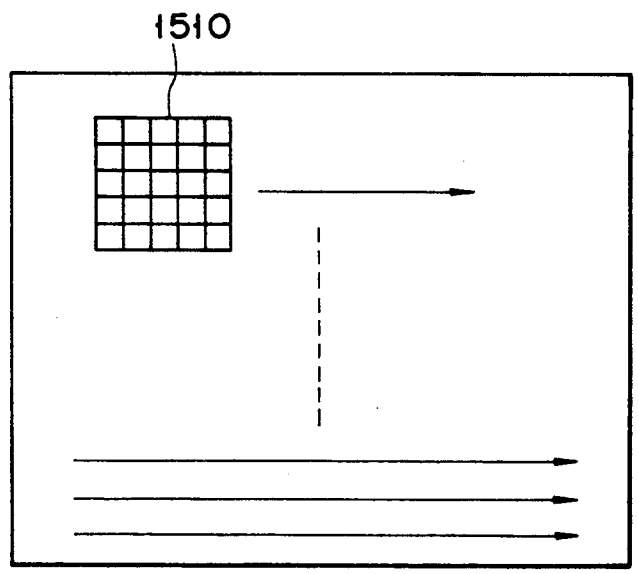

FIG. 39 is a view showing a principle of recovery processing. A convolution operation for a given pixel between a preset mask 1510 and a 5×5 pixel area of the given pixel is performed. An operation for substituting a convolution result for the pixel of interest is sequentially performed for pixels of interest (provided that this operation is not performed for peripheral two lines). Recovery processing is performed by the above method, and therefore different filtering operations can be performed depending on the positions within the image. When the image synthesized by the camera body 1300 is not uniformly defocused, the factor of the mask 1510 is changed depending on positions of the image. Therefore, an entirely focused image can be displayed. In order to execute the above processing, distances between the object and several detection points 1315 of the image in the camera body 1300 are measured in pre-photographing, and the degrees of defocusing amounts of the respective portions of the accumulated images are detected in advance. The factor of the mask 1510 is then determined on the basis of the defocusing amount information.

According to this embodiment (nineteenth embodiment), the range of the in-focus positions subjected to accumulation in pre-photographing can be determined. Even if defocusing depends on positions within the image, appropriate recovery processing can be performed. Therefore, an application range of the present invention to the electronic camera can be widened. Since the factor of the recovery processing mask 1510 in the processor 1500 can be arbitrarily changed depending on positions in the image, the focal depth can be arbitrarily changed by an observer as needed.

Twentieth Embodiment

Figure 40A:
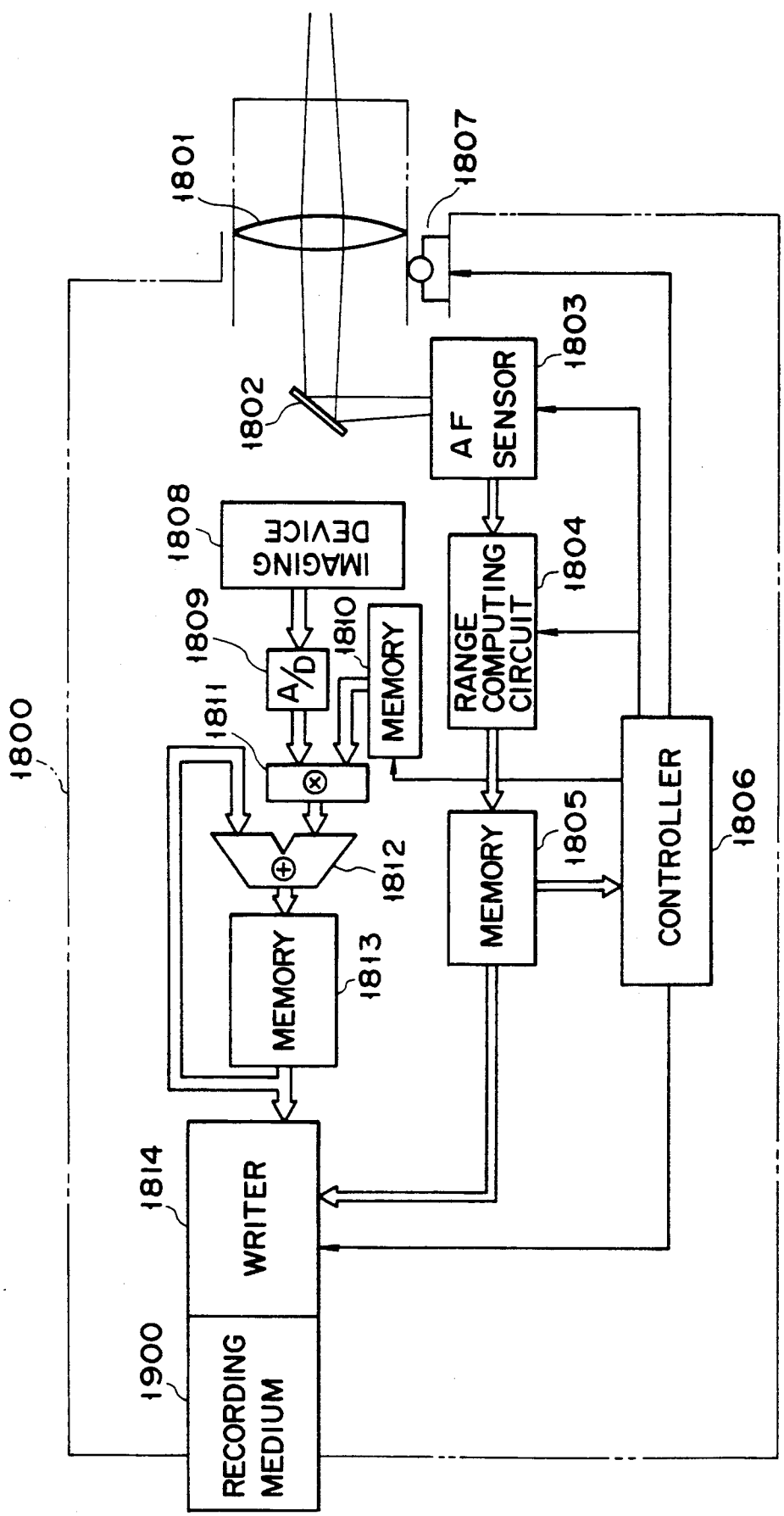
FIGS. 40A and 40B are views showing an arrangement of a twentieth embodiment of the present invention.
Figure 40B:
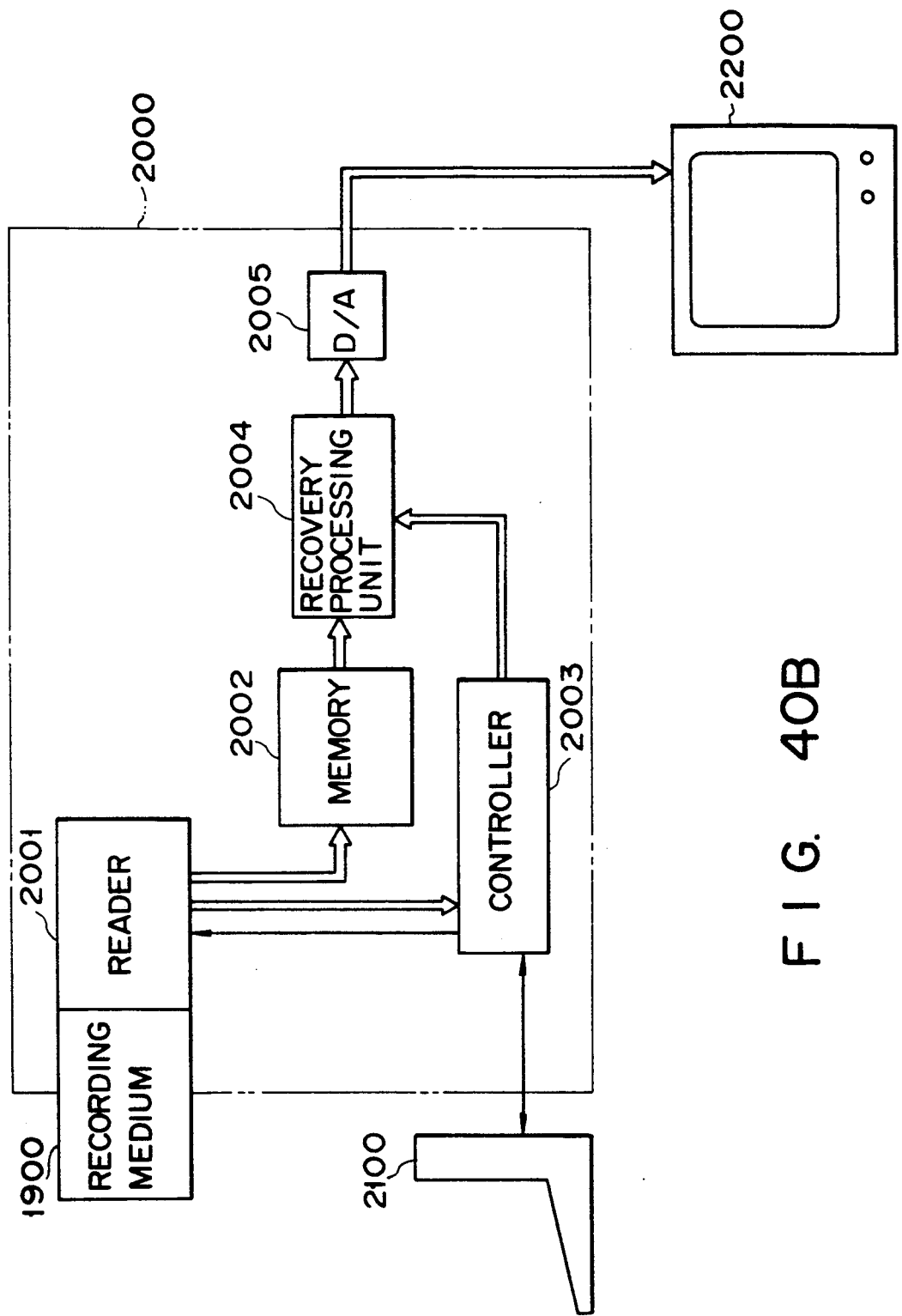

FIGS. 40A and 40B are views showing an arrangement of a twentieth embodiment in which the present invention is applied to an electronic camera in the same manner as in the nineteenth embodiment. The electronic camera mainly comprises a camera body 1800, a recording medium 1900, a processor 2000, a man-machine interface 2100, and a TV monitor 2200. The camera body 1800 performs the pre-photographing and the main photographing as in the nineteenth embodiment. In the pre-photographing, an object image input from the central position of a lens 1801 is reflected by a mirror 1802 and is incident on an auto-focus (to be referred to as AF hereinafter) sensor 1803. The AF sensor 1803 is operated on the basis of a phase difference AF scheme similar to stereo matching shown in the nineteenth embodiment and data corresponding to a phase difference of two images focused with parallax is supplied to a range computing circuit 1804. The range computing circuit 1804 calculates a distance between the camera body 1800 and the object on the basis of the data sent from the AF sensor 1803. The distance data is stored in a memory 1805. The above operations are repeated on several positions of the object which are set by the user. The results are stored in the memory 1805. The distance measurement results of the plurality of points stored in the memory 1805 are sent to a controller 1806, and main photographing conditions are set.

An operation of main photographing will be described below. The controller 1806 controls to appropriately weight images having different in-focus positions and input and add these images on the basis of the distance data between the camera body 1800 and the object which are measured in pre-photographing. That is, an in-focus position controller 1807 discretely changes the in-focus position within the range preset in pre-photographing. In this state, an image focused by the lens 1801 is input to an imaging device 1808. The image signal input to the imaging device 1808 is converted into a digital signal by an A/D converter 1809. The digital signal is multiplied by a multiplier 1811 with a predetermined factor or coefficient recorded in a memory 1810. The product from the multiplier 1811 is added by an adder 1812 to the image signal stored in a memory 1813. A sum is then stored in the memory 1813 again. With the above arrangement, the plurality of images input while the in-focus position is discretely changed are added to each other. A sum is stored in the memory 1813. When main photographing is performed, the mirror 1802 is mechanically removed from an optical path or is optically designed not to interfere photographing. The distance measurement data at several observation points which are recorded in the memory 1805 and the image data stored in the memory 1813 are recorded in the recording medium 1900 by a writer portions are recorded in the memory 1805 in the camera body 1800. The controller 1806 sets input conditions for the object selected by the user to be almost equally defocused. In this state, the main photographing is performed. The processor 2000 performs appropriate recovery processing on the basis of the distance measurement data obtained by the pre-photographing.

A method of setting addition and input conditions of the images on the basis of a plurality of distance measurement data will be described below. For the sake of descriptive convenience, assume that two objects having different distances from the camera body 1800 are present. According to the scope of the present invention, in order to display an image having a large focal depth by performing space-invariant recovery filtering of the images input and added to each other while the in-focus position is changed, the degree of defocusing of the synthesized image must be space-variant. A defocus amount by out of focus is given by a geometric approximation.

Figure 41:
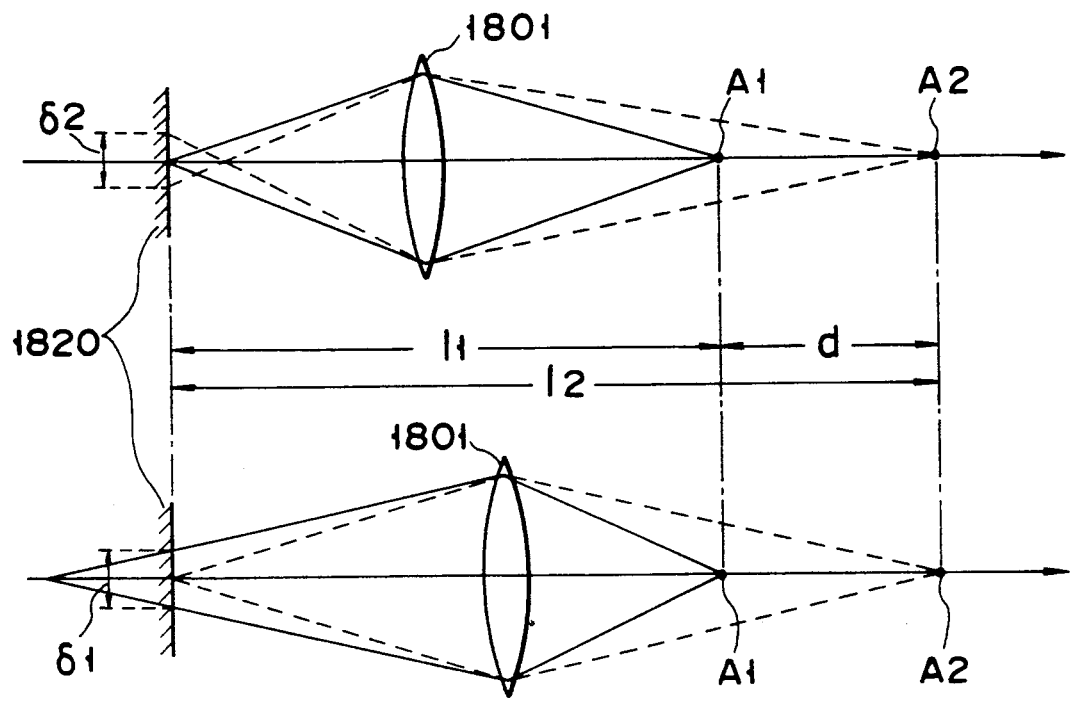

FIG. 41 is a view showing its geometric relationship. Assume that an object point A1 is separated from a photographing plane 1820 of the camera body 1800 by a distance l1, and that an object point A2 is separated therefrom by a distance l2. Also assume that a distance between the object points A1 and A2 is d. An upper half of FIG. 41 shows a geometric relationship when the object point A1 is focused. In this case, a defocus amount $\sigma 2$ of the object point A2 is represented by a diameter of rays projected from the object point A2 on the photographing plane 1820. A lower half of FIG. 41 shows a geometric relationship when the object point A2 is focused. In this case, a defocus amount $\sigma 1$ of the object point A1 is represented by a diameter of rays projected from the object point A1 on the photographing plane 1820. If a focal length of the lens 1801 is defined as f and condition $f < < l1$ is assumed, the defocus amounts $\sigma 2$ and $\sigma 1$ can be approximated as follows:

$$\sigma 2 \simeq \frac{df^2}{F} \cdot \frac{1}{\left(l1 - 2f - \frac{f^2}{l1 - 2f}\right)\left(l1 - f + d - \frac{f^2}{l1 - 2f}\right)} \quad \text{(h)}$$

$$\sigma 1 \simeq \frac{df^2}{F} \cdot \frac{1}{\left(l1 - f - \frac{f^2}{l1 - 2f + d}\right)\left(l1 - 2f + d - \frac{f^2}{l1 - 2f + d}\right)} \quad \text{(i)}$$

1814.

The arrangement and operation of the processor 2000 shown in FIG. 40B will be described below. The data recorded in the recording medium 1900 is read out by a reader 2001. The image data is then stored in a memory 2002, and the distance measurement data is input to a controller 2003. The appropriate recovery processing is performed using the distance measurement data in accordance with the conditions set by the controller 2003. An image signal recovery-processed by the recovery processing unit 2004 is converted into an analog video signal by a D/A converter 2005, and the analog video signal is displayed on the TV monitor 2200. Recovery processing by the processor 2000 and various image output operations are set by the man-machine interface 2100 connected to the controller 2003.

The twentieth embodiment having the above arrangement has the following effect. The user sets several object portions at the central portion of the frame and depresses the range computing button. The distance between the camera body 1800 and the several object where F is an f-number of a camera wherein $F = f/D$ (D: diameter of an exit pupil of a lens). When approximate expressions (h) and (i) are compared, the relationship between the defocus amount $\sigma 2$ of the object point A2 upon focusing on the object point A1 and the defocus amount $\sigma 1$ of the object point A1 upon focusing on the object point A2 is given to be $\sigma 2 > \sigma 1$. When the difference between these defocus amount is small, the distance l1 is small. That is, it is apparent that a typical effect is obtained when the object A1 nearer to the camera comes close thereto. In this case, the degrees of defocusing of the objects at the object points A1 and A2 in the images added and input while the in-focus position is equidistantly changed in the range between the object points A1 and A2 cannot be equally objected. That is, the degree of defocusing of the object at the object point A2 is larger than that at the object point A1. In this embodiment, the degree of defocusing of the synthesized image is set to be space-invariant by weighting adding, i.e., an addition with weighting. A method of determining a weighting factor will be described below.

Figure 42:
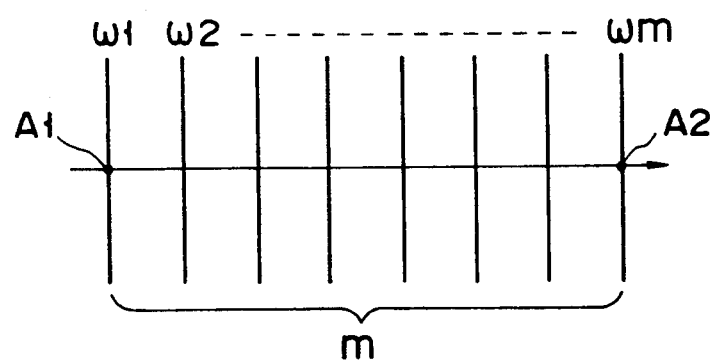

Assume that m in-focus positions are equidistantly set within the range of A1 to A2, as shown in FIG. 42. Weighting coefficients or factors $\omega 1(i=1, 2, \ldots m)$ are multiplied with the corresponding in-focus positions, and the products are added to each other. Defocus mounts $\sigma 2(i)$ and $\sigma 1(i)$ $(i=1, 2, \ldots m)$ at the A2 and A1 points located at the in-focus positions are represented by the following equations:

$$\sigma 2(i) = \frac{f^2}{F} \frac{d - \frac{d}{m}i}{(l1 - 2f - f^2/(l1 - 2f))\left(l1 - 2f + d - \frac{d}{m}i - f^2/(l - 2f)\right)} \quad (j)$$

$$\sigma 1(i) = \frac{f^2}{F} \frac{\frac{d}{m}i}{\left(l1 - f - f^2/\left(l1 - 2f + \frac{d}{m}i\right)\right)\left(l - 2f + \frac{d}{m}i - f^2/\left(l1 - 2f + \frac{d}{m}i\right)\right)} \quad (k)$$

The defocus amounts of the objects located at the object points A2 and A1 of the weighted and added image are represented by $$\sum_{i=1}^{m} \omega i \sigma 2(i) \text{ and } \sum_{i=1}^{m} \omega i \sigma 1(i).$$

in order to obtain a minimum $\omega i$ $(i=1, 2, \ldots, m)$ under the condition of these points which is restrained by $$\sum_{i=1}^{m} \omega i = 1,$$

a Lagrange's indeterminate multiplier method is used as follows:

$$f = \left| \sum_{i=1}^{m} \omega i \sigma 2(i) = \sum_{i=1}^{m} \omega i \sigma 1(i) \right|^2 \quad (l)$$

$$g = \sum_{i=1}^{m} \omega i - 1 \quad (m)$$

$$\phi = f + \lambda g \quad (n)$$

$$(\sigma/\sigma \omega j)\phi = 0 (j=1, 2, \ldots, m) \quad (o)$$

Simultaneous system (p) is established for an indeterminate number $\omega i$ $(i=1, 2, \ldots, m)$ on the basis of equations (o) and (m). Simultaneous system (p) is expressed by a matrix for illustrative convenience:

$$\begin{pmatrix} 2D_1^2 & 2D_1D_2 & \ldots & 2D_1D_m & 1 \\ 2D_2D_1 & 2D_2^2 & & 2D_2D_m & 1 \\ \cdot & \cdot & & \cdot & \cdot \\ \cdot & \cdot & & \cdot & \cdot \\ \cdot & \cdot & & \cdot & \cdot \\ 2D_mD_1 & 2D_mD_2 & \ldots & 2D_m^2 & 1 \\ 1 & 1 & \ldots & 1 & 0 \end{pmatrix} \begin{pmatrix} \omega 1 \\ \omega 2 \\ \cdot \\ \cdot \\ \cdot \\ \omega m \\ \lambda \end{pmatrix} = \begin{pmatrix} 0 \\ 0 \\ \cdot \\ \cdot \\ \cdot \\ 0 \\ 1 \end{pmatrix} \quad (p)$$

By solving the matrix (p), an optimal i $(i=1, 2, \ldots, m)$ can be obtained. When the the distance (l1 and d1 between the camera body 1800 and the object is detected, the way of setting a weighting factor is checked beforehand. An appropriate weighting addition and input operations are performed in practice on the basis of the distance to each object which is calculated in pre-photographing. When the photographing lens 1801 is an interchangeable lens, the weighting factor data may be stored in a read-only memory (ROM) in the photographing lens 1801, and the data is transferred to the controller 1806 in the camera body 1800, thereby performing a predetermined operation.

According to this embodiment (twentieth embodiment), the focal depth can be arbitrarily controlled to focus all objects arbitrarily selected by a user. Additions with weighting are performed to set the de-focus state of the image to be almost space-invariant, thereby simplifying recovery processing.

Twenty-First Embodiment

FIG. 43 is a view showing an arrangement of the twenty-first embodiment in which the present invention is applied to an electronic camera as in the nineteenth and twentieth embodiments. The arrangement of the twenty-first embodiment is equivalent to an arrangement obtained by omitting the memory 1810 and the multiplier 1811 from the camera body 1800 of the twentieth embodiment shown in FIG. 40A. A camera body 2300 in the twenty-first embodiment performs pre-photographing and main photographing. Pre-photographing has the same contents as described in the twentieth embodiment, and a detailed description thereof will be omitted. An operation of main photographing according to the twenty-first embodiment will be described below. A controller 2306 controls an in-focus position controller 2307 to input and add the images in accordance with conditions determined in pre-photographing. The in-focus position controller 2307 discretely changes the in-focus position in accordance with the conditions. In each state, the image focused by a lens 2301 is input to an imaging device 2308. An image signal input to the imaging device 2308 is converted into a digital signal by an A/D converter 2309. The digital signal is added by an adder 2312 to the image signal stored in a memory 2313. The sum is stored in the memory 2313 again. With the above arrangement, the plurality of images input while the in-focus position is discretely changed are accumulated and added. The result is then stored in the memory 2313. The distance measurement data of several observation points stored in the memory 2305 and the image data stored in the memory 2313 are recorded in the recording medium 1900 by a writer 2314. The synthesized image recorded in the recording medium 1900 is read out by a processor in the same manner as in the twentieth embodiment and is subjected to the appropriate recovery processing based on the distance measurement data read out from the recording medium 1900. The recovery-processed data is displayed on a TV Monitor. The arrangements of the processor, the TV monitor, and the man-machine interface of this embodiment are the same as those in the twentieth embodiment.

Figure 44:
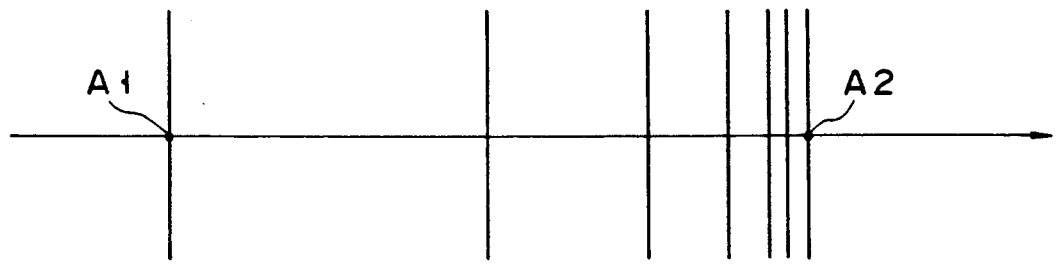

The twenty-first embodiment having the above arrangement has the following effect. As described with reference to the twentieth embodiment, the defocusing of the images input while the distance between the A1 and A2 points is equidistantly divided into in-focus positions is not space-invariant. This embodiment employs the following means to input and add the images so that defocusing can become almost space-invariant. In-focus points are set from the object point A1 to the object point A2, as shown in FIG. 44. That is, the distance between the in-focus positions is large near the object point A1, but the distance between the in-focus positions becomes smaller near the object point A2. An object at the far object point A2 from the camera body 2300 upon setting of the in-focus positions as described above is taken into consideration. The number of images having large defocus amounts a focus point of the camera body 2300 is set at a nearer point is smaller than that obtained by equidistant in-focus positions. The de-focusing amount of the object at the object point A2 can be reduced in the synthesized image. The defocus amount of the object at the object point A1 is increased in the synthesized image as compared with the case wherein the in-focus positions are equidistantly set. Therefore, defocusing of the synthesized image is almost space-invariant. The distances between the in-focus positions in this embodiment can be easily obtained by the factor $\omega i$ (i=1, 2, ..., m) calculated by the method described with reference to the twentieth embodiment. In the twenty-first embodiment, the images can be appropriately input and added on the basis of the distances to the respective objects which are measured by pre-photographing on the basis of the preset data.

The same effect as in the twentieth embodiment can be obtained in the twenty-first embodiment with a simple arrangement.

Twenty-Second Embodiment

Figure 45:
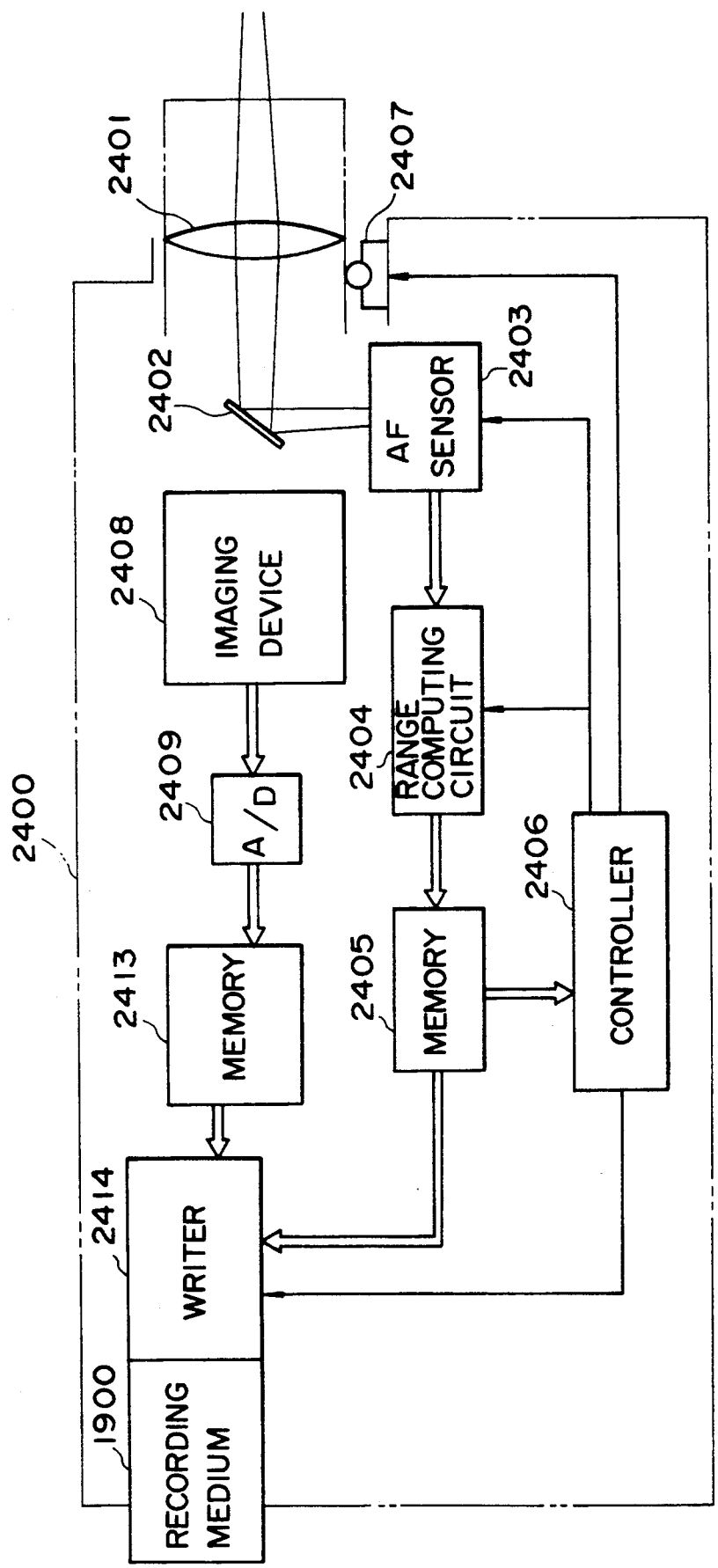

FIG. 45 is a view showing an arrangement of a twenty-second embodiment in which the present invention is applied to an electronic camera as in the nineteenth, twentieth, and twenty-first embodiments. The arrangement of a camera body 2400 of the twenty-second embodiment is equivalent to an arrangement obtained by omitting the adder 2312 from the camera body 2300 of the twenty-first embodiment. The camera body 2300 of this embodiment performs pre-photographing and main photographing. The contents of pre-photographing of this embodiment are the same as those described in the twentieth embodiment, and a detailed description thereof will be omitted. In main photographing, a controller 2406 controls an in-focus position controller 2407 such that images are input and added on the basis of the conditions determined in pre-photographing. The images focused on a lens 2401 while the in-focus position is changed at a predetermined speed within an exposure time are accumulated on a light-receiving surface of an imaging device 2408. The accumulated image is converted into a digital signal by an converter 2409, and the digital signal is stored in a memory 2413. The stored image data together with the distance measurement data stored in a memory 2405 is stored in a recording medium 1900 by a writer 2414. The synthesized or accumulated image recorded in the recording medium 1900 is fetched in a processor similar to those in the twentieth embodiment. The readout data is subjected to appropriate recovery processing on the basis of the distance measurement data read out from the recording medium 1900. The recovery-processed image is displayed on a TV monitor. The arrangements of the processor, the TV monitor, and the man-machine interface with which an observer manipulates are the same as those in the twentieth embodiment.

Figure 46:
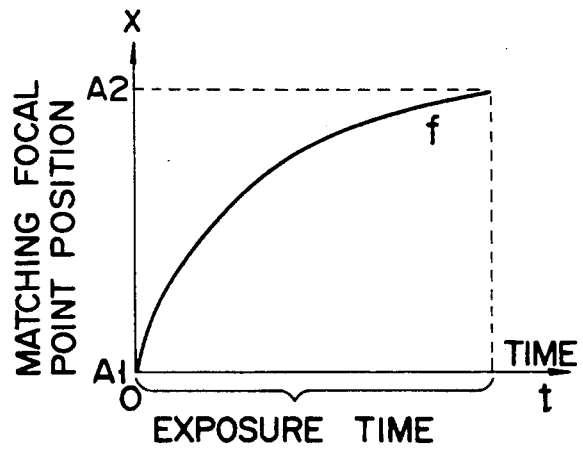
Figure 47:
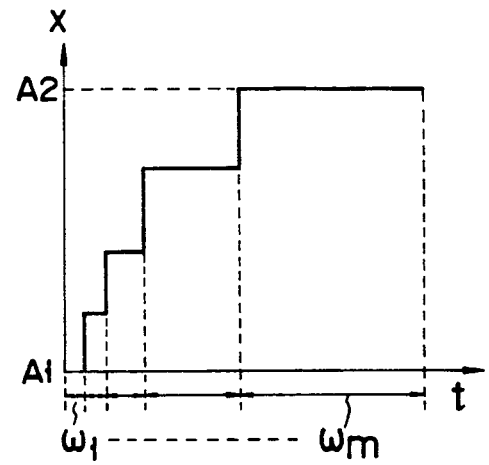

The twenty-second embodiment having the above arrangement has the following effect. The in-focus points are controlled to be space-invariant by using the distance measurement data of several objects arbitrarily selected by the user in the same manner as in the twentieth and twenty-first embodiments. In order to cope with the geometric relationship shown in FIG. 41, the in-focus positions within the exposure time in this embodiment are controlled with the characteristics changed as shown in FIG. 46. More specifically, the in-focus position is quickly moved to sparsely accumulate the images near the object point A1 closer to the camera body 2400, while the in-focus position is slowly moved to densely accumulate the images near the object point A2 far from the camera body 2400. With this operation, the synthesized image is almost space-invariant, wherein defocusing does not depend on locations in the same manner as in the twenty-first embodiment. A curve f(x) in FIG. 46 is given such that the factor $\omega 1$ (i=1, 2, ..., m) obtained in the twentieth embodiment serves as a differential coefficient along a coordinate axis x which represents in-focus positions. That is, $f(x)/dx|_{x=di/m}=mi$ is given. As shown in FIG. 47, images may be accumulated and input while the in-focus position is changed stepwise. In this case, the exposure time at the in-focus position is preferably set to be a ratio of factors i (i=1, 2, ..., m) obtained in the twentieth embodiment.

The same effect as in the twentieth and twenty-first embodiments can be obtained in the twenty-second embodiment with a simpler arrangement.

An arrangement of an optical system for inputting images having different in-focus positions in the first, second, third, fifteenth, nineteenth, twentieth, twenty-first, and the twenty-second embodiments will be described below.

Figure 48:
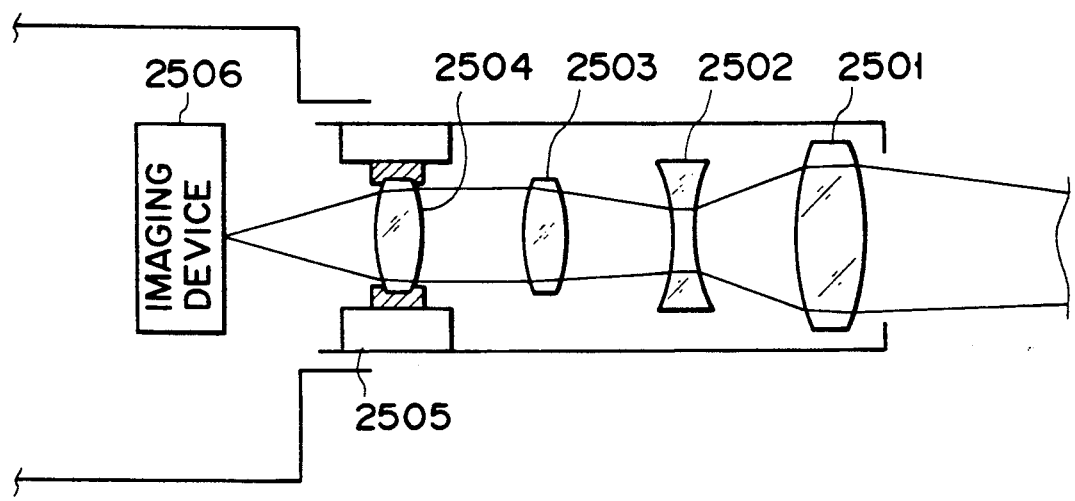

FIG. 48 is an arrangement of a zoom lens. The lens system comprises a focusing system 2501, a variator system 2502, a compensator system 2503, and a relay lens system 2504. Each lens system may comprise a plurality of lenses, but the plurality of lenses are not illustrated. Of the above lens systems, the relay lens system 2504 is not mechanically moved upon zooming and focuses an image guided from the compensator system 2503 on an imaging device 2506. Therefore, when the relay lens system 2504 is driven by a relay lens driver 2505 in an optical axis, images having in-focus positions can be input regardless of the focal lengths of the lenses. The relay lens driver 2505 is constituted by an actuator using an electromagnetic motor, an ultrasonic motor, a piezoelectric element, or the like.

Embodiments associated with a means for achieving a second object of the present invention will be described below.

Twenty-Third Embodiment

Figure 49:
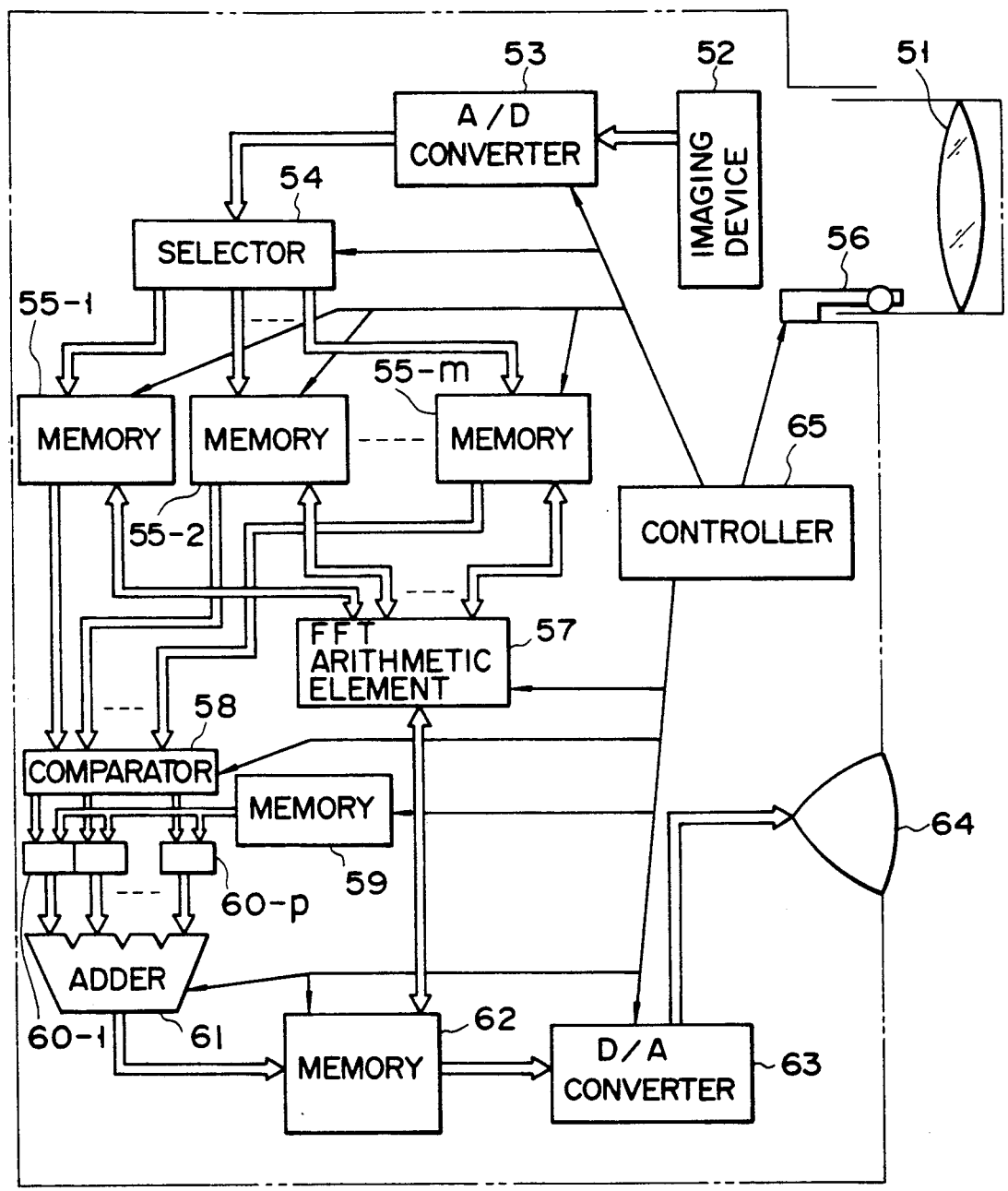

FIG. 49 is a view showing an arrangement of the twenty-third embodiment of the present invention. The twenty-third embodiment partially corresponds to the third embodiment shown in FIG. 3. An object image is focused on a light-receiving portion of an imaging device 52 consisting of a CCD or imaging tube through a lens 51 shown in an upper right portion in FIG. 49. An input optical system normally includes a plurality of lenses, but only one lens is shown for illustrative convenience. An output signal, i.e., an image signal from the imaging device 52 is converted into a digital signal by an A/D converter 53. The digital signal is stored in a predetermined one of memories 55-1 to 55-m which is selected by a selector 54. The above operations are performed such that the in-focus position is discretely changed by an in-focus position controller 56 at predetermined intervals within a predetermined distance range. The n (n≦m) input images are respectively stored in the n memories of the memories 55-1 to 55-m. The images stored in the memories 55-1 to 55-m are Fourier-transformed, and the results are stored in the memories 55-1 to 55-m again. The Fourier-transformed image signals stored in the memories 55-1 to 55-m are supplied to a comparator 58. The comparator 58 compares spectral intensities of the Fourier-transformed images in units of spatial frequencies. The Fourier-transformed images are reordered from the higher- to lower-intensity images. These image signals are transferred to multipliers 60-1 to 60-P (P≦m). Factors or coefficients set in a memory 59 are supplied to the multipliers 60-1 to 60-P as multipliers. The multipliers 60-1 to 60-P multiply the coefficients with the Fourier-transformed image signals from the comparator 58. The output signals from the multipliers 60-1 to 60-P are supplied to and added by an adder 61. A synthesized image signal from the adder 61 is stored in a memory 62. The Fourier-transformed images weighted and added in the units of spatial frequencies and recorded in the memory 62 are then inverse Fourier-transformed by the FFT arithmetic element 57. The result from the arithmetic element 5 is stored in the memory 62 again. The processed image signal stored in the memory 62 is converted into an analog signal by a D/A converter 63. The analog signal is displayed on a display monitor 64. The control of timings and signal flows of the above operations is performed by a controller 65.

A lookup table may be used in place of the factor setting memory 59 and the multipliers 60-1 to 60-P, and predetermined factors may be multiplied by table conversion. The original image signals recorded in the memories 55-1 to 55-m may be recorded in another recording medium such as a floppy disk, a magnetic tape, an optical memory, or the like. The image input recording and reproduction units may be off-line connected such that the image signal read out from this external recording medium can be subjected to the Fourier transform, additions with weighting, and inverse the Fourier transform during image reproduction. The weighting factors or coefficients used during additions with weighting in units of spatial frequencies may be fixed from the beginning, or one of the plurality of factors prestored in the memory 59 may be selected by an operator. Alternatively, the content of the memory 59 may be updated.

Figure 50:
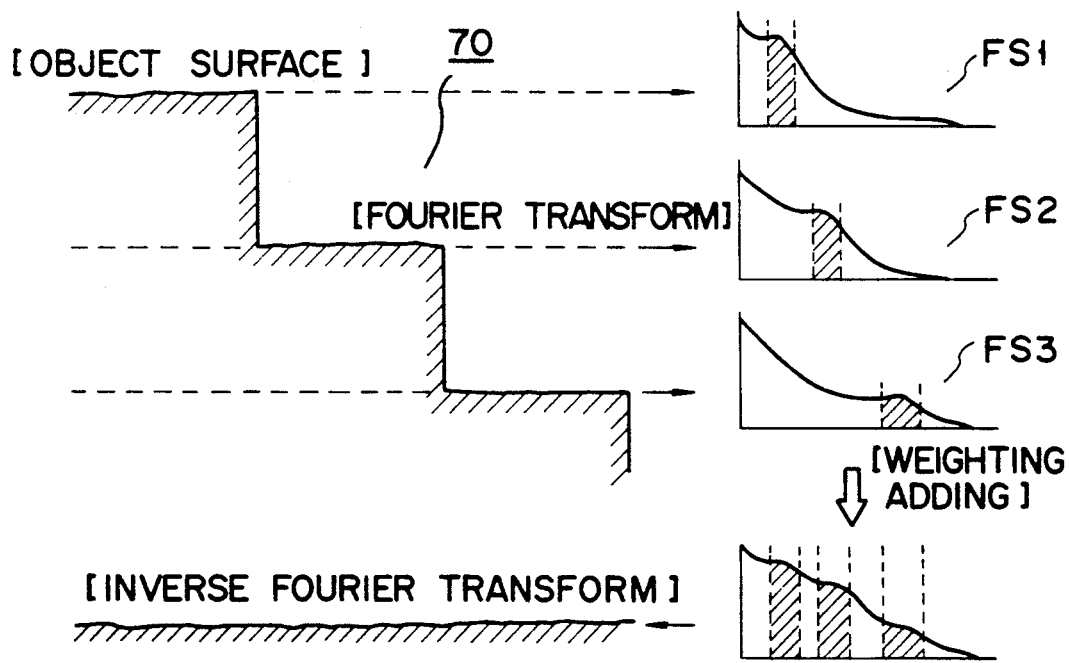

The twenty-third embodiment having the above arrangement has the following effect. Assume an object 70 having a stepwise structure shown in FIG. 50. The respective surfaces of the stepwise portions of the object 70 have natural frequencies. When the object 70 having projections in the direction of depth is observed with an optical system having a relatively small focal depth, a focused surface can be clearly observed, but other surfaces are out of focus. When a given surface is focused, its input image has a frequency unique to this surface. Therefore, the Fourier spectra FS1, FS2, FS3, ... of the input images focused on the respective surfaces have natural spatial frequency data of the respective surfaces. When the Fourier spectra FS1, FS2, FS3,... of the plurality of input images are weighted and added in units of the spatial frequencies while the focal position is changed, thereby obtaining a synthesized Fourier spectrum of an image including spatial frequency data of all the surfaces.

In this case, the following weighting technique is used. A given spatial frequency is taken into consideration, and spectral intensities of the frequencies are compared between the images having different in-focus positions. "10" is multiplied with the image having the highest spectral intensity, and "0" is multiplied with the remaining images, or "4", "3", "2", and "1" are weighted to the images from the higher spectral intensities of the frequency. Alternatively, weighting may be performed in proportion to the spectral intensities. When almost only noise appears in a high-spatial frequency region, identical weighting factors or coefficients are used, or "0"s are respectively multiplied with the images, thereby reducing noise. The weighting techniques can be appropriately selected in accordance with features of the object or optical system.

The resultant Fourier spectrum image is subjected to inverse Fourier transform to obtain an image having a substantially large focal depth. For the sake of descriptive simplicity, a one-dimensional Fourier transform technique is used. However, a two-dimensional Fourier transform is actually used.

Twenty-Fourth Embodiment

FIG. 51 is a view showing an arrangement of a twenty-fourth embodiment of the present invention. In this embodiment, an optical element, e.g., a lens 66, designed to intentionally cause chromatic aberration in an image input optical system is used. In addition, dichroic mirrors 67-1 and 67-2 are arranged behind the lens 66. Images having different wavelength ranges are formed by imaging devices 52-1 to 52-3. The dichroic mirrors 67-1 and 67-2 can be mirrors having filter characteristics shown in FIG. 52.

As shown in FIG. 52, the mirror 67-1 comprises a mirror which can reflect light of a blue region and transmit light having a wavelength larger than that of green. The mirror 67-2 comprises a mirror which can reflect light having a wavelength smaller than that of green and transmit red light therethrough. With this arrangement, an image of a blue region is input to the image device 52-1; a green image, to the imaging device 52-2; and a red image, to the imaging device 52-3.

Referring back to FIG. 51, the image signals from the imaging devices 52-1 to 52-3 are converted into digital signals by A/D converters 53-1 to 53-3, respectively. The digital signals are stored in memories 55-1 to 55-m. Other points in this embodiment are the same as those in the twenty-third embodiment, and a detailed description thereof will be omitted.

In this embodiment, the image is divided into the three components, i.e., blue, green, and red components. However, the present invention is not limited to this. For example, the number of bands may be increased to four or more or limited to two. In addition, an interference filter may be used to input an image having a narrow specific wavelength range. A plurality of different band-pass and color filters may be used in place of dichroic mirrors 67-1 and 67-2, and these filters are switched to cause one imaging device to input images having a multiple band.

The twenty-fourth embodiment having the above arrangement has the following effect. The reflection spectral characteristics of a general object are distributed in a wide range substantially corresponding to the entire range of visible light. Images at the respective wavelengths have strong correlation. That is, by using an optical element which intentionally cause chromatic aberration, images having different focal positions corresponding to the wavelengths are focused, and images having substantially different in-focus positions can be simultaneously input. Therefore, since the images focused at a plurality of positions can be input without performing a mechanical operations for changing the in-focus position, an apparatus free from "blurring" or the like caused by mechanical movement can be obtained.

Twenty-Fifth Embodiment

FIG. 53 is a view showing an arrangement of a twenty-fifth embodiment of the present invention. This embodiment partially corresponds to the fourth embodiment shown in FIG. 4. In the twenty-fifth embodiment, half mirrors 68-1 and 68-2 are arranged behind a lens 51 in an image input optical system, and distances between the lens 51 and imaging devices 52-1 to 52-3 are set to be different from each other. Other arrangements are the same as those in the twenty-fourth and twenty-third embodiments, and a detailed description thereof will be omitted.

The imaging devices 52-1 to 52-3 may be moved to properly set their positions in accordance with types of object.

The twenty-fifth embodiment having the above arrangement has the following effect. In this embodiment, the images focused on the plurality of different planes are input, and the plurality of images having different in-focus positions can be simultaneously input. Therefore, a simple apparatus can be obtained wherein the mechanical operation for changing the in-focus position need not be performed, and application fields of the apparatus can be widened.

Twenty-Sixth Embodiment

Figure 54A:
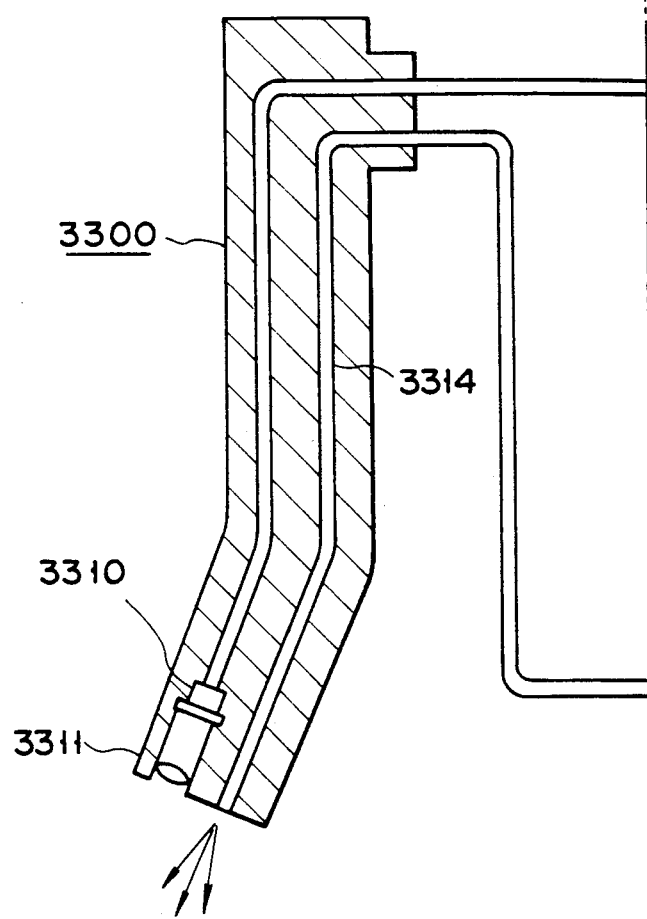

FIGS. 54A to 54C are views showing an arrangement of a twenty-sixth embodiment in which the present invention is applied to a surface sequential electronic endoscope in the same manner as in the eighth embodiment shown in FIGS. 13A to 13C. The electronic endoscope mainly comprises an endoscope probe 3300, an image input unit 3301, a color misregistration correction unit 3302, a color information recoder 3303, a focal depth increasing unit 3304, an image display unit 3305, and a controller 3306. A monochromatic solid-state imaging device 3310 such as a CCD is mounted at the distal end of the endoscope probe 3300. An image focused by an objective lens in an in-focus position controller 3311 is imaged. In this case, illumination light is obtained as follows. Light from a white illumination source 3313 such as a Xe lamp which passes through a rotary color filter 3312 arranged in the image input unit 3301 is guided into the endoscope probe 3300 by a light guide 3314 of an optical fiber or the like Light is then output from the distal end of the probe.

The rotary color filter 3312 has the same structure as that shown in FIG. 14.

Referring back to FIG. 54, the rotary color filter 3312 is driven by a motor 3314 in the image input unit 3301, and illumination light colors are changed in an order of R, G, and B. For this reason, an object illuminated with light components having these colors is imaged by the imaging device 3310 as a monochromatic image. An output image signal from the imaging device 3310 is converted into a digital signal by an A/D converter 3315 in the image input unit 3301, and the digital signal is stored in a corresponding predetermined color area of frame memories 3317-1 to 3317-3. The above operations are controlled by an image input controller 3318. The R and G components or the G and B components of the primary color images, i.e., R, G, and B components sequentially stored in the frame memories 3317, are selected by a selector 3319. The selected image signals are input to a primary image corresponding area detector 3320 in the color misregistration correction unit 3302, and misregistration amounts of the R or B image with respect to the G image is locally detected. An address generator 3321 generates addresses for correcting the misregistration amounts calculated by the primary image corresponding area detector 3320, and these address signals are supplied to the frame memories 3317-1 to 3317-3. The frame memories 3317-1 to 3317-3 correct the R and B images by using the address signals and a buffer memory 3317-4.

The resultant single color image is input to the color information recording unit 3303 through the selector 3319. In the color information recording unit 3303, the respective color components are added to each other by an adder 3322 to obtain a luminance $Y=R+G+B$. At the same time, the color components R, G, and B are divided by Y by dividers 3323-1 to 3323-3. Quotients R/Y, G/Y, and B/Y from the dividers 3323-1 to 3323-3 are stored in memories 3324-1 to 3324-3, respectively.

The R, G, and B images input while changing the focal position by the in-focus position controller 3311 in the endoscope probe 3300, that is, the R, G, and B images stored in the frame memories 3317-1 to 3317-3 in the image input unit 3301 are recorded in frame memories 3325-1 to 3325-3 in the focal depth increasing unit 3304. In addition to the frame memories 3325-1 to 3325-3, the focal depth increasing unit 3304 includes an FFT arithmetic element 3326, a comparator 3327, multipliers 3328 1 to 3328 3, a memory 3329, an adder 3330, and a frame memory 3331. The focal depth increasing unit 3304 is operated in the same manner as in the twenty-third embodiment, and the processing result is stored in the frame memory 3331 as the luminance $Y=R+G+B$.

The color information stored in the memories 3324-1 to 3324-3 and the image signal stored in the frame memory 3331 are multiplied by multipliers 3332-1 to 3332-3 in units of color components. The products from the multipliers 3332-1 to 3332-3 are supplied to the image display unit 3305.

The signals supplied from the multipliers 3332-1 to 3332-3 to the image display unit 3305 are converted into analog signals by D/A converters 3333-1 to 3333-3, respectively. The analog signals are displayed on a TV monitor 3334. The image processing and display units are controlled by the controller 3306.

This embodiment utilizes the strong correlation between the three primary (R, G, and B) endoscopic images and dependency of image defocusing almost on the luminance of the color image components. Images having different focal positions in units of three primaries are input in the surface sequential electronic endoscope, and processing is performed by the means of the present invention.

An operation of this embodiment will be described below. R, G, and B component images are sequentially input by the image input unit 3301. In this case, when the object or the endoscope probe 3300 itself is abruptly moved, the relative positions of the three primary images are deviated from the proper positions, thus causing so-called color misregistration. The color misregistration correction unit 3302 calculates the misregistration amounts of the R and B images with respect to the G image by matching between local partial images. The R and B images are corrected on the basis of the calculated color misregistration amounts. A color image at a preset in-focus position is input by the above method. Data R/Y, G/Y, and B/Y obtained by normalizing the R, G, and B values by the luminance $Y=R+G+B$ are recorded by the color information recording unit 3203. The primary color images are input while the focal position is changed, and the input image data are subjected to color misregistration correction. The corrected data are synthesized by the focal depth increasing unit 3304 by using the R, G, and B images, thereby obtaining an image having a large focal depth. The resultant image is defined as a new luminance Y' image. Finally, the Y' image is multiplied with the data R/Y, G/Y, and B/Y to obtain a color image having a large focal depth.

This embodiment has an advantage in that an endoscopic image having a large focal depth can be synthesized. In addition, since an objective lens having a large aperture size can be used, the power of the illumination source can be reduced. In addition, the light storage time of the imaging device can be shortened, and an influence of color misregistration can be minimized.

Twenty-Seventh Embodiment

Figure 55:
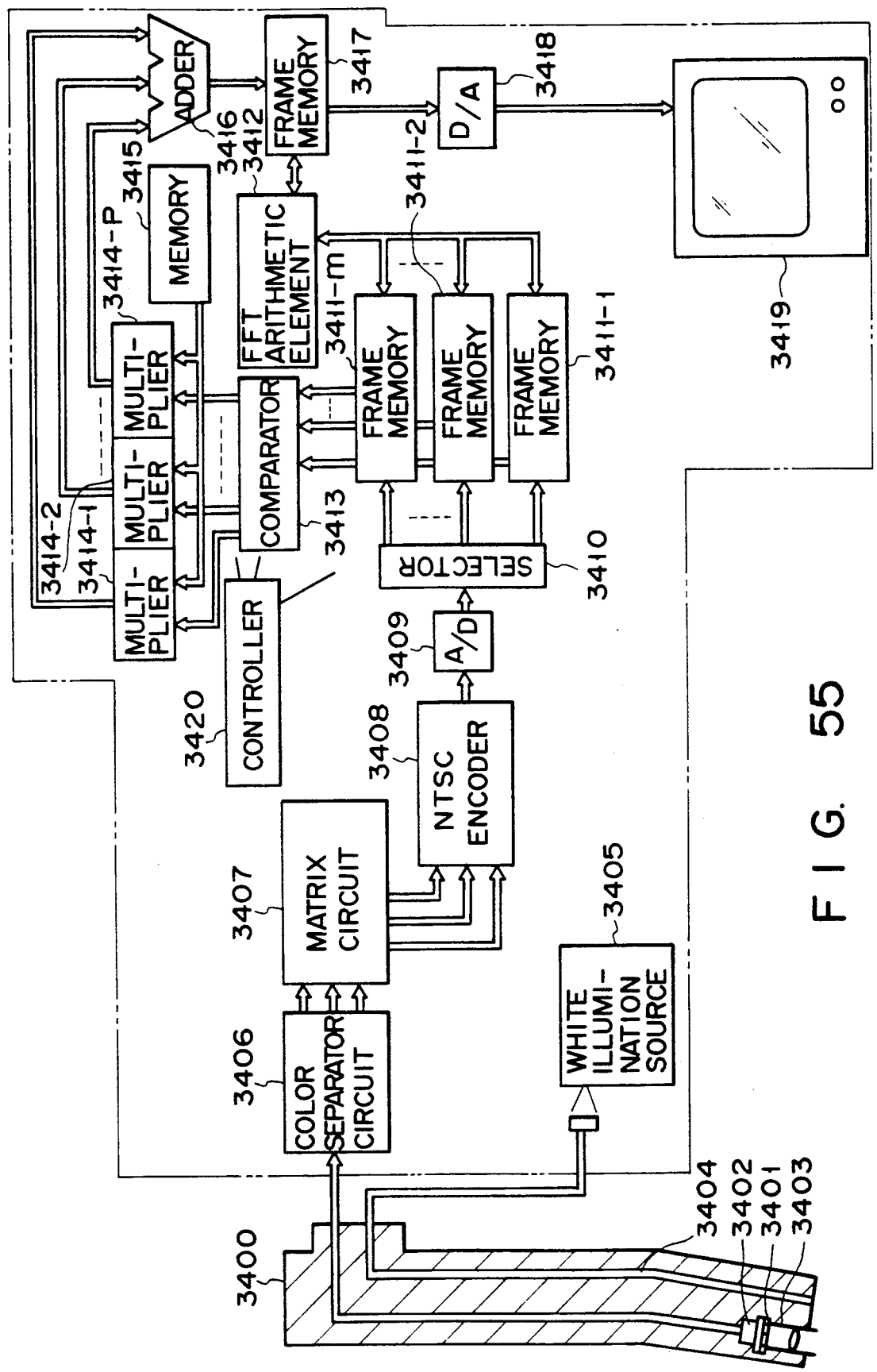

FIG. 55 is a view showing an arrangement of a twenty-seventh embodiment in which the present invention is applied to an electronic endoscope using a single-plate color imaging device. As shown in FIG. 55, a solid-state imaging device 3402 covered with a color mosaic filter 3401, a light-receiving surface of which consists of R, G, and B filter elements, is mounted at the distal end of an endoscope probe 3400. An image focused by an objective lens in an in-focus position controller 3403 is imaged. In this case, illumination light is produced as follows. Light emitted from a white illumination source 3405 in the apparatus housing is guided to the endoscope probe 3400 through a light guide 3404 and is output from the distal end of the probe. An output signal from the imaging device 3402 is separated into R, G, and B color signals by a color separator circuit 3406. In this embodiment, the color mosaic filter 3401 comprises R, G, and B filter elements. However, the filter 3401 may comprise complementary color filter elements such as cyan and yellow filter elements. In any case, the color separator circuit 3406 separates the color signals representing the color components constituting the color mosaic filter 3401. The R, G, and B component signals are converted into Y, R-Y, and B-Y signals by a matrix circuit 3407. The Y, R-Y, and B-Y signals are converted into an NTSC signal by an NTSC encoder 3408. The NTSC signal is converted into a digital signal by an A/D converter 3409. This digital signal is stored in one of frame memories 3411-1 to 3411-m by a selector 3410.

The n ($n \leq m$) images input while the in-focus position is properly changed are stored in n memories of the memories 3411-1 to 3411-m. The apparatus also includes an FFT arithmetic element 3411, a comparator 3413, multipliers 3414-1 to 3414-P, a memory 3415, an adder 3416, a frame memory 3417, a D/A converter 3418, a TV monitor 3419, and a controller 3420. The same processing as in the twenty-third embodiment is performed in the twenty-seventh embodiment.

In this embodiment, the endoscopic image obtained by the single-plate color imaging device 3402 using the color mosaic filter 3401 is converted into the NTSC signal. The converted color image signal is processed by the means of the present invention. According to this embodiment, therefore, the apparatus size can be reduced, and the same effect of the endoscopic image as in the twenty-sixth embodiment of the present invention can be obtained.

Other embodiments associated with the means for achieving the second object may be exemplified by an application to a reflection microscope as in the seventh embodiment of FIG. 12 and an application to an electronic camera as in the twelfth embodiment of FIG. 22.

The present invention is not limited to the particular embodiments described above. Various changes and modifications may be made without departing the scope and spirit of the invention.

What is claimed is:

1. An image input/output apparatus including an optical image forming system, comprising:

focusing means for performing in-focus operations on a plurality of different object planes;

image inputting means for inputting a plurality of images focused on the different object planes by said focusing means;

weighting coefficient calculating means for calculating a weighting coefficient by which to most equalize degraded conditions of the image on each of said object planes in an image which is formed by weighting and adding said plurality of input images based on characteristics of the optical image forming system, and a focusing condition set by said focusing means when said plurality of images are input by said image inputting means;

weighting and adding means for weighting all of said images input by said image inputting means by said weighting coefficient calculated by said weighting coefficient calculating means, and for adding up the weighted images; and spatial frequency filtering means for spatial-frequency-filtering the images having been weighted and added by said weighting and adding means so as to recover spatial frequency components having been degraded by said weighting and adding.

2. An apparatus according to claim 1, wherein said focusing means comprises:
means for changing an in-focus object plane position; and 3. An apparatus according to claim 1, wherein said inputting means comprises means for performing band-pass filtering, and said focusing means comprises means for selecting a range in which the in-focus object plane position is changed on the basis of an output from said means for performing band-pass filtering.

4. An apparatus according to claim 1, wherein said focusing means comprises means for measuring a distance from an imaging portion to an object to be photographed, and means for selecting a range in which the in-focus object plane position is changed on the basis of distance measurement data from said distance measuring means, and said recovery processing means comprises means for performing recovery processing on the basis of the distance measurement data.

5. An apparatus according to claim 1, wherein said focusing means comprises:
   means for selecting a range in which the in-focus object plane position is changed; and
   means for setting non-equidistant object plane positions within the range selected by said selecting means.

6. An apparatus according to claim 1, wherein said inputting means is arranged such that a plurality of imaging devices are located on a plurality of different image planes to simultaneously input a plurality of images focused on the plurality of different object planes.

7. An apparatus according to claim 1, wherein said recovery processing means comprises means for prestoring an image spatial frequency filter in consideration of spatial frequency characteristics of said inputting means.

8. An image input/output apparatus for inputting/outputting image information, in an optical image formation system, comprising:
   focusing means for performing in-focus operations on a plurality of different object planes;
   inputting means for inputting a plurality of images focused on the different planes by said focusing means in units of different wavelength regions;
   Fourier-transforming means for Fourier-transforming each of the images input by said inputting means;
   weighting and adding means for weighting said images input by said inputting means by at least one preselected value and for then adding the plurality of weighted images in units of different wavelength regions, said weighting and adding means including means for weighting and adding each of said fourier-transformed images; and
   recovery processing means for performing recovery processing by spatial frequency filtering of an image obtained by adding the images by said weighting and adding means; and
   synthesizing means for multiplying said inverse Fourier-transformed images with each image subjected to a division by an image obtained by adding the input images and for synthesizing the resultant images into one image.

9. An image input/output apparatus for inputting/outputting image information, comprising:
   focusing means for performing in-focus operations on a plurality of different object planes;
   inputting means for inputting a plurality of images focused on different object planes by said focusing means;
   weighting and adding means for weighting a plurality of images focused on the different object planes by said focusing means by at least one preselected value and adding them up, comprising: imaging means for electrically converting a light image; color separating means for separating an output from said imaging device in units of three primary colors; first logarithmic compression circuit means for logarithmically compressing an output from said color separating means in units of three primary colors; and inverse logarithmic compression circuit means for performing inverse logarithmic compression of a signal from said first logarithmic compression circuit means; recovery processing means for performing recovery processing by spatial frequency filtering of an image obtained by adding the images by said weighting and adding means said recovery processing means comprising:
   a matrix conversion circuit for performing linear matrix conversion of an output from said inverse logarithmic compression circuit means; second logarithmic compression circuit means for logarithmically compressing an output signal from said matrix conversion circuit means; and color signal synthesizing means for synthesizing a color signal by using an output signal from said second logarithmic compression circuit means and the output signal from said first logarithmic compression circuit means.

10. An image input/output device according to claim 9 wherein:
    said color separating means includes means for separating colors in units of complementary colors; and
    said first logarithmic compression circuit means comprises means for compressing colors in units of complementary colors.

11. An image input/output apparatus including an optical image forming system, comprising:
    focusing means for performing in-focus operations on a plurality of different object planes;
    image inputting means for inputting a plurality of images focused on the different object planes by said focusing means;
    weighting coefficient calculating means for calculating a weighting coefficient for all of said plurality of input images, based on characteristics of the optical image forming system and a focusing condition set by said focusing means when said plurality of images are input by said image inputting means;
    weighting and adding means for weighting all of said images input by said image inputting means by said weighting coefficient calculated by said weighting coefficient calculating means, and for adding up the weighted images; and
    spatial frequency filtering means for spatial-frequency-filtering the images having been weighted and added by said weighting and adding means so as to recover spatial frequency components having been degraded by said weighting and adding;
    said plurality of images focused on the different object planes by said focusing means are input by said image inputting means in units of different wavelength regions; and
    said weighting and adding means weights the images input by said image inputting means by at least one preselected value and then adds the plurality of weighted images in units of different wavelength regions.

12. An image input/output apparatus according to claim 11, wherein:
    said focusing means comprises means for changing an in-focus object pane position and means for changing the wavelength range of length;
    said image inputting means for inputting a plurality of images comprises means for providing different in-focus object plane positions and means for providing different wavelength ranges of light;

said spatial frequency filtering means comprises a recovery processing means; and said image input/output apparatus further comprises synthesizing means for multiplying a recovered image from said recovery processing means of said spacial frequency filtering means with each image subjected to a division by an image obtained by adding the plurality of input images, and for synthesizing resultant images into one image.

13. An image input/output apparatus according to claim 11, wherein said spatial frequency filtering means comprises:

means for extracting a luminance signal from an image synthesized by said weighting and adding means;

luminance signal recovery processing means for performing luminance signal recovery processing by spatial frequency filtering of the thus extracted luminance signal; and synthesizing means for synthesizing the luminance signal recovery processed by said luminance signal recovery processing means, and wherein the images are added in units of wavelength ranges to obtain one image.

* * * * *